United States Patent
Ito et al.

(10) Patent No.: US 6,437,792 B1
(45) Date of Patent: Aug. 20, 2002

(54) IMAGE PROCESSING APPARATUS AND METHOD, COLOR GAMUT CONVERSION TABLE CREATING APPARATUS AND METHOD, STORAGE MEDIUM HAVING IMAGE PROCESSING PROGRAM RECORDED THEREIN, AND STORAGE MEDIUM HAVING RECORDED THEREIN COLOR GAMUT CONVERSION TABLE CREATING PROGRAM

(75) Inventors: Masahiko Ito; Naoya Kato, both of Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/488,617

(22) Filed: Jan. 20, 2000

(30) Foreign Application Priority Data

Jan. 22, 1999 (JP) .............................. 11-014515
Jul. 14, 1999 (JP) .............................. 11-200838

(51) Int. Cl.[7] .................................. G09G 5/06
(52) U.S. Cl. ................... 345/600; 345/590; 345/601; 345/603
(58) Field of Search ................. 345/600, 601, 345/602, 603, 604, 605, 590, 589, 591, 592, 593, 597, 598, 599, 22, 72, 83, 88, 89; 347/115, 43; 382/162, 163, 167; 358/1.6, 518

(56) References Cited

U.S. PATENT DOCUMENTS

| | | | | |
|---|---|---|---|---|
| 5,416,890 A | * | 5/1995 | Beretta | 345/590 |
| 5,557,712 A | * | 9/1996 | Guay | 345/611 |
| 5,644,509 A | * | 7/1997 | Schwartz | 358/518 |
| 5,739,927 A | * | 4/1998 | Balasubramanian et al. | 358/518 |
| 6,005,968 A | * | 12/1999 | Granger | 382/162 |
| 6,088,038 A | * | 7/2000 | Edge et al. | 345/600 |
| 6,157,735 A | * | 12/2000 | Holub | 382/167 |
| 6,313,925 B1 | * | 11/2001 | Decker et al. | 358/1.9 |
| 6,330,075 B1 | * | 12/2001 | Ishikawa | 358/1.9 |

FOREIGN PATENT DOCUMENTS

| | | |
|---|---|---|
| EP | 0 828 381 | 3/1998 |
| EP | 0 946 050 | 9/1999 |
| EP | 0 961 488 | 12/1999 |

* cited by examiner

*Primary Examiner*—Michael Razavi
*Assistant Examiner*—Thu-Thao Havan
(74) *Attorney, Agent, or Firm*—Frommer Lawrence & Haug LLP; Willia S. Frommer

(57) ABSTRACT

For converting an image from an input device to an image corresponding to the color gamut of an output device, the color gamut of a color signal outside the color gamut of the output device is reduced to a color closer to the color available at the output device. If the color gamut of an input device is different from that of an output device, a color signal outside the output device color gamut is reduced in color gamut in the direction of a minimum color difference given by the following color difference formula:

$$\Delta E = \left\{ [\Delta L^* \ \Delta C^* \ \Delta H^*] \begin{bmatrix} Kll & Klc & Klh \\ Kcl & Kcc & Kch \\ Khl & Khc & Khh \end{bmatrix} \begin{bmatrix} \Delta L^* \\ \Delta C^* \\ \Delta H^* \end{bmatrix} \right\}^{1/2}$$

where $\Delta L^*$ is a difference in lightness, $\Delta C^*$ is a in chroma and $\Delta H^*$ is a difference in hue; and parameters K are predetermined constants or functions of a lightness $L^*$, chroma $C^*$ and hue $h^*$, respectively.

16 Claims, 37 Drawing Sheets

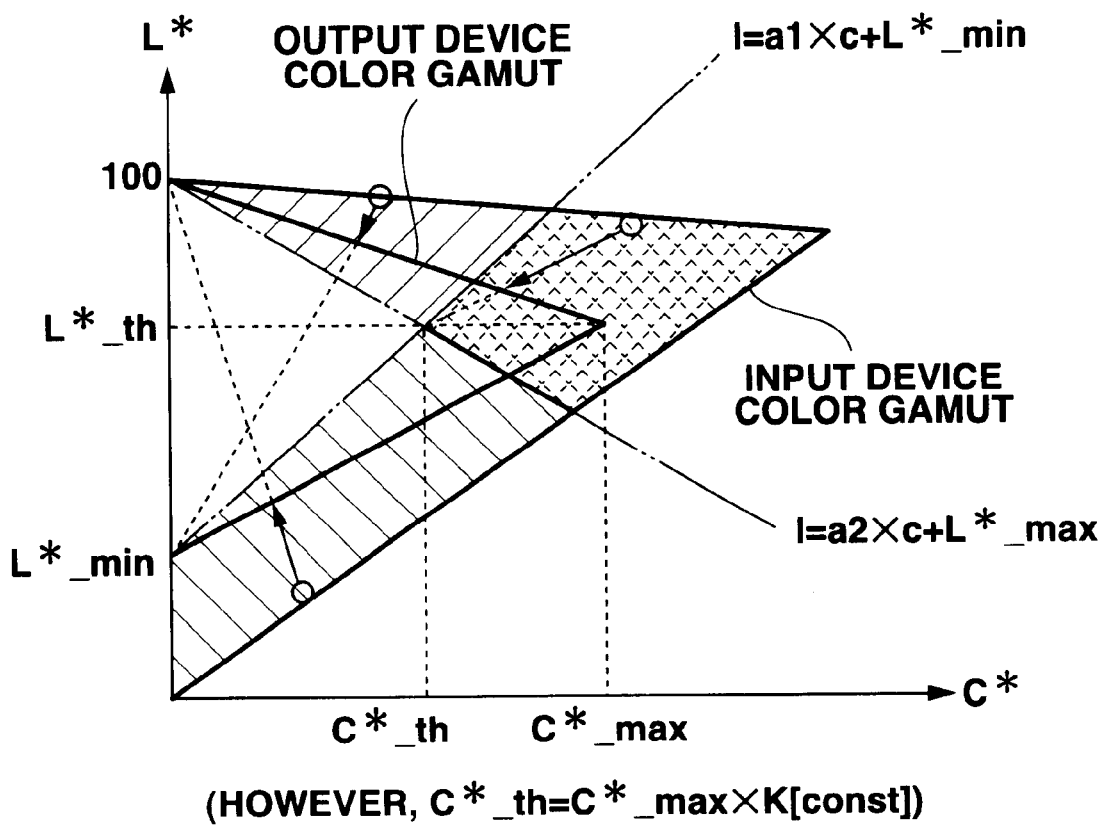
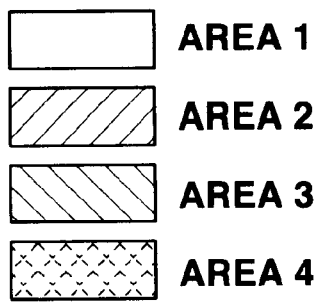
FIG.8

| CMY | | | L* a* b* | | |
|---|---|---|---|---|---|
| 0 | 0 | 0 | 95 | 0 | 0 |
| 0 | 0 | 8 | 94 | 0 | 2 |
| 0 | 0 | 16 | 93 | 0 | 6 |
| ⋮ | ⋮ | ⋮ | ⋮ | ⋮ | ⋮ |
| 0 | 0 | 255 | 85 | 9 | 100 |
| 0 | 8 | 0 | 92 | 2 | −9 |
| ⋮ | ⋮ | ⋮ | ⋮ | ⋮ | ⋮ |
| 0 | 8 | 255 | 76 | 13 | 90 |
| 0 | 16 | 0 | 92 | 5 | −19 |
| ⋮ | ⋮ | ⋮ | ⋮ | ⋮ | ⋮ |
| 0 | 255 | 255 | 41 | 19 | −52 |
| 8 | 0 | 0 | 93 | −5 | −2 |
| ⋮ | ⋮ | ⋮ | ⋮ | ⋮ | ⋮ |
| 255 | 255 | 255 | 7 | 0 | 0 |

FIG.18

| L* a* b* | | | CMY | | |
|---|---|---|---|---|---|
| 0 | −128 | −128 | 0 | 0 | 0 |
| 0 | −128 | −120 | 2 | 4 | 2 |
| 0 | −128 | −112 | 3 | 5 | 2 |
| ... | ... | ... | ... | ... | ... |
| 0 | −128 | 128 | 4 | 2 | 3 |
| 0 | −120 | −128 | 2 | 5 | 3 |
| ... | ... | ... | ... | ... | ... |
| 0 | −120 | 128 | 5 | 3 | 2 |
| 0 | −112 | −128 | 2 | 5 | 4 |
| ... | ... | ... | ... | ... | ... |
| 0 | 128 | 128 | 8 | 5 | 4 |
| 3 | −128 | −128 | 3 | 8 | 5 |
| ... | ... | ... | ... | ... | ... |
| 100 | 128 | 128 | 254 | 253 | 252 |

FIG.19

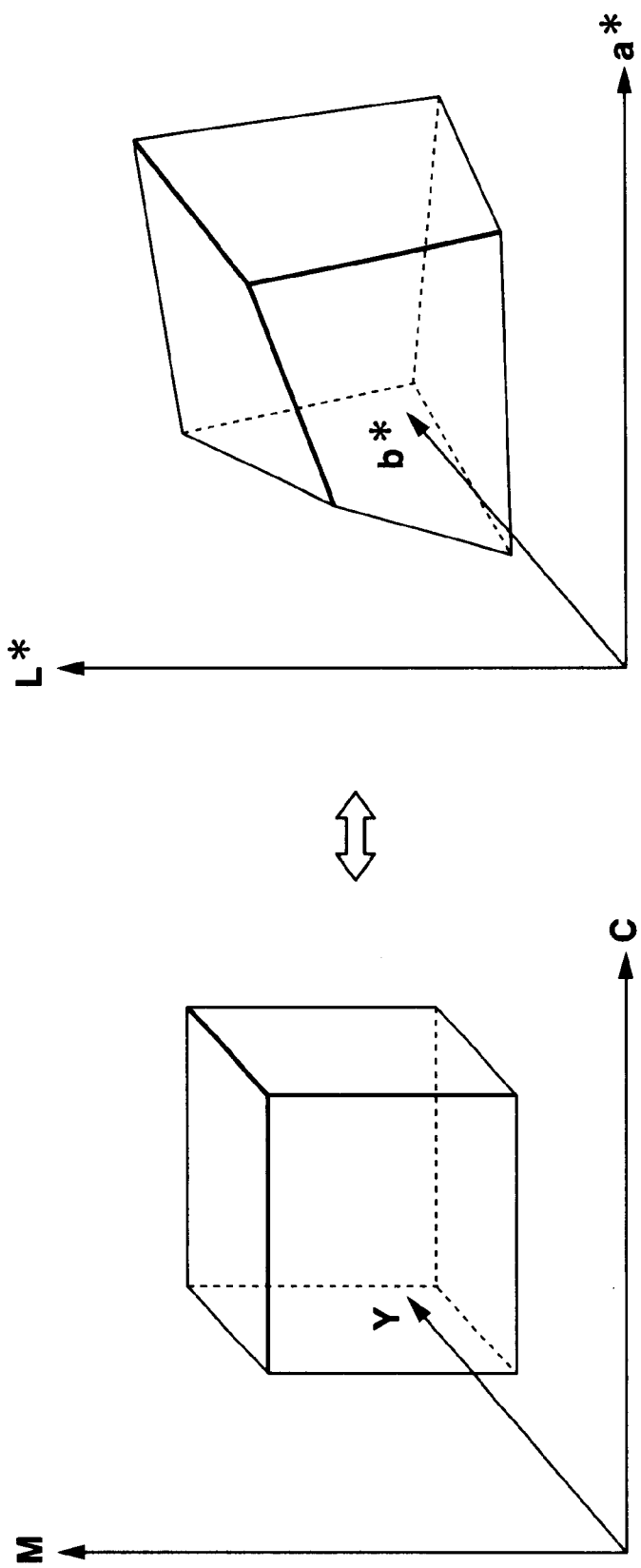

IMAGE PROCESSING APPARATUS AND METHOD, COLOR GAMUT CONVERSION TABLE CREATING APPARATUS AND METHOD, STORAGE MEDIUM HAVING IMAGE PROCESSING PROGRAM RECORDED THEREIN, AND STORAGE MEDIUM HAVING RECORDED THEREIN COLOR GAMUT CONVERSION TABLE CREATING PROGRAM

BACKGROUND OF THE INVENTION

1. Field of the Invention

The present invention relates to an image processing apparatus and method, adapted to reduce, when the color gamut of an output device is different from that of an input device, the color gamut of a color signal outside the output device color gamut to provide a color near to that in the input device. Also, the present invention relates to a color gamut conversion creating apparatus and method, adapted to create a color gamut conversion table for use to reduce a color gamut. Also, the present invention relates to a recording medium having recorded therein an image processing program in accordance with which a color gamut is reduced. Also, the present invention relates to a recording medium having recorded therein an color gamut conversion table creating program in accordance with which a color gamut conversion table for use to reduce a color gamut is created.

2. Description of the Related Art

These days, devices dealing with color image data are provided at lower and lower prices while their processing speeds have been higher and higher. In these situations, there has rapidly been in common use a variety of systems dealing with color images such as systems for transmitting and receiving color image data via networks such as Internet and the like, color desktop publishing systems for editing data including color images, etc.

There have been proposed various types of devices dealing with color images. However, many of them differ in color gamut they can cover (range of color reproduction) from one to another. Simple transfer of a color image between such devices of different types will result in reproduction of the color image in different colors from the original ones. Suppose for example that an image displayed on a monitor is printed out as a hard copy by a printer. In this case, if a color gamut the monitor covers is different from a one the printer covers, the color of an image printed out as a hard copy by the printer will be different from that of the image displayed on the monitor as the case may be.

As various systems dealing with color images have become popular, it has been demanded to attain a so-called device-independent color concept intended to reproduce a color image in the same colors at different types of devices included in the systems. The system to implement the device-independent color is generally called "color management system". As typical examples of this color management system, there are already available Colorsync included in Mac OS, ICM in Windows 98 and the like.

Referring now to FIG. 1, there is schematically illustrated the concept of the color management system in which physical colorimetric values of color signals in input and output devices are combined to implement a device-independent color. More particularly, as shown in FIG. 1, a color signal from an input device (such as video camera 61, scanner 62, monitor 63 or the like) is converted to a color signal in a device-independent color space (CIE/XYZ, CIE/L*a*b* or the like) on the basis of a device profile in which a color gamut conversion formula or color gamut conversion table is defined for each of the input devices. For an output device (monitor 63, printer 64 or the like) to output the color signal, the latter is converted to a color signal in a color space corresponding to the device on the basis of a device profile in which a color gamut conversion formula or color gamut conversion table is defined for each of the output devices.

Thus in the color management system, for conversion of an input device color signal to an output device color signal, a device-independent color is implemented by converting once the input device color signal to a color signal in a device-independent color space on the basis of a device profile. The "device profile" is a file in which a color gamut conversion formula or color gamut conversion table is defined. In other words, it is a file having stored therein a group of parameters calculated from relations between device color signals (RGB, CMYK or the like) and chromatic values (XYZ, L*a*b* or the like) measured by a colorimeter or the like.

Even if the color management system is applied, however, it is physically impossible for all the devices to reproduce the completely same because each of the devices has only a limited color gamut (range of color reproduction) which greatly differs from one device to another. That is to say, such differences in color gamut between all the devices are a barrier against implementation of the color management system.

The above difference in color gamut will further be described herebelow concerning a CRT monitor and printer. Normally, the CRT monitor reproduces a color by additive mixture of three color stimuli, namely, red (R), green (G) and blue (B), emitted from their respective phosphors on a face plate. Thus, the color gamut of the CRT monitor depends upon the types of the phosphors used on the face plate. On the other hand, the printer uses three color inks, namely, cyan (C), magenta (M) and yellow (Y) (or four color inks including black (K) in addition to the three color inks) to reproduce a color. That is, the color gamut of the printer depends upon the types of inks used therein. Further, the printer color gamut varies depending upon the type of a paper as an image recording medium, the gradation reproducing method, etc.

FIG. 2 shows a typical color gamut of CRT monitor and a typical color gamut of printer, integrated in the direction of L* and plotted in a plane a*-b*. Normally, the CRT monitor and printer color gamuts are different from each other as shown in FIG. 2. As seen from FIG. 2, the color gamut of the printer color is generally smaller than that of the CRT monitor, and especially in the green and blue color gamuts, the printer color gamut is extremely smaller than the CRT monitor color gamut. FIG. 3 shows the typical color gamut of CRT monitor and that of printer, plotted in a plane C*-L*. Since the peak of the chroma C* in the CRT monitor color gamut is away from that of the chroma C* in the printer color gamut in the direction of lightness L* as shown in FIG. 3, it is physically impossible for the printer to reproduce a color in an area of a high lightness and chroma displayed on the CRT monitor even in the domain of a hue in which there is not so large a difference between the CRT monitor and printer as in FIG. 2.

If the output device color gamut is smaller than the input device color gamut as in the above, the output device cannot reproduce all colors at the input device and the colors have to be processed in such a manner that they fall within the output device color gamut. For this purpose, all the colors have to be processed to fall within the output device color gamut while image information (gradation, tint, etc.) presented at the input device are being maintained. This process is generally called "color gamut reduction". Especially, many printers are rather narrower in color gamut than other devices. So, for a printer to print out an, the color reproducibility often depends upon which color gamut reduction technique is employed.

It is most common that a color gamut is reduced in a common color space independent of any device, especially in a color space suitable for human visual sensation (for example, CIE/L*C*h color space). More particularly, a color gamut may be reduced after an input color signal is converted to a device-independent color signal as shown in FIG. 4. Otherwise, as shown in FIG. 5, when a device profile is created, a color gamut conversion formula or a color gamut conversion table may be defined taking also a color gamut reduction in consideration, and a color gamut reduction may be effected simultaneously with converting a color signal on the basis of the device profile.

Next, the color gamut reduction will further be described below:

The human color vision has three attributes including a lightness, chroma and hue. Generally, the color gamut reduction is effected in a color space based on these three attributes of the human color vision. The color space includes, for example, a CIE/L*C*h color space. The L*C*h is a polar coordinate to which L*a*b* and L*u*v* are converted. The L* indicates a lightness, C* indicates a chroma and $\underline{h}$ indicates a hue. These three attributes can be handled as independent parameters.

The techniques of color gamut reduction effected in such a color space are generally classified into three kinds: one-, two- and three-dimensional color gamut reductions.

In the one-dimensional color gamut reduction, only one of lightness, chroma and hue is changed. Normally in this method, only the chroma should preferably be reduced while the lightness and hue are kept constant as shown in FIG. 6 (as having been suggested by R. S. Gentile, E. Walowit and J. P. Allebach in "A Comparison of Techniques for Color Gamut Mismatch Compensation", J. Imaging Tech., 16, pp. 176–181, (1990)).

In the two-dimensional color gamut reduction, two of lightness, chroma and hue are changed. Normally in this two-dimensional color gamut reduction, the chroma and lightness should preferably be reduced while the hue is kept constant. For the two-dimensional color gamut reduction, various techniques have been proposed. For example, E. G. Pariser proposed to reduce the chroma and lightness in the direction of (L*, a*, b*)=(50, 0, 0) with the hue kept constant as shown in FIG. 7 (in his "An Investigation of Color Gamut Reduction Techniques", IS&T Symp. Elec. Prepress Tech.—Color Printing, pp. 105–107. (1991)). Also, the Japanese Unexamined Patent Application Publication No. 9-98298 has disclosed a technique that a color gamut should be divided for each hue and each divided color gamut be mapped in an optimum color gamut reducing direction as shown in FIG. 8.

In the three-dimensional color gamut reduction, lightness, chroma and hue are reduced. For such a three-dimensional color gamut reduction, the Applicant of the present invention has disclosed in the Japanese Unexamined Patent Application Publication No. 10-84487 a method of color gamut reduction in which each of three terms (lightness difference, chroma difference and hue difference) in a color difference formula is weighted (with a reduction factor) and the color gamut is reduced in the direction of a minimum color difference.

The three-dimensional color gamut reduction will further be described below:

A perceptive difference between two colors, quantitatively given is called "color difference". On the assumption that two colors n the L*a*b* color space are ($L_1$, $a_1$, $b_1$) and ($L_2$, $a_2$, $b_2$), respectively, differences between attributes of each color can be given by the following equations (1-1) to (1-3), respectively, and a color difference $\Delta E$ can be given by the following equation (1-4):

$$\Delta L^* = L_2 - L_1 \qquad (1\text{-}1)$$

$$\Delta a^* = a_2 - a_1 \qquad (1\text{-}2)$$

$$\Delta b^* = b_2 - b_1 \qquad (1\text{-}3)$$

$$\Delta E = \{(\Delta L^*)^2 + (\Delta a^*)^2 + (\Delta b^*)^2\}^{1/2} \qquad (1\text{-}4)$$

To represent a color difference formula given by the equation (1-4) in a color space based on the three attributes of the human color vision, the chroma difference $\Delta C^*$ and hue difference $\Delta H^*$ are defined as given by the following equations (1-5) to (1-8):

$$C_1 = \{(a_1)^2 + (b_1)^2\}^{1/2} \qquad (1\text{-}5)$$

$$C_2 = \{(a_2)^2 + (b_2)^2\}^{1/2} \qquad (1\text{-}6)$$

$$\Delta C^* = C_2 - C_1 \qquad (1\text{-}7)$$

$$\Delta H^* = S \times \{2 \times (C_1 \times C_2 - a_1 \times a_2 - b_1 \times b_2)\}^{1/2} \qquad (1\text{-}8)$$

However, when $a_2 \times b_1 \geq a_1 \times b_2$ in the equation (1-8), s=1, and when $a_2 \times b_1 < a_1 \times b_2$, s=−1.

At this time, the color difference $\Delta E$ can be defined as given by the following equation (1-9):

$$\Delta E = \{(\Delta L^*)^2 + (\Delta C^*)^2 + (\Delta H^*)^2\}^{1/2} \qquad (1\text{-}9)$$

where $\Delta L^*$, $\Delta C^*$ and $\Delta H^*$ are differences in lightness, chroma and hue, respectively, between two colors. The smaller the color difference $\Delta E$ given by the equation (1-9), the smaller the perceptive difference between the two colors will be.

FIG. 9 shows an area where the color difference $\Delta E$ given by the equation (1-9) is constant (this area will be referred to as "constant color difference area" hereinafter), plotted for some typical points in a plane a*-b*. As shown in FIG. 9, the difference between a color indicated with a mark "x" and a color plotted along a circle enclosing the mark "x", namely, the color difference $\Delta E$ given by the equation (1-9), will be constant at all points along the circle. Note that although the constant color difference area plotted in the plane a*-b* is indicated with the circle in FIG. 9, when the color difference area is considered three-dimensionally (a lightness L* is also included), it will be given as a spatial sphere.

In the color gamut reduction disclosed in the Japanese Unexamined Patent Application Publication No. 10-84487, the three terms (lightness, chroma and hue differences) included in the color difference formula given by the equation (1-9) are weighted with factors $K_l$, $K_c$ and $K_h$ (reduction factors), respectively, and then reduced in the direction of minimum color differences. Namely, on the assumption that the color difference formula is given by the equation (1-10), the color gamut is reduced for the color difference $\Delta E$ given by the equation (1-10) to become minimum.

$$\Delta E = \{(\Delta L^*/K_l)^2 + (\Delta C^*/K_c)^2 + (\Delta H^*/K_h)^2\}^{1/2} \qquad (1\text{-}10)$$

When any of the reduction factors is given a large value, the reduction ratio for the attribute of a term corresponding to the large reduction factor becomes larger. This will be seen from FIG. 10. FIG. 10 shows that the color gamut reducing direction is changed by changing the reduction factor additionally put in the color difference formula. By changing the reduction factors $K_l$, $K_c$ and $K_h$ in this manner, it can be determined which one of the three attributes should be regarded as most important and reduced.

That is to say, for example, when one of the three reduction factors is given a large value, the color gamut reduction will be closer to the one-dimensional one. When two of the three reduction factors are made larger simultaneously, the color gamut reduction will be closer to the two-dimensional one. More specifically, as the reduction factor $K_l$ is increased, the reduction ratio will be larger in the direction of lightness. As the reduction factor $K_c$ is larger, the reduction ratio will be larger in the direction of chroma. Also, as the reduction factors $K_l$ and $K_c$ are made larger, mainly the lightness and chroma will be reduced while the hue is not so much changed. Namely, the color gamut reduction will be closer to the two dimensional one. When the reduction factors $K_l$, $K_c$ and $K_h$ are set to all one, the color difference will be equal to a one given by the equation (1-9).

FIG. 11 shows an example of the change of the constant color difference area in relation to the change of the reduction factor, and FIG. 12 shows another example of the change of the constant color difference area in relation to the change of the reduction factor. FIG. 11 shows a change of the constant color difference area when the reduction factor $K_c$ is increased. In FIG. 11, a dotted-line circle indicates a constant color difference area given by the color difference formula represented by the equation (1-9), and a solid-line ellipse indicates a constant color difference area given by the color difference formula represented by the equation (1-10) in which the reduction factor $K_c$ is increased. FIG. 12 shows a change of the constant color difference area when the reduction factor $K_h$ is increased. In FIG. 12, a dotted-line circle indicates a constant color difference area given by the color difference formula represented by the equation (1-9), and a solid-line ellipse indicates a constant color difference area given by the color difference formula represented by the equation (1-10) in which the reduction factor $K_h$ is increased.

As will also be seen from FIGS. 11 and 12, when the color difference formula is defined like the equation (1-10) using the reduction factors $K_l$, $K_c$ and $K_h$, the constant color difference area can be changed by changing the reduction factors $K_l$, $K_c$ and $K_h$. Thus, it can be determined which one of the three attributes should be regarded as most important and reduced.

Normally in the one- and two-dimensional color gamut reductions, the color gamut is reduced with the hue kept constant. For an image in colors of which many are outside the color gamut, however, the color gamut has to be reduced more in the direction of lightness or chroma. However, since the reduction of the color gamut of an image in the direction of lightness will reduce the contrast of the image, the more reduction of the color gamut in the direction of lightness will cause the whole image to lose a third dimension. On the other hand, the reduction of the color gamut in the direction of chroma will lower the definition of the image. So, if the color gamut is reduced more in the direction of chroma will cause the image to give a reduced impact. Especially, if the one- or two-dimensional color gamut reduction is applied to an image created by the computer graphic, namely, an image having an extremely high chroma and a third dimension, these features of the image will be lost to a considerable extent.

To apply a color gamut reduction to an image while maintaining such features thereof, the reduction ratio in the directions of lightness and chroma should be small while the hue is changed to some extent. This can be attained by the three-dimensional color gamut reduction.

However, the three-dimensional color gamut reduction is also disadvantageous in that a certain color will be changed too much in the direction of hue. This phenomenon will remarkably take place in the blue area. If the three-dimensional color gamut reduction is applied to an image including a blue area, the image will have only the blue area thereof appearing reddish. Note that this phenomenon will be a problem also in the one- and two-dimensional color gamut reductions as the case may be.

The cause for the blue area to appear reddish is that the hue of the blue area in a color space in which the color gamut is reduced has a considerable non-linearity. For example, in the CIE/L*a*b* color space, the hue line of the blue area is considerably bent. FIG. 13 shows a data prepared in the Munsell V3, plotted in the CIE/L*a*b* color space. The Munsell data was prepared on the basis of the human visual sensation, so that a Munsell data should be able to be linearly plotted radially in a color space which is based on the human visual sensation. In the CIE/L*a*b* color space, especially, in the blue area, however, the locus delineated by points derived from plotting of the Munsell data is a curve, from which it is known that in the CIE/L*a*b* color space, the hue line of the blue area is considerably bent. To improve the color reproducibility in an area in which the hue line is bent, the color gamut has to be reduced with the bending of the hue line taken in consideration.

OBJECT AND SUMMARY OF THE INVENTION

It is therefore an object of the present invention to overcome the above-mentioned drawbacks of the prior art by providing an image processing apparatus and method, capable of reducing, when the color gamut of an output system is different from that of an input system, the color gamut of a color signal not falling in the output system color gamut to provide a color near to that in the input system.

It is another object of the present invention to provide a color gamut conversion table creating apparatus and method, adapted to create a color gamut conversion table for use to reduce a color gamut.

It is a still another object of the present invention to provide a recording medium having recorded therein an image processing program in accordance with which a color gamut is reduced.

It is a yet another object of the present invention to provide a recording medium having recorded therein a color gamut conversion table creating program in accordance with which a color gamut conversion table for use to reduce a color gamut is created.

In the color gamut reduction method disclosed in the Applicant's Japanese Unexamined Patent Application Publication No. 10-84487, the color difference formula given by the equation (1-10) is used to reduce the color gamut in the direction of a minimum color difference ΔE.

$$\Delta E = \{(\Delta L^*/K_l)^2 + (\Delta C^*/K_c)^2 + (\Delta H^*/K_h)^2\}^{1/2} \qquad (1\text{-}10)$$

On the other hand, according to the present invention, the color difference formula is defined as given by the following equations (2-1) and (2-2), and the color gamut reduction is made in the direction of a minimum color difference ΔE given by the equation (2-1) or (2-2). By thus improving the color difference formula for use to reduce a color gamut, it is made possible to take the bending of the hue line in the color space in consideration, thereby permitting to reproduce a color with a higher accuracy.

$$\Delta E = \left\{ [\Delta L^* \; \Delta C^* \; \Delta H^*] \begin{bmatrix} Kll & Klc & Klh \\ Kcl & Kcc & Kch \\ Khl & Khc & Khh \end{bmatrix} \begin{bmatrix} \Delta L^* \\ \Delta C^* \\ \Delta H^* \end{bmatrix} \right\}^{1/2} \quad (2\text{-}1)$$

$$\Delta E = \sqrt{\left(\frac{\Delta L^*}{Kl}\right)^2 + \left(\frac{\Delta C^*}{Kc}\right)^2 + \left(\frac{\Delta H^*}{Kh}\right)^2 + \left(\frac{\Delta L^* \cdot \Delta C^*}{Klc}\right) + \left(\frac{\Delta C^* \cdot \Delta H^*}{Kch}\right) + \left(\frac{\Delta H^* \cdot \Delta L^*}{Khl}\right)} \quad (2\text{-}2)$$

where ΔL* is a difference in lightness; ΔC* is a difference in chroma; ΔH* is a difference in hue; and $K_l$, $K_c$, $K_h$, $K_{ll}$, $K_{lc}$, $K_{lh}$, $K_{cl}$, $K_{cc}$, $K_{ch}$, $K_{hl}$, $K_{hc}$ and $K_{hh}$ are predetermined constants, respectively, or functions of a lightness L*, chroma C* and hue h*, respectively.

By defining the color difference formula as given by the equation (2-1) or (2-2), the constant color difference area can freely be changed correspondingly to the hue or the like. This is shown in FIGS. 14 to 17. In FIGS. 14 to 17, a dotted-line ellipse indicates an example of the constant color difference area for which the color difference formula is defined as given by the equation (1-10). In FIGS. 14 and 15, a solid-line ellipse indicates an example of the constant color difference area of which the direction is changed by putting a term (ΔL*, ΔC*) in the color difference formula. In FIG. 16, a solid-line ellipse indicates an example of the constant color difference area of which the direction is changed by putting a term (ΔC*, ΔH*) in the color difference formula. In FIG. 17, a solid-line ellipse indicates an example of the constant color difference area of which the direction is changed by defining $K_{ch}$ as functions of the chroma C* and hue h.

By putting the term (ΔL*·ΔC*) in the color difference formula, the constant color difference area can be directed towards the directions of lightness L* and chroma C* while the hue his kept constant. Further, by defining $K_{lc}$ as a function of the lightness L*, it is also made possible to change an area having a high lightness L* in the direction of a lower lightness and an area having a low lightness L* in the direction of a higher lightness, as shown in FIG. 14.

Therefore, by defining the color difference formula as given by the equation (2-1) or (2-2), the constant color difference area can also be directed towards a point as shown in FIG. 15, for example. Thus, as in the two-dimensional color gamut reduction in which a color gamut is reduced in the direction of (L*,a*,b*)=(50, 0, 0), for example, the color gamut can be reduced in the direction of a certain point even when the three-dimensional color gamut reduction is adopted.

Also, by putting the term (ΔC*·ΔH*) in the color difference formula, the direction towards the achromatic axis of the constant color difference area can also be changed to another direction as shown in FIG. 16. The putting of the term (ΔC*·ΔH*) in the color difference formula is a very effective means for compensation of the bending of the hue line. Especially by defining $K_{ch}$ as a function of the hue h, it is also made possible to change the amount of compensation of the bending of the hue line for each hue. That is, by defining $K_{ch}$ as a function of the hue h to provide a larger amount of compensation for an area such as the blue area in which the hue line is much bent while providing a small amount of compensation for an area in which the hue line is not much bent, the color gamut can be reduced correspondingly to a bending of the hue line.

By defining $K_{ch}$ as functions of the chroma C* and hue h, the color difference formula can also be defined for the constant color difference area to extent along the bent hue line as shown in FIG. 17. This is very effective for compensation of the blue area in the color gamut reduction. By defining $K_{ch}$ as functions of chroma C* and hue h, it is made possible to solve the problem that when a color gamut is reduced, the direction of the constant color difference area is changed excessively in the direction of the hue in the blue area.

According to the present invention based on the principle having been described in the foregoing, there is provided an image processor adapted to convert, for outputting, an image from a predetermined input device to an image corresponding to the color gamut of a corresponding output device, the image processor including means for reducing, when the output device color gamut is different from the color gamut of the input device, the color gamut of a color signal outside the output device color gamut in the direction of a minimum value of the color difference formula given by the above equation (2-1) or (2-2).

According to the present invention, there is also provided an image processing method of reducing, if the color gamut of an output device is different from that of an input device when converting, for outputting, an image from a predetermined input device is converted to an image corresponding to the color gamut of a corresponding output device, the color gamut of a color signal outside the output device color gamut in the direction of a minimum value of the color difference ΔE given by the equation (2-1) or (2-2).

According to the present invention, there is also provided a color gamut conversion table creating apparatus adapted to create a color gamut conversion table to which reference is made when converting, for outputting, an input color signal from a predetermined input device to a color signal corresponding to the color gamut of a predetermined output device, the apparatus including a color gamut conversion table creating means for reducing the color gamut of any of colors inside the color gamut of an input device color gamut, not inside the color gamut of an output device, in the direction of a minimum color difference ΔE given by the equation (2-1) or (2-2) to have the color correspond to a color inside the output device color gamut, and creating, on the basis of the result of the correspondence, a color gamut conversion table showing relations between input device color signals and output device color signals.

According to the present invention, there is also provided a color gamut conversion table creating method adapted to create a color gamut conversion table to which reference is made when converting, for outputting, an input color signal from a predetermined input device to a color signal corresponding to the color gamut of a predetermined output device, the method including a step of reducing the color gamut of any of colors inside the color gamut of an input device color gamut, not inside the color gamut of an output device, in the direction of a minimum color difference ΔE given by the equation (2-1) or (2-2) to have the color correspond to a color inside the output device color gamut and create, on the basis of the result of the correspondence, a color gamut conversion table showing relations between input device color signals and output device color signals.

According to the present invention, there is also provided a recording medium having recorded therein an image processing program in accordance with which an image from a predetermined input device is converted to an image corresponding to the color gamut of a predetermined output device, the program being such that when the color gamut of the output device is different from that of the input device, the color gamut of a color signal outside the output device color gamut is reduced in the direction of a minimum color difference ΔE given by the equation (2-1) or (2-2).

According to the present invention, there is also provided another recording medium having recorded therein a color gamut conversion table creating program in accordance with which there is created a color gamut conversion table to which reference is made when converting, for outputting, an input color signal from a predetermined input device to a color signal corresponding to the color gamut of a predetermined output device, the program being such that the color gamut of any of colors inside the color gamut of an input device color gamut, not inside the color gamut of an output device, is reduced in the direction of a minimum color difference ΔE given by the equation (2-1) or (2-2) to have the color correspond to a color inside the output device color gamut and create, on the basis of result of the correspondence, a color gamut conversion table showing relations between input device color signals and output device color signals.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 8 shows another example of color gamut reducing direction in the two-dimensional color gamut reduction being one of the conventional color gamut reduction techniques;

FIG. 18 shows an example of the forward lookup table included in a color gamut conversion table;

FIG. 19 shows an example of the backward lookup table included in the color gamut conversion table;

FIG. 22A shows a cube in the CMY color space and FIG. 22B shows an example of the shape the cube will have when areas thereof are plotted in the $L^*a^*b^*$ color space;

DETAILED DESCRIPTION OF THE PREFERRED EMBODIMENTS

Figure 1:
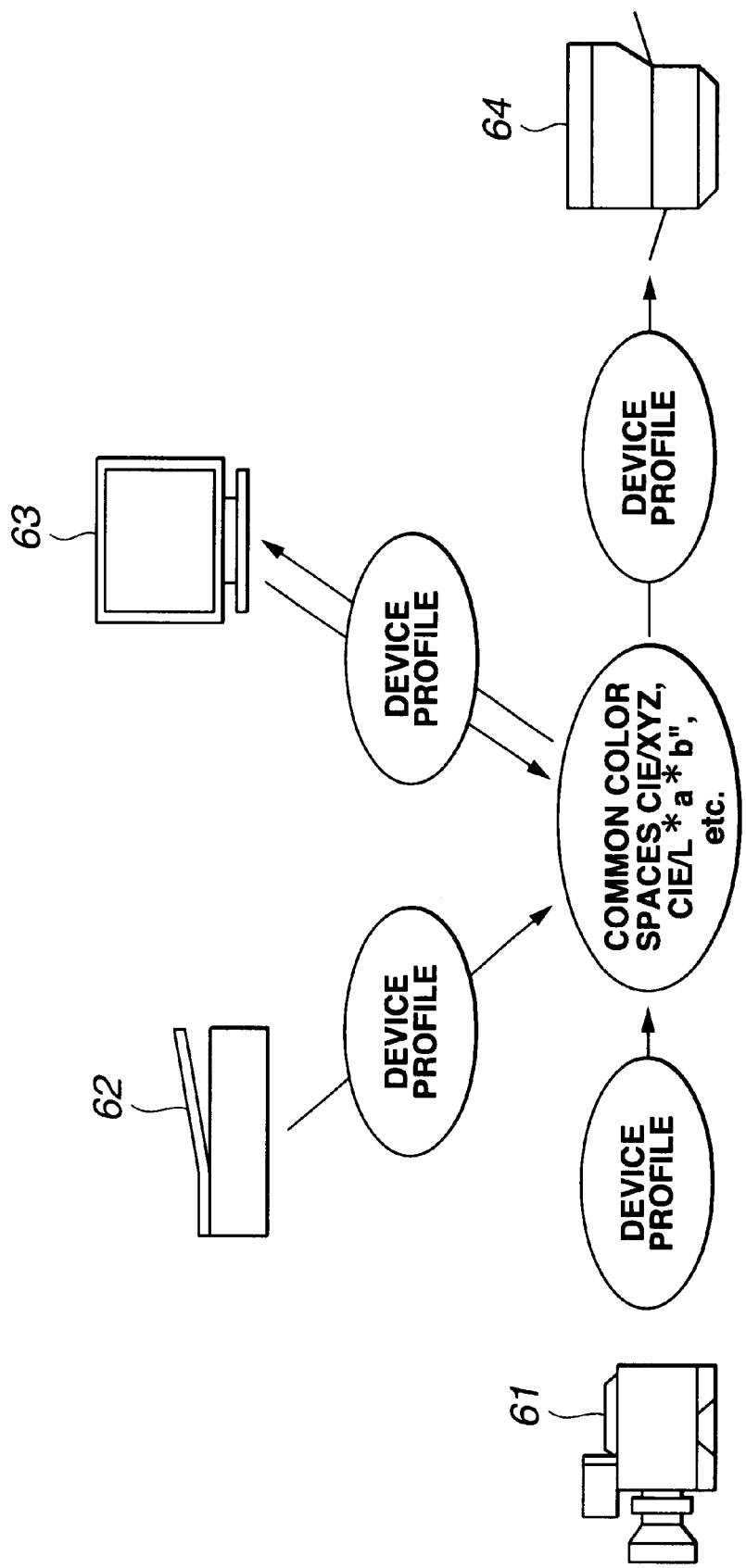
FIG. 1 shows the concept of the color management system.
Figure 2:
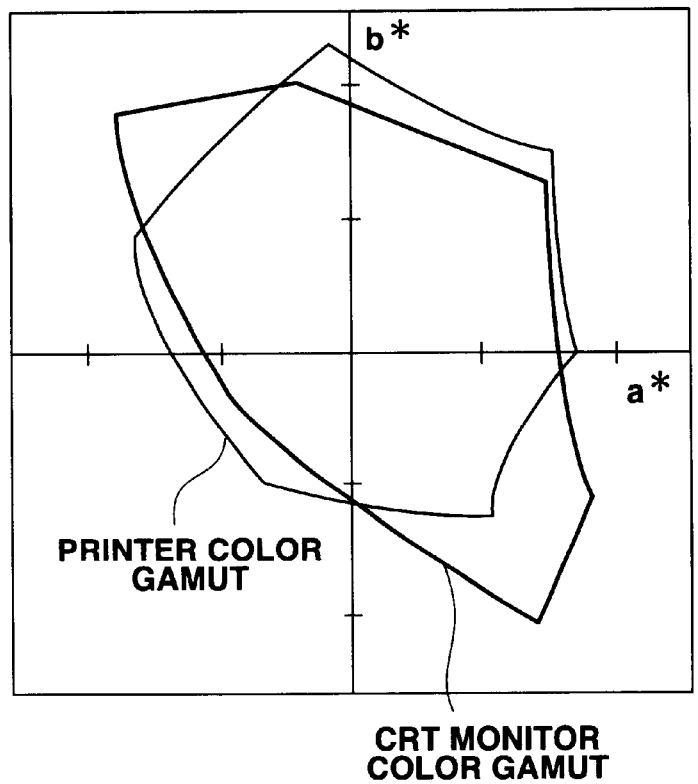
FIG. 2 shows a typical color gamut of CRT monitor and a typical color gamut of printer, integrated in the direction of $L^*$ and plotted in a plane $a^*$-$b^*$.
Figure 3:
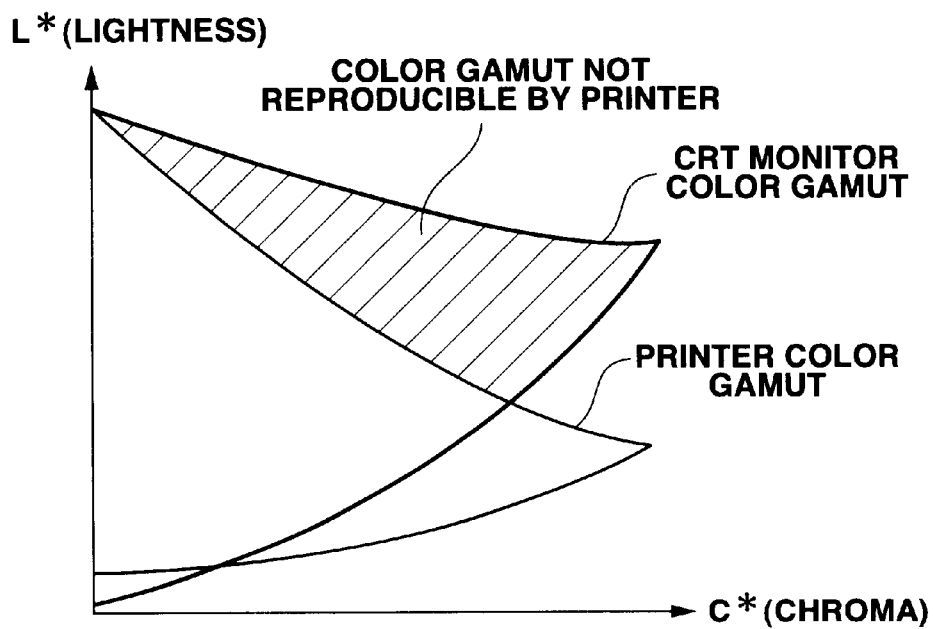
FIG. 3 shows the typical color gamut of CRT monitor and that of printer, plotted in a plane $C^*$-$L^*$.
Figure 4:
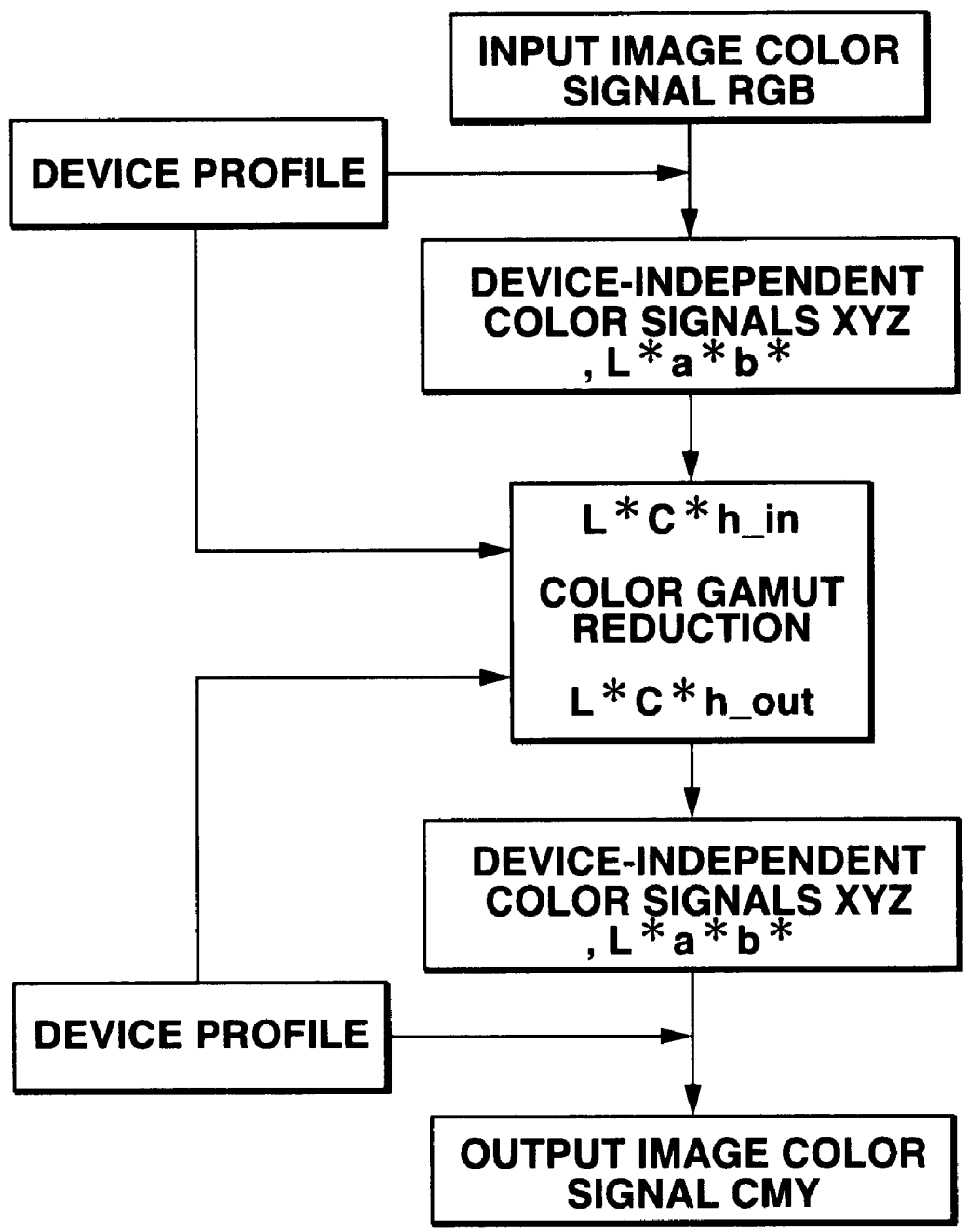
FIG. 4 shows a procedure for signal conversion, followed when an color gamut reduction is done after an input color signal is converted to a device-independent color signal.
Figure 5:
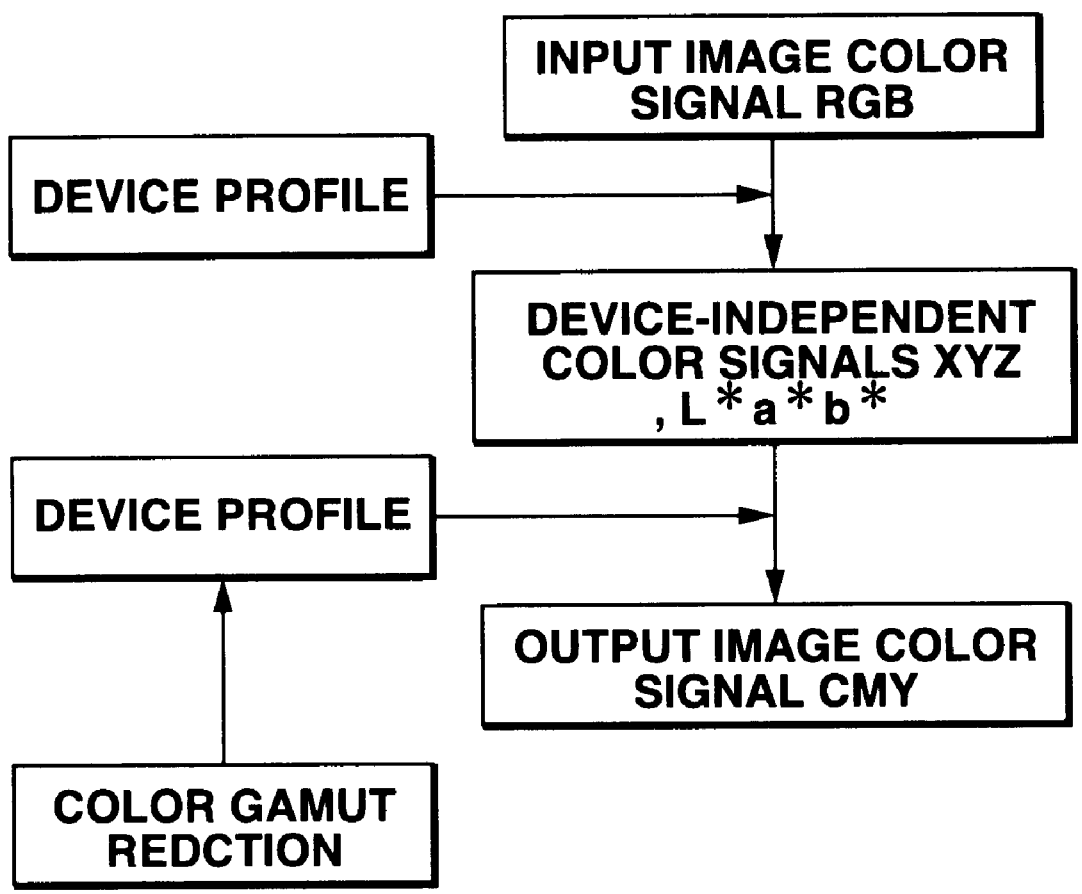
FIG. 5 shows a procedure for signal conversion, followed when a color gamut reduction is simultaneously done in converting a color signal based on a device profile.
Figure 6:
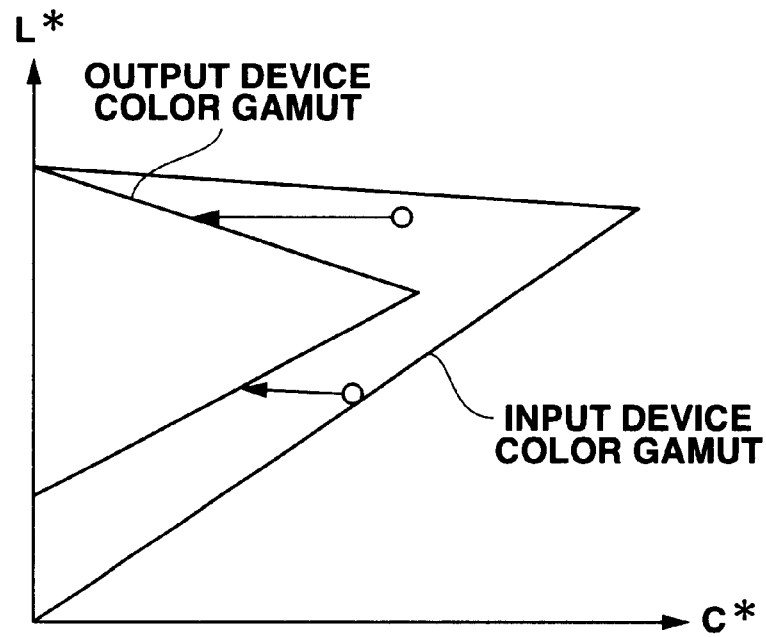
FIG. 6 shows an example of color gamut reducing direction in a one-dimensional color gamut reduction being one of the conventional color gamut reduction techniques.
Figure 7:
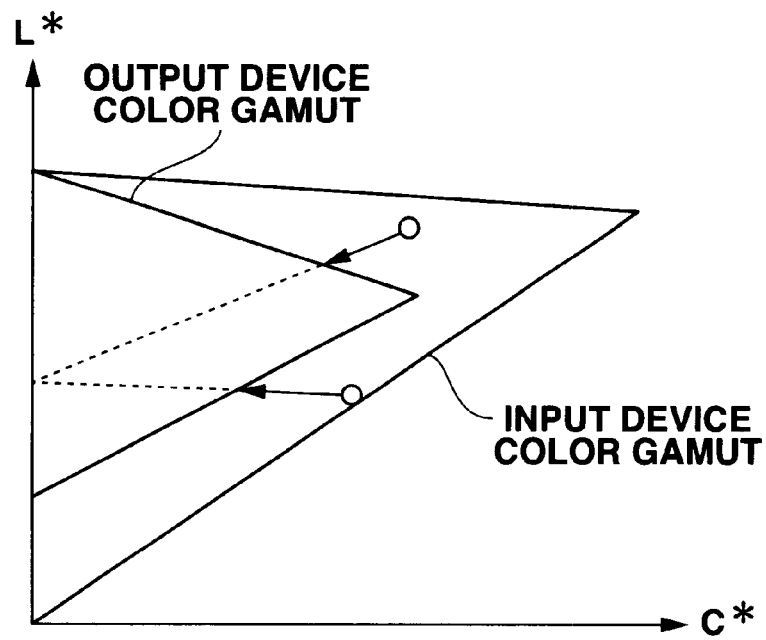
FIG. 7 shows an example of color gamut reducing direction in a two-dimensional color gamut reduction being one of the conventional color gamut reduction techniques.
Figure 9:
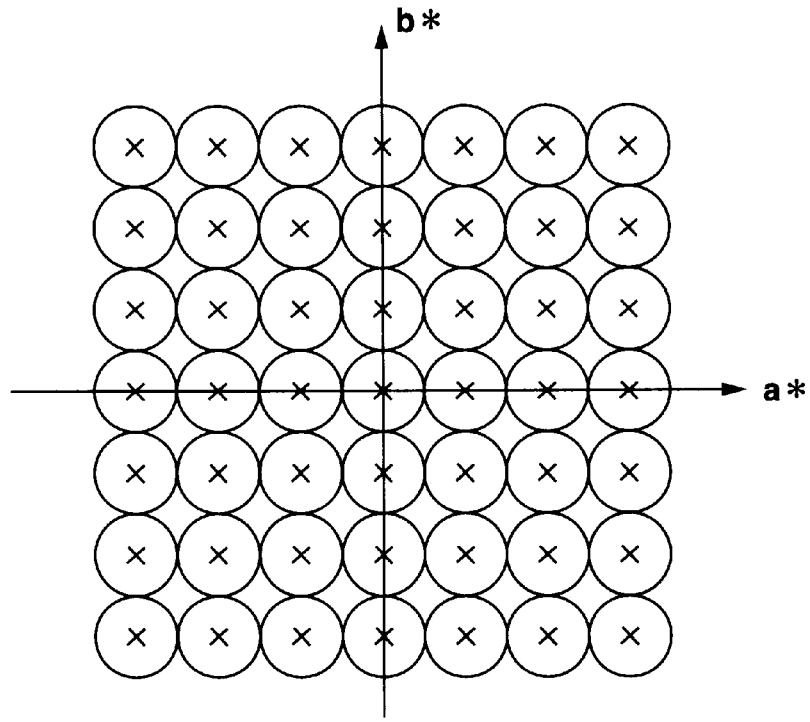
FIG. 9 shows a constant color difference area plotted for some typical points in a plane $a^*$-$b^*$.
Figure 10:
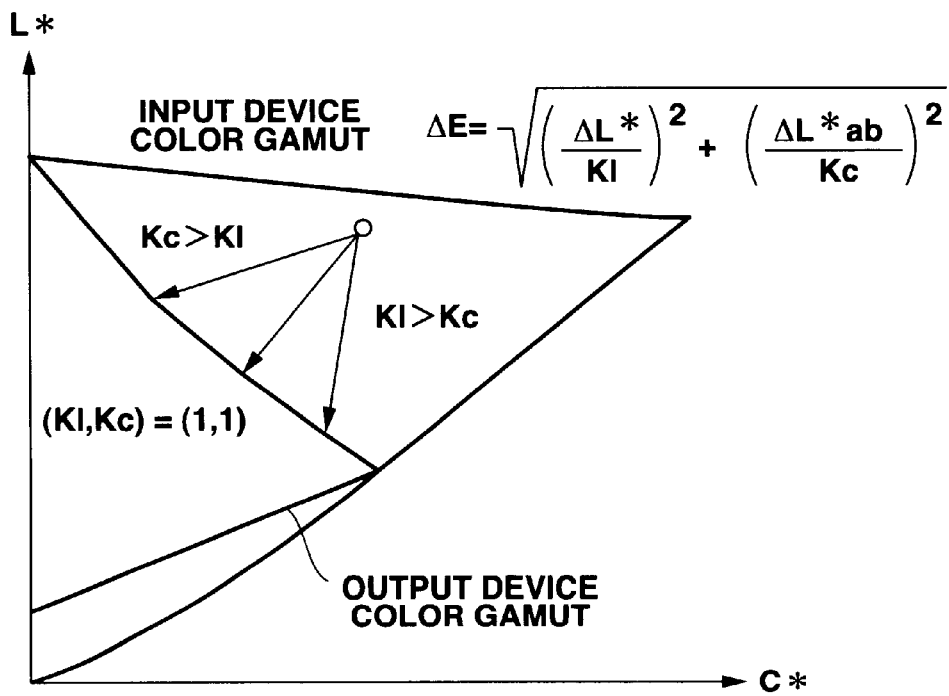
FIG. 10 shows that the direction in which the color gamut is reduced is changed by changing the reduction factor additionally put in the color difference formula.
Figure 11:
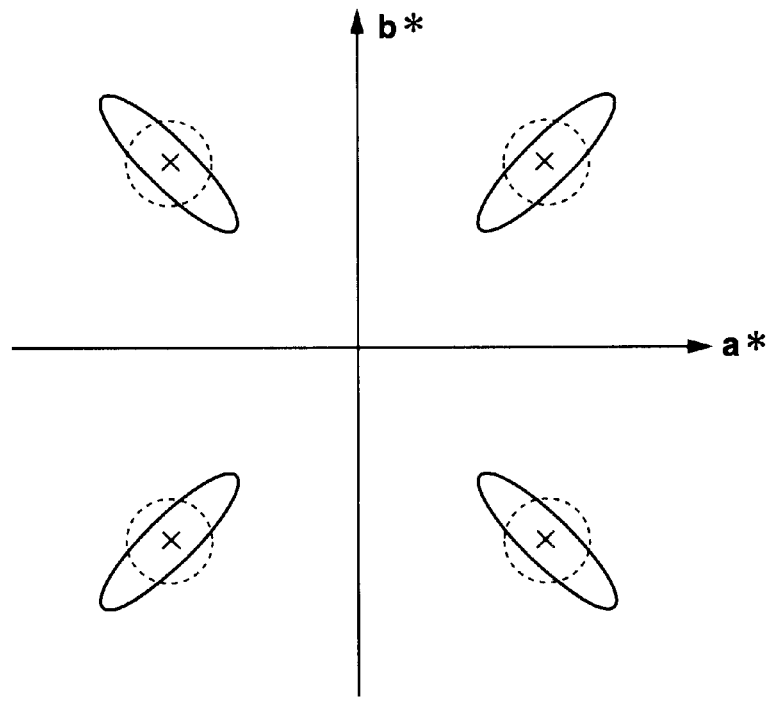
FIG. 11 shows an example of the change of the constant color difference area in relation to the change of the reduction factor.
Figure 12:
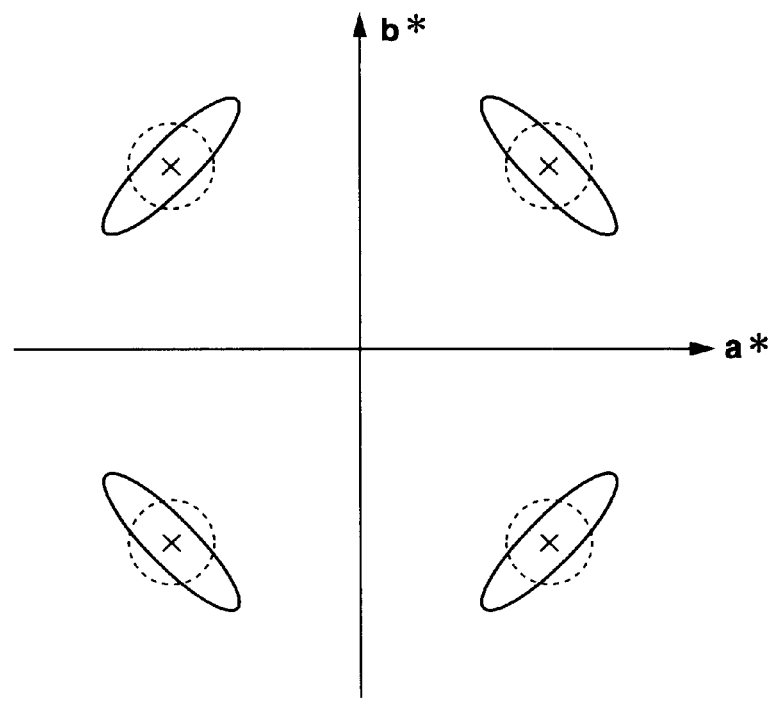
FIG. 12 shows another example of the change of the constant color difference area in relation to the change of the reduction factor.
Figure 13:
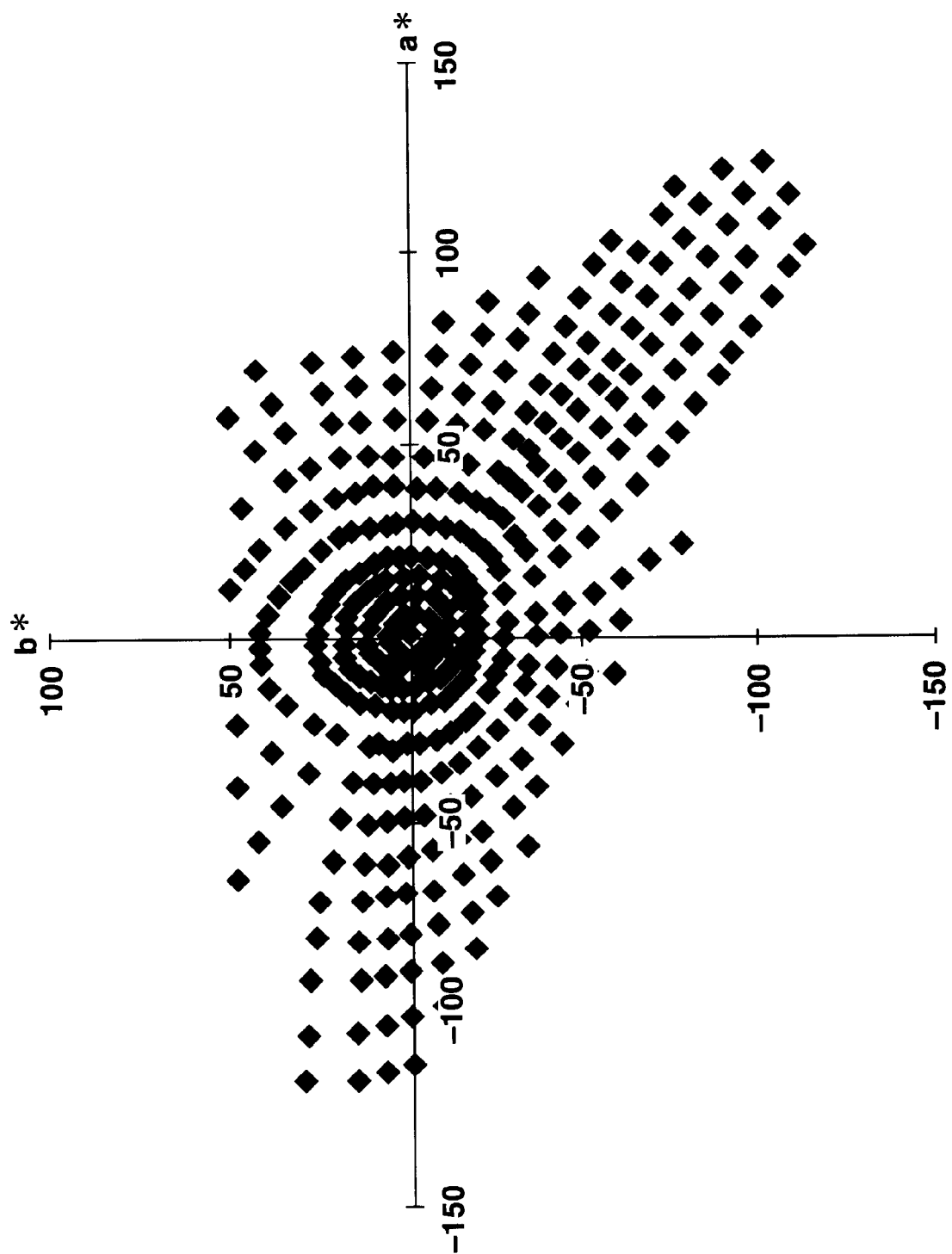
FIG. 13 shows a data in the Munsell V3, plotted in the CIE/$L^*a^*b^*$ color space.
Figure 14:
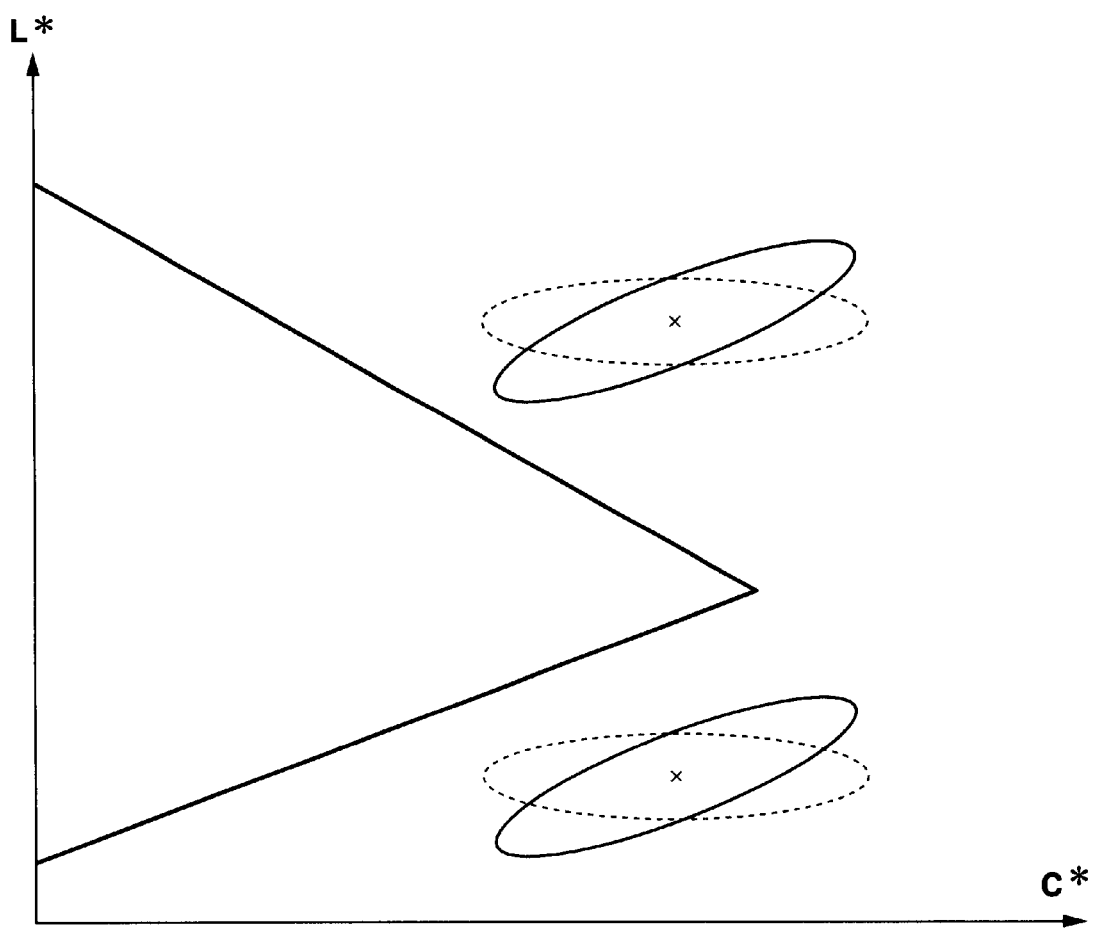
FIG. 14 shows an example that a term ($\Delta L^*$, $\Delta C^*$) is put in the color difference formula to turn the constant color difference area towards the lightness $L^*$ and chroma $C^*$ while the hue h is being kept constant.
Figure 15:
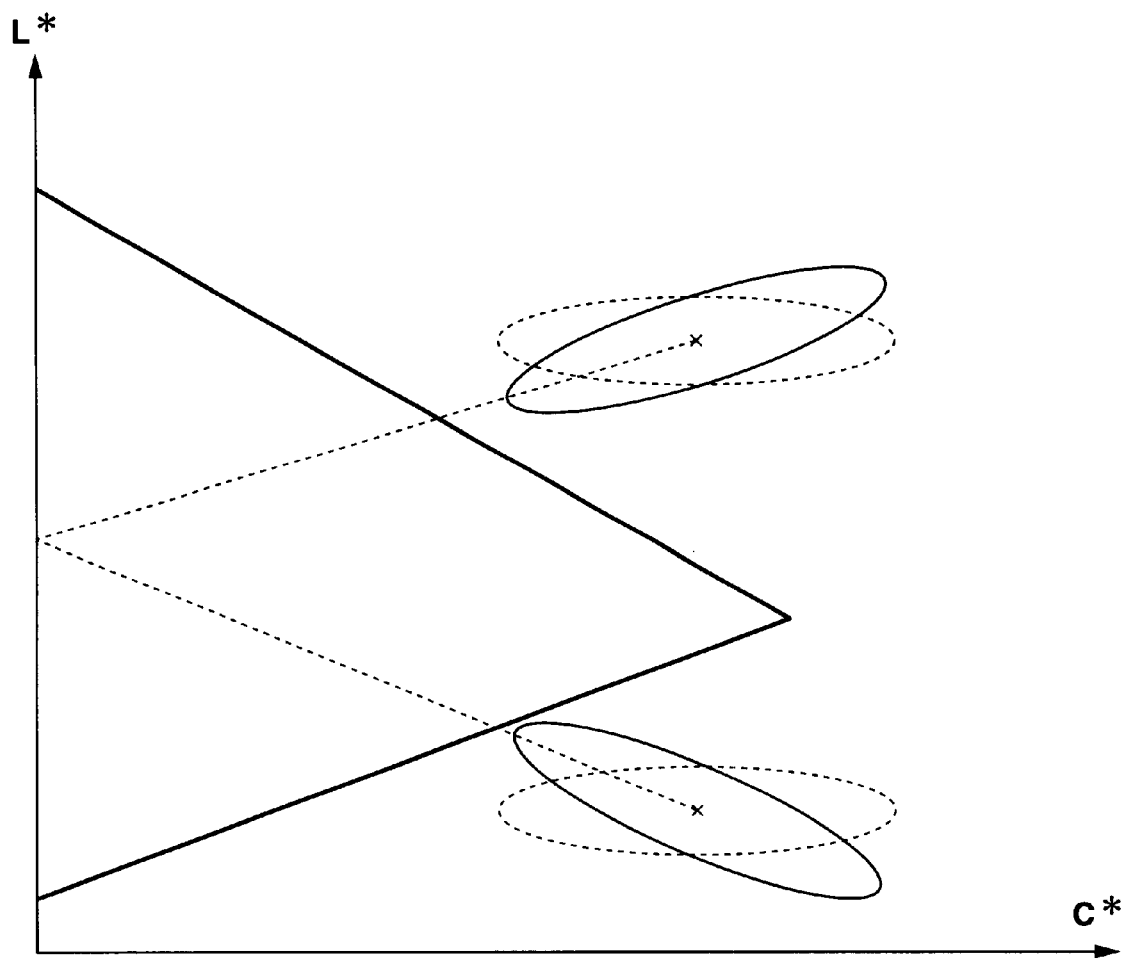
FIG. 15 shows an example that a term ($\Delta C^*$, $\Delta H^*$) is put in the color difference formula to turn the constant color difference area towards a certain point.
Figure 16:
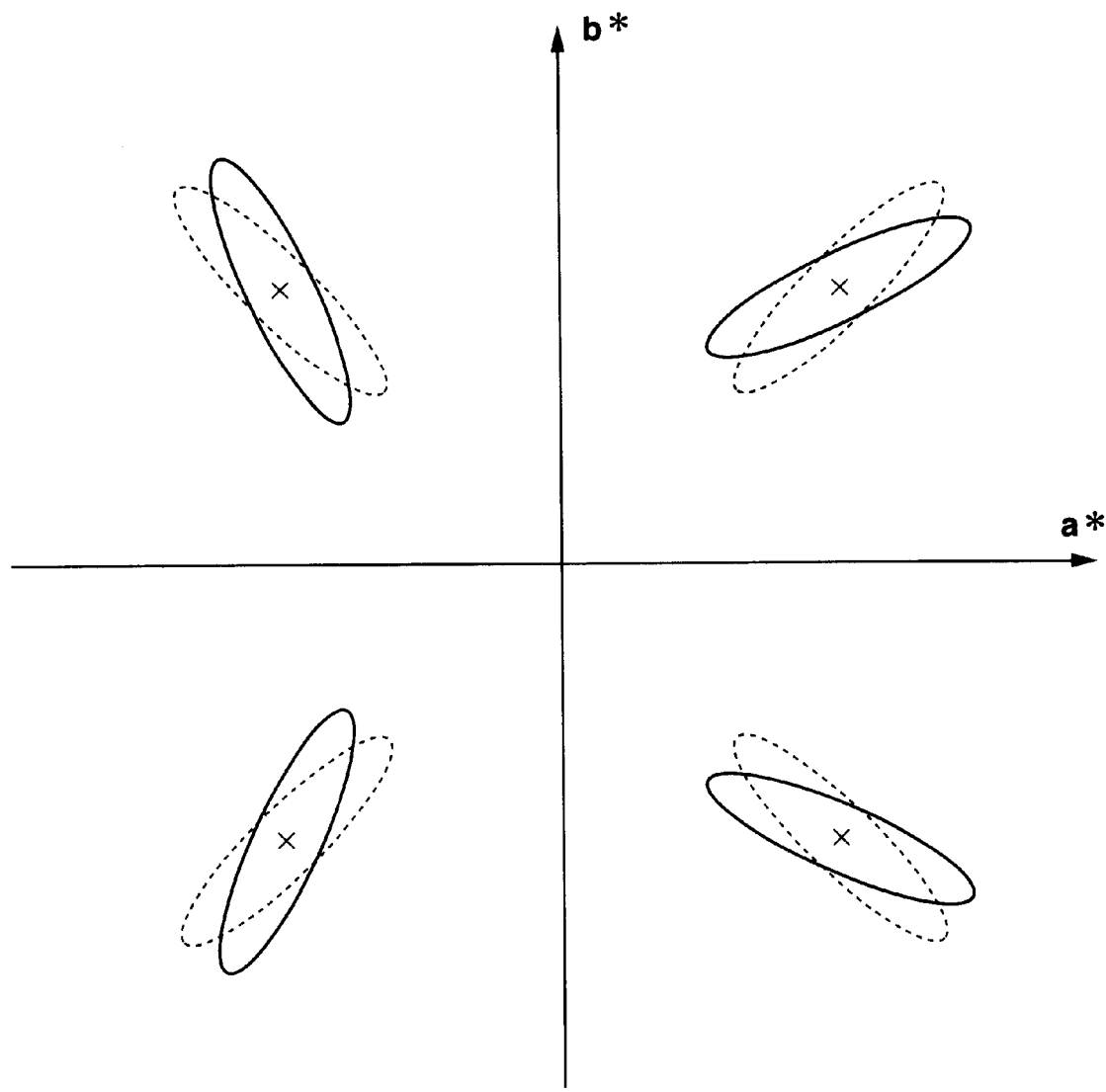
FIG. 16 is an example that a term ($\Delta L^*$, $\Delta C^*$) is put in the color difference formula to turn the constant color difference area from a direction towards the achromatic axis to another direction.
Figure 17:
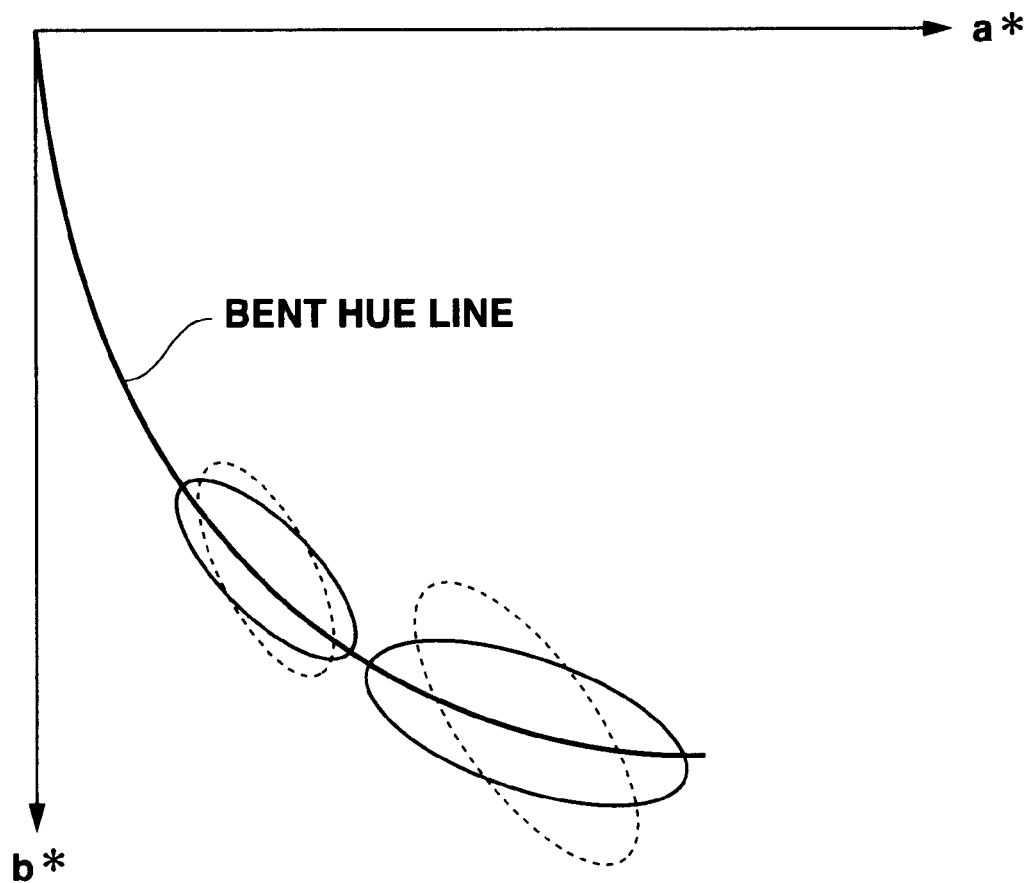
FIG. 17 shows an example that $K_{ch}$ is defined as functions of the chroma $C^*$ and hue $\underline{h}$ to have the constant color difference area extend along a bent hue line.

First of all, the color gamut conversion table creating method according to the present invention will be described concerning a color gamut conversion table for use to convert a color signal between a color signal in a device-independent color space (will be referred to as "chromatic signal" hereinafter) and a color signal in a device-dependent color space (will be referred to as "device signal" hereinafter), by way of example. Note that the color gamut conversion table is a table stored in a device profile set for each device to implement a device-independent color. It is also called "lookup table".

Also it is assumed here that the device is a one which reproduces a color in C (cyan), M (magenta) and Y (yellow), such as a color printer or the like. Therefore, the device signal is a CMY signal corresponding to the CMY color space. On the other hand, it is assumed that the chromatic signal is an $L^*a^*b^*$ signal corresponding to the CIE/$L^*a^*b^*$ color space. Note that although the color space of the chromatic signal referred to herein is the CIE/$L^*a^*b^*$ color space, the color space may of course be any one not dependent upon the device, such as CIE/XYZ, CIE/$L^*C^*h$ or the like.

The color gamut conversion table has to include two tables for each device to convert a color gamut in two different directions. One of the two color gamut conversion tables is intended for conversion of a device signal to a chromatic signal. This table will be referred to as "forward lookup table" hereinafter, and the other table will be referred to as "backward lookup table" hereinafter.

An example of the forward lookup table is shown in FIG. 18, and an example of the backward lookup table is shown in FIG. 19. In FIGS. 18 and 19, each CMY signal component takes values of 0, 1, . . . , 254 and 255, while a component $L^*$ an $L^*a^*b^*$ signal takes value of 0, 1, . . . , 99 and 100, a component $a^*$ takes values of −128, −127, . . . , 127 and 128, and a component $b^*$ takes values of −128, −127, . . . , 127 and 128.

To create these color gamut conversion tables, first a colorimeter or the like is used to measure the chromatic values in the CIE/$L^*a^*b^*$ color space of a number $N^3$ of color patches disposed evenly in the CMY color space. The forward lookup table includes these measured data themselves. That is, a correspondence between a value of each CMY signal component corresponding to the CMY color space and a value of each $L^*a^*b^*$ signal component corresponding to the CIE/$L^*a^*b^*$ color space, is determined and the correspondence thus determined is registered in the forward lookup table. Thus, there is provided the forward lookup table having registered therein the value of each $L^*a^*b^*$ signal component corresponding to the CMY signal as shown in FIG. 18.

For the above measurement, the color patches may be disposed in any way, but they should desirably be disposed to sufficiently fill a device color gamut. When there is available only a small number of measuring points, however, the measuring points may be interpolated based on the measured data to increase the number of data for registration into the forward lookup table.

On the other hand, the backward lookup table is a table obtained by reversely converting a forward lookup table created as in the above. Assume here that the L*a*b* color space (a color space defined, for example, under the conditions $0 \leq L^* \leq 100$, $-128 \leq a^* \leq 128$ and $-128 \leq b^* \leq 128$) is evenly divided into $M^3$ pieces. Then, the backward lookup table will have a value of each corresponding CMY signal component, registered at each of grids at which lines of diving the L*a*b* color space intersect each other. The color gamut reduction is effected for creation of such a backward lookup table.

Next, how to create such a backward lookup table according to the present invention will be described with reference to the flow chart shown in FIG. 20. Note that a backward lookup table will be created based on the above-mentioned chromatic values. Namely, $N^3$ pieces of color patches disposed regularly in the CMY color space are measured as to their chromatic values in the CIE/L*a*b* color space, and a backward lookup table is created from the measured results.

Figure 21A:
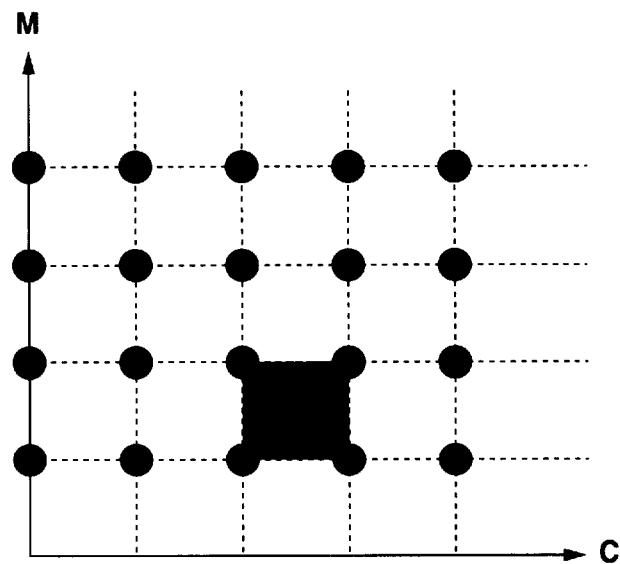
FIG. 21A shows an example that colorimetric data of a color patch is plotted in a CMY color space and FIG. 21B shows an example that the colorimetric data is plotted in an $L^*a^*b^*$ color space.
Figure 21B:
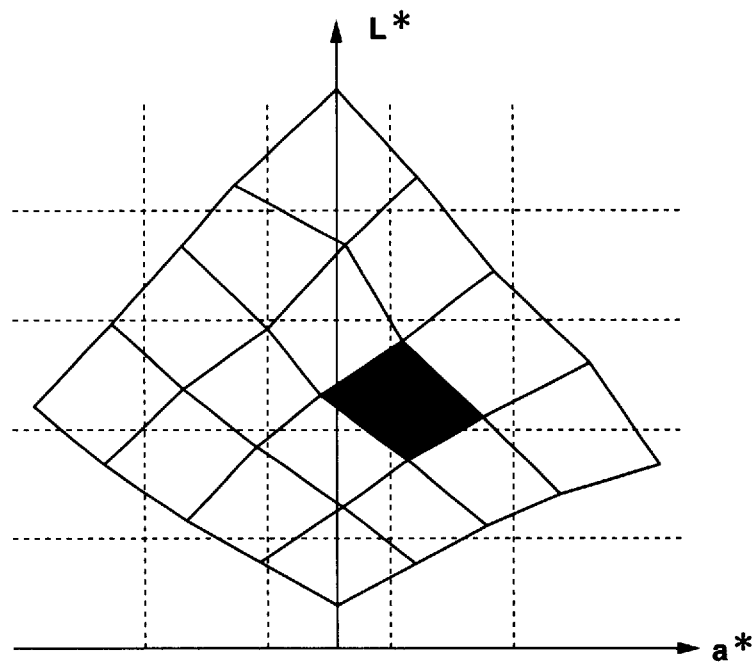

The $N^3$ pieces of measured data are regularly disposed in the CMY color space as shown in FIG. 21A. However, when they are plotted in the L*a*b* color space, they are irregularly disposed as shown in FIG. 21B. For creation of a backward lookup table, the L*a*b* color space will be divided into the $M^3$ pieces, and a value of each CMY signal component corresponding to each of the grids at which the dividing lines intersect each other will be determined. As shown in FIG. 21, however, all the grids area not within the color gamut of the CMY color space corresponding to the device. Therefore, first at step S1, it is judged whether the grids in the L*a*b* color space are inside the color gamut of the CMY color space corresponding to the device.

For this judgment, $(N-1)^3$ cubes corresponding to $N^3$ measured data in the CMY color space as shown in FIG. 22A will be considered here. When an area corresponding to this cube is taken into the L*a*b* color space, it will be a distorted hexahedron as shown in FIG. 22B. Note that in FIG. 22, only one cube in the CMY color space and only one hexahedron in the L*a*b* color space are shown for the simplicity of the illustration. However, it should be assumed that actually there are $(N-1)^3$ cubes and $(N-1)^3$ hexahedrons in the CMY color space and L*a*b* color space, respectively.

Figure 23A:
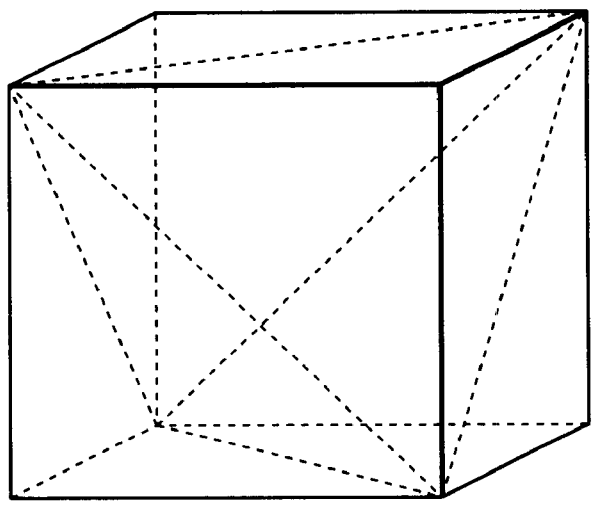
FIGS. 23A and 23B show examples, respectively, of a hexahedron divided into five tetrahedrons.
Figure 23B:
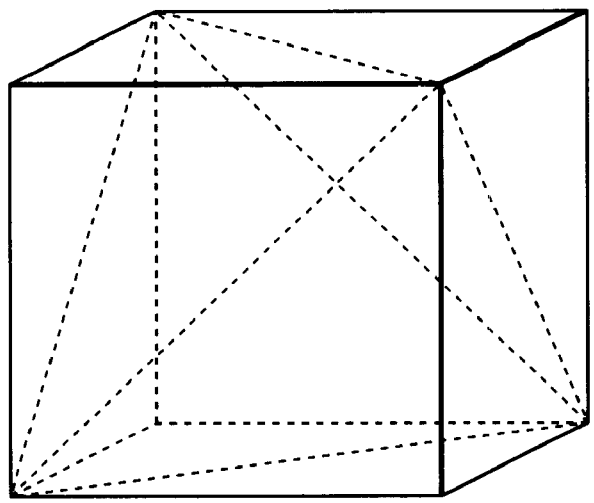

Then, each hexahedron is divided into five cubes as shown in FIGS. 23A and 23B, and it is judged whether the grid in the L*a*b* color space is included in any of the cubes assumed in the L*a*b* color space. If the grid in the L*a*b* color space is inside any of the cubes, a color corresponding to the grid will exist inside the color gamut of the CMY color space corresponding to the device. In this case, the operation goes to step S2 where it is search in which of the cubes the grid exists.

Figure 24:
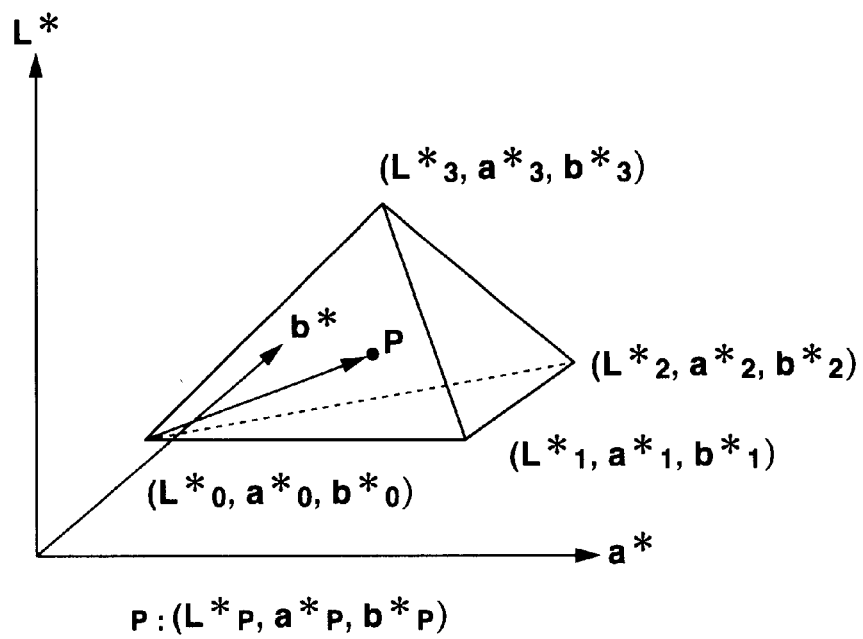
FIG. 24 shows coordinates of vertexes of a tetrahedron in the $L^*a^*b^*$ color space, and on-grid points in the $L^*a^*b^*$ color space.

Assume that a point on the grid in the L*a*b* color space is P (L*, a*, b*) and coordinates of the vertexes of a tetrahedron in the L*a*b* color space are $(L^*_p, a^*_p, b^*_p)$, $(L^*_0, a^*_0, b^*_0)$, $(L^*_1, a^*_1, b^*_1)$, $(L^*_2, a^*_2, b^*_2)$ and $(L^*_3, a^*_3, b^*_3)$, respectively, as shown in FIG. 24. In this case, if the point P is included in the tetrahedron, $\alpha \geq 0$, $\beta \geq 0$, $\gamma \geq 0$ and $\alpha + \beta + \gamma \leq 1$ hold in the following equation (3-1):

$$\begin{bmatrix} \alpha \\ \beta \\ \gamma \end{bmatrix} = \begin{bmatrix} L^*_1 - L^*_0 & L^*_2 - L^*_0 & L^*_3 - L^*_0 \\ a^*_1 - a^*_0 & a^*_2 - a^*_0 & a^*_3 - a^*_0 \\ b^*_1 - b^*_0 & b^*_2 - b^*_0 & b^*_3 - b^*_0 \end{bmatrix}^{-1} \begin{bmatrix} L^*_p - L^*_0 \\ a^*_p - a^*_0 \\ b^*_p - b^*_0 \end{bmatrix} \quad (3\text{-}1)$$

Therefore, by examining whether $\alpha \geq 0$, $\beta \geq 0$, $\gamma \geq$ and $\alpha + \beta + \gamma \leq 1$ hold in the equation (3-1), it is made possible to judge whether the grid in the L*a*b* color space is inside the tetrahedron.

The tetrahedron in the L*a*b* color space corresponds one to one to a one in the CMY color space. Therefore, if $\alpha \geq 0$, $\beta \geq 0$, $\gamma \geq 0$ and $\alpha + \beta + \gamma \leq 1$ hold in any one of the tetrahedrons in the L*a*b* color space, the point P on the grid in the L*a*b* color space will be included in a color gamut of the CMY color space corresponding to the device.

Figure 25:
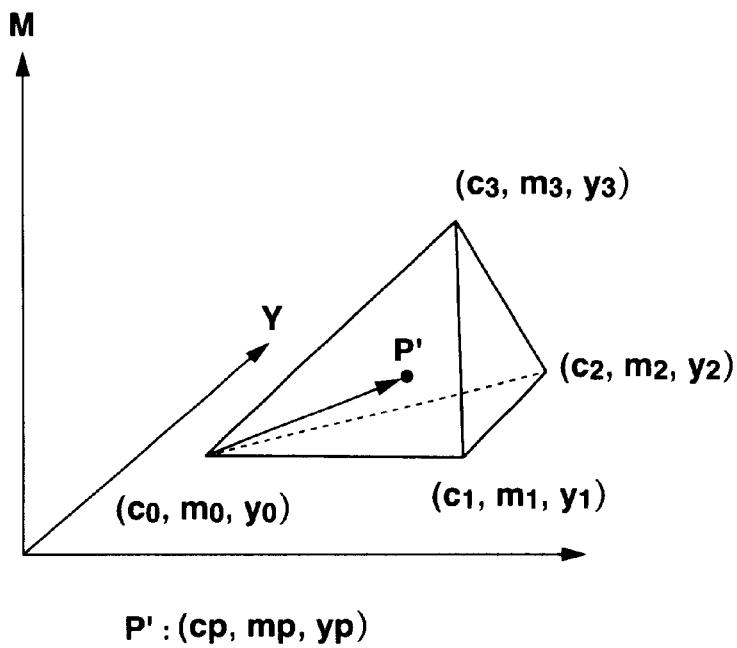
FIG. 25 shows coordinates of vertexes of a tetrahedron in the CMY color space, corresponding to the tetrahedron in the $L^*a^*b^*$ color space, and on-grid points in the CMY color space, corresponding to the on-grid points in the $L^*a^*b^*$ color space.

When a tetrahedron in the CMY color space is determined which corresponds to the tetrahedron in which the point $(L^*_p, a^*_p, b^*_p)$ on the grid in the L*a*b* color space, the operation goes to step S3 where the tetrahedron is interpolated to determine a point P' in the CMY color space corresponding to the point P $(L^*_p, a^*_p, b^*_p)$ in the L*a*b* color space. More particularly, suppose that the coordinates of the vertexes of the tetrahedron in the L*a*b* color space are $(L^*_0, a^*_0, b^*_0)$, $(L^*_1, a^*_1, b^*_1)$, $(L^*_2, a^*_2, b^*_2)$ and $(L^*_3, a^*_3, b^*_3)$, respectively, as shown in FIG. 24 and the coordinates of the vertexes of a tetrahedron in the CMY color space corresponding to the tetrahedron in the L*a*b* color space are $(c_0, m_0, y_0)$, $(c_1, m_1, y_1)$, $(c_2, m_2, y_2)$ and $(c_3, m_3, y_3)$, respectively, as shown in FIG. 25. The point $P'(C_p, m_p, y_p)$ in the CMY color space, corresponding to the point P $(L^*_p, a^*_p, b^*_p)$ in the L*a*b* color space is determined by a linear interpolation as in the following equation (3-2).

$$\begin{bmatrix} C_p \\ m_p \\ y_p \end{bmatrix} = \begin{bmatrix} C_1 - C_0 & C_2 - C_0 & C_3 - C_0 \\ m_1 - m_0 & m_2 - m_0 & m_3 - m_0 \\ y_1 - y_0 & y_2 - y_0 & y_3 - y_0 \end{bmatrix} \cdot \begin{bmatrix} \alpha \\ \beta \\ \gamma \end{bmatrix} + \begin{bmatrix} C_0 \\ m_0 \\ y_0 \end{bmatrix} \quad (3\text{-}2)$$

When a chromatic value in the CMY color space, corresponding to the chromatic value on the grid in the L*a*b* color space is determined as in the above, namely, when $(C_p, m_p, y_p)$ corresponding to $(L^*_p, a^*_p, b^*_p)$ is determined, the value of each CMY signal component corresponding to the grid at which the lines dividing the L*a*b* color space intersect each other is determined and registered into the forward lookup table at step S4.

On the other hand, if the point on the grid in the L*a*b* color space is judged at step S1 not to be included in any of the tetrahedrons. The chroma signal corresponding to that point is outside the color gamut of the device signal and needs to have the color gamut reduced. In this case, the operation goes to step S5 where the color difference formula essential in the present invention is utilized for the color gamut reduction. Of the colors in the CMY color space corresponding to the device, any whose difference from the color on the grid in the L*a*b* color space is the smallest is determined and its chromatic value is calculated. This color gamut reduction will further be described later.

Then a color gamut reduction is effected to determine a chromatic value in the CMY color space, corresponding to a chromatic value at the grid in the L*a*b* color space. Based on the determined chromatic value in the CMY color space, a value of each CMY signal component corresponding to the grid at which the lines dividing the L*a*b* color space intersect each other is determined and registered into the backward lookup table, as at step S4.

Figure 20:
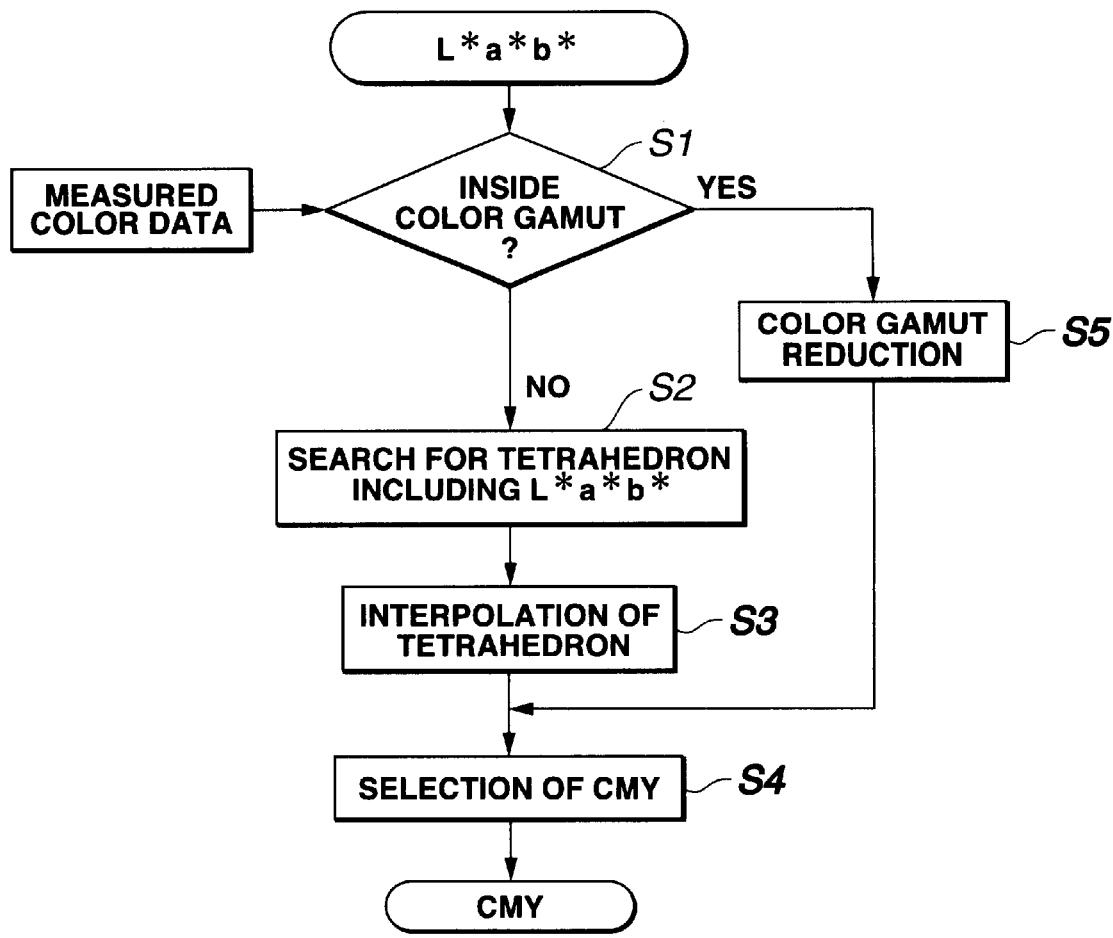
FIG. 20 is a flow chart of operations made to create a backward lookup table.

The above-mentioned operations included in the flow chart shown in FIG. 20 are effected concerning all the grids in the L*a*b* color space, whereby values of CMY signal components corresponding to the grids at which the lines dividing the L*a*b* color space intersect each other will be registered into the backward lookup table which will thus be complete.

Next, the operations for a color gamut reduction, effected at step S5 will further be described with reference to the flow chart shown in FIG. 26.

The color gamut reduction is to be done when it is judged that a chromatic signal corresponding to a grid in the L*a*b* color space is outside the color gamut of the device signal, to determine a point in the CMY color space, corresponding to a point on the grid in the L*a*b* color space. In other words, an L*a*b* signal outside a color gamut of the CMY color space corresponding to the device is subjected to color gamut reduction to determine a value of each CMY signal component corresponding to a value of each L*a*b* signal component.

It is supposed herein that values of CMY signal components are represented by 0, 1, ..., 254 and 255, respectively. Also in the following description, components of the CMY color space corresponding to the device are indicated simply with C, M and Y, respectively. A chromatic value in the L*a*b* color space being outside the color gamut of the CMY color space corresponding to the device and whose color gamut is to be reduced will be referred to as "to-be-reduced L*a*b* chromatic value" hereinafter. Also, a chromatic value in the CMY color space, determined by the color gamut reduction will be referred to as "reduced CMY chromatic value" hereinafter.

For the color gamut reduction, first at step S11, initial values are set for variables i, j and k intended to maintain values of CMY signal components and a variable $\Delta E_{min}$ intended to maintain a minimum color difference. More specifically, zero is set for each of the variables i, j and k while a predetermined sufficiently large value A is set for the variable $\Delta E_{min}$.

Next at step S12, chromatic values in the L*a*b* color space corresponding to C=i, M=j and Y=k, respectively, are determined based on the measured data of the previously-mentioned color patch. Note that for determination a chromatic value in the L*a*b* color space, a nonlinear interpolation such as Lagrange interpolation is effected based on the measured data as necessary.

Next at step S13, a color difference between a to-be-reduced L*a*b* chromatic value and the chromatic value in the L*a*b* color space, having been determined at step S12, is calculated. The color difference formula used to calculate the color difference $\Delta E$ is essential in the present invention. The color difference formula will further be described later.

Next at step S14, $\Delta E$ and $\Delta E_{min}$ are compared with each other. When $\Delta E < \Delta E_{min}$, the operation goes to step S15. When $\Delta E$ is not smaller than $\Delta E_{min}$, the operation goes to step S17.

At step S15, the color difference $\Delta E$ having been determined at step S13 is set for the variable $\Delta E_{min}$. Next at step S16, the current CMY value (namely, values of variables i, j and k) is stored in the memory, and thereafter the operation goes to step S17. The CMY value for storage into the memory will be updated each time the operation passes by step S16.

At step S17, one is added to any of the variables i, j and k which will not exceed 255 after the addition. Namely, each time the operation passes by step S17, the variables i, j and k are increased to 1, 0 and 0; 1, 1 and 0; 1, 1 and 1; 2, and 1; ..., and then to 255, 255 and 255, respectively.

Next at step S18, it is judged whether the variables i, j and k have reached 255, the upper limit of each CMY signal component. If the variables have not yet reached 255, the operation goes back to step S12 and the procedure from step S12 to S18 are repeated. When the variables i, j and k have reached 255, the operation goes to step S19.

At step S19, the values of the variables i, j and k stored in the memory are outputted as reduced CMY chromatic values. With the above-mentioned operations, there is determined a point in the CMY color space (namely, reduced CMY chromatic value) corresponding to a point on the grid in the L*a*b* color space (namely, to-be-reduced L*a*b* chromatic value).

Next, the color difference formula used at step S13 will further be described below:

Suppose here that the to-be-reduced L*a*b* chromatic value is ($L_1$, $a_1$, $b_1$) and the chromatic value in the L*a*b* color space, determined at step S12 is ($L_2$, $a_2$, $b_2$).

In this case, the differences between the attributes of these chromatic values can be given by the following equations (4-1) to (4-3):

$$\Delta L^* = L_2 - L_1 \tag{4-1}$$

$$\Delta a^* = a_2 - a_1 \tag{4-2}$$

$$\Delta b^* = b_2 - b_1 \tag{4-3}$$

To represent a color difference in a color space based on the three attributes of the human perception, the chroma difference $\Delta C^*$ and hue difference $\Delta H^*$ are defined by the following equations (4-4) to (4-7):

$$C_1 = \{(a_1)^2 + (b_1)^2\}^{1/2} \tag{4-4}$$

$$C_2 = \{(a_2)^2 + (b_2)^2\}^{1/2} \tag{4-5}$$

$$\Delta C^* = C_2 - C_1 \tag{4-6}$$

$$\Delta H^* = s \times \{2 \times (C_1 \times C_2 - a_1 \times a_2 - b_1 \times b_2)\}^{1/2} \tag{4-7}$$

In the equation (4-7), however, when $a_2 \times b_1 \geq a_1 \times b_2$, s=1 and when $a_2 \times b_1 < a_1 \times b_2$, s=-1.

The hue difference $\Delta E$ is defined by the following equation (4-8) or (4-9):

$$\Delta E = \left\{ \begin{bmatrix} \Delta L^* & \Delta C^* & \Delta H^* \end{bmatrix} \begin{bmatrix} Kll & Klc & Klh \\ Kcl & Kcc & Kch \\ Khl & Khc & Khh \end{bmatrix} \begin{bmatrix} \Delta L^* \\ \Delta C^* \\ \Delta H^* \end{bmatrix} \right\}^{1/2} \tag{4-8}$$

$$\Delta E = \sqrt{\left(\frac{\Delta L^*}{Kl}\right)^2 + \left(\frac{\Delta C^*}{Kc}\right)^2 + \left(\frac{\Delta H^*}{Kh}\right)^2 + \left(\frac{\Delta L^* \cdot \Delta C^*}{Klc}\right) + \left(\frac{\Delta L^* \cdot \Delta C^*}{Klc}\right) + \left(\frac{\Delta H^* \cdot \Delta L^*}{Khl}\right)} \tag{4-9}$$

where $\Delta L^*$ is a lightness difference, $\Delta C^*$ is a chroma difference and $\Delta H^*$ is a hue difference; and $K_l$, $K_c$, $K_h$, $K_{ll}$, $K_{lc}$, $K_{lh}$, $K_{cl}$, $K_{cc}$, $K_{ch}$, $K_{hl}$, $K_{hc}$ and $K_{hh}$ are predetermined constants or functions of a lightness L*, chroma C* and hue h*, respectively. The smaller the color difference $\Delta E$ given by the equation (4-8) or (4-9), the smaller the perceptive difference between two colors will be.

To define the color difference formula like the above equation (4-8), the predetermined constants $K_{ll}$, $K_{cc}$, and $K_{hh}$ should preferably be set to meet the following equation (4-10). To define the color difference formula like the above equation (4-9), the predetermined constants $K_l$, $K_c$ and $K_h$ should preferably be set to meet the following equation (4-11):

$$K_{cc} \geq K_{hh} \geq K_{ll} \tag{4-10}$$

$$K_c \geq K_h \geq K_l \tag{4-11}$$

By setting the predetermined constants $K_{ll}$, $K_{cc}$ and $K_{hh}$, and $K_l$, $K_c$ and $K_h$ to meet the equations (4-10) and (4-11), respectively, it is made possible, when a color gamut reduction is made, to lessen the perceptive gap between a color having the to-be-reduced L*a*b* chromatic value and a color having the reduced CMY chromatic value.

A concrete example of the color difference formula given by the above equation (4-8) or (4-9) is shown below as an equation (5-1):

$$\Delta E = \left( \left[ \left(\frac{\Delta L_{BFD}}{l}\right)^2 + \left(\frac{\Delta C^*}{cD_C}\right)^2 + \left(\frac{\Delta H^*}{D_H}\right)^2 + R_T\left(\frac{\Delta C^*}{cD_C}\Delta\frac{H^*}{D_H}\right) \right] \right)^{1/2} \tag{5-1}$$

Note that when the brightness to which the observer will be adapted is $Y_n$ in the above equation (5-1), the term $\Delta L_{BFD}$ is defined like the following equation (5-2):

$$\left.\begin{aligned}Y_1 &= Y_n\left(\frac{L_1+16}{116}\right)^3 \quad Y_2 = Y_n\left(\frac{L_2+16}{116}\right)^3 \\ Y_{1\_BFD} &= 54.6\log_{10}(Y_1+1.5) - 9.6 \\ Y_{2\_BFD} &= 54.6\log_{10}(Y_2+1.5) - 9.6 \\ \Delta L_{BFD} &= L_{2\_BFD} - L_{1\_BFD}\end{aligned}\right\} \tag{5-2}$$

In the above equation (5-1), the weighting factor in each attribute is defined by the following equation (5-3):

$$\left.\begin{aligned}h &= \left(\frac{180}{\pi}\right)\tan^{-1}\left(\frac{b_1}{a_1}\right) \\ D_c &= \frac{0.035C_1}{1+0.0365C_1} + 0.521 \\ D_H &= D_c(GT+1-T) \\ G &= \left(\left[\frac{C_1^4}{C_1^4+14000}\right]\right)^{1/2} \\ T &= 0.627 + 0.055\cos(h-254) - 0.040\cos(2h-136) + \\ &\quad 0.070\cos(3h-32) + 0.049\cos(4h+114) - \\ &\quad 0.015\cos(5h-103) \\ R_T &= R_H \cdot R_C \\ R_H &= -0.260\cos(h-308) - 0.379\cos(2h-160) - \\ &\quad 0.636\cos(3h+254) + 0.226\cos(4h+140) - \\ &\quad 0.194\cos(5h+280) \\ R_C &= \left(\left[\frac{C_1^6}{C_1^6+70000000}\right]\right)^{1/2}\end{aligned}\right\} \tag{5-3}$$

The above equation is a so-called BFD color difference formula. By defining the color difference E by this formula, it is made possible to lessen very much the perception gap between a color having the to-be-reduced L*a*b* chromatic value. Especially, using a color difference formula like the equation (5-1), it is made possible to well reduce the color gamut of a blue area which has been a large problem in the conventional color gamut reduction, without causing the blue area not to be reddish.

In the foregoing, the method of creating a color gamut conversion table according to the present invention has been described in detail concerning a concrete example. For an actual performing such a color gamut conversion table creating method, however, a program having stated therein the operations included in the flow charts shown in FIGS. 20 and 26, for example, (namely, a color gamut conversion table creating program) is prepared and run by a computer.

Figure 26:
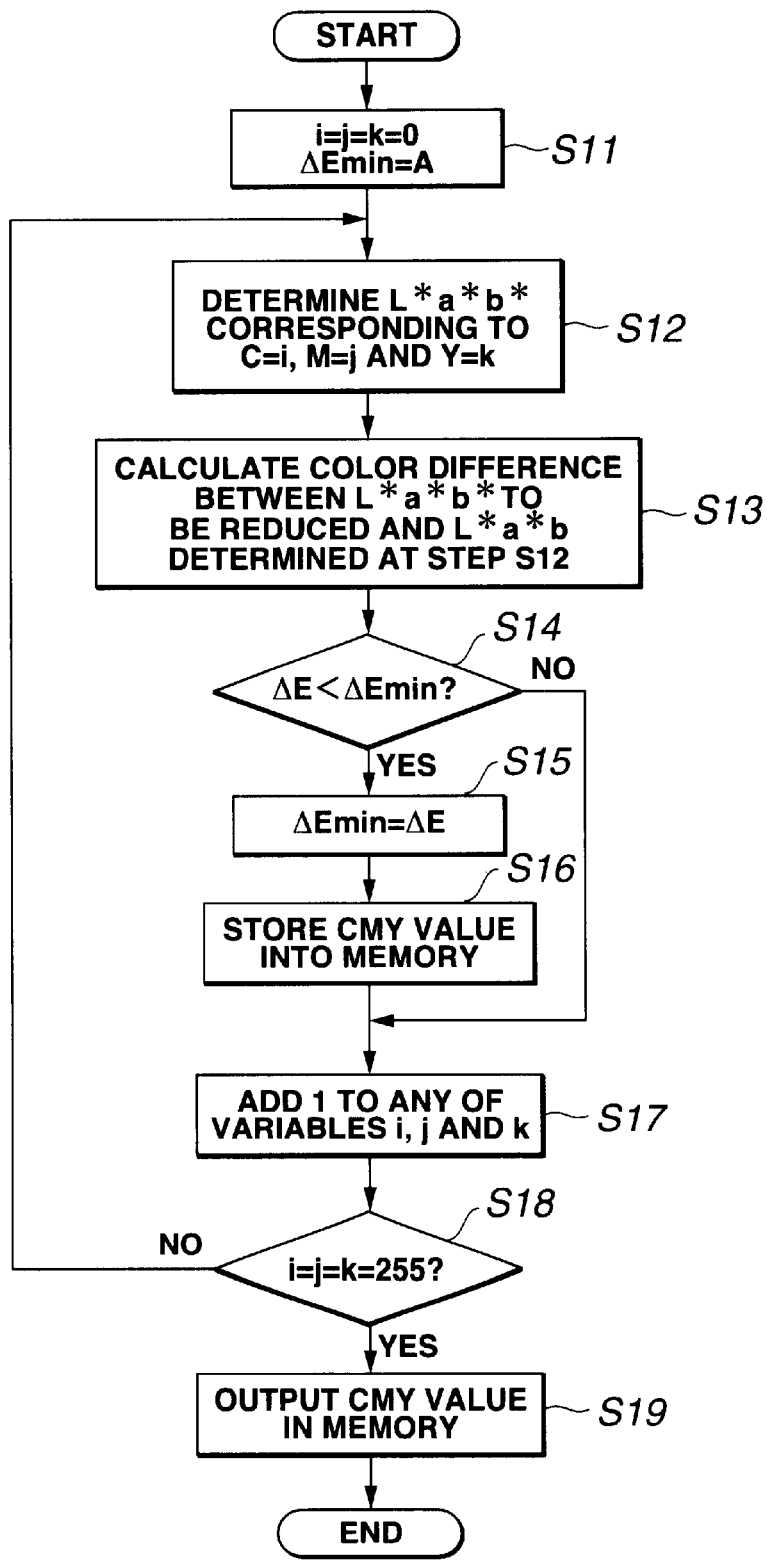
FIG. 26 is a flow chart of operations made for color gamut reduction.

The color gamut conversion table creating apparatus according to the present invention is embodied as a computer system adapted to execute the program (the color gamut conversion table creating program) in which the operations in the flow charts shown in FIGS. 20 and 26, for example, are stated. That is, by executing the color gamut conversion table creating program having stated therein the operations included in the flow charts shown in FIGS. 20 and 26, for example, the color gamut conversion table creating apparatus executes the operations included in the flow charts shown in FIGS. 20 and 26 to create a color gamut conversion table.

Next, the image processor according to the present invention will be described herebelow concerning an image processor which uses a device profile in which the color gamut conversion table having bee created as in the above to convert, for outputting, an image from a predetermined input device to an image corresponding to a color gamut of a predetermined output device.

Figure 27:
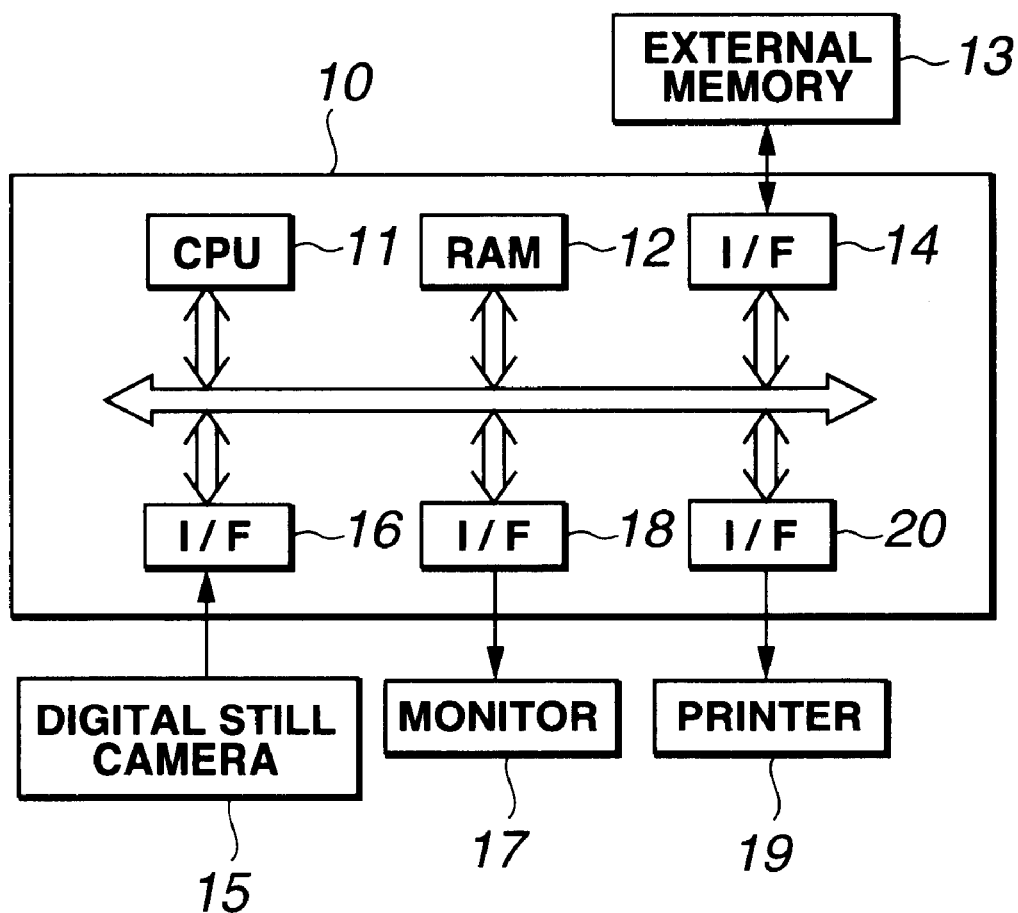
FIG. 27 shows an embodiment of the image processor according to the present invention.

Referring now to FIG. 27, there is schematically illustrated an embodiment of the image processor. The image processor is generally indicated with a reference 10. The image processor 10 is adapted to convert a color signal inputted from a predetermined input device to a color signal in a device-independent color space and then convert the color signal to a color signal which can be dealt with by an output device such as a monitor, printer or the like.

As shown in FIG. 27, the image processor 10 includes a central processing unit (CPU) 11 which effect a variety of data processing, a random access memory (RAM) 12 used as necessary during a data processing by the CPU 11, a first interface 14 controlling interfacing with an external memory 13, a second interface 16 controlling interfacing with a digital still camera 15, a third interface 18 controlling interfacing with a monitor 17, and a fourth interface 20 controlling interfacing with a printer 19.

The external memory 13 stores an image processing program having stated therein operations for converting an image from a predetermined input device to an image corresponding to the color gamut of a predetermined output device, a device profile used in the color signal conversion, etc.

The CPU 1I reads a program previously stored in the external memory 13 via the first interface 14, and uses an area of the RAM 12 for a variety of date processing as necessary according to the program. More specifically, the CPU 11 reads an image processing program from the external memory 13 and converts an image from the predetermined input device to an image corresponding to the color gamut of the predetermined output device. At this time, the CPU 11 reads also a device profile from the external memory 13 and converts the color gamut based on the device profile.

The second interface 16 controls interfacing with the digital still camera 15. A video signal acquired by taking a photo of an object by the use of the digital still camera 15 is supplied to the image processor 10 via the second interface 16.

The third interface 18 controls interfacing with the monitor 17. A signal acquired as a result of a data processing in the CPU 11 is outputted to the monitor 17 via the third interface 18.

The fourth interface 20 controls interfacing with the printer 19. A signal acquired as a result of a data processing in the CPU 11 is outputted to the printer 19 via the fourth interface 20.

The image processor 10 functions as will be seen from the following description made concerning a conversion of an RGB signal supplied from the digital still camera 15 to a CMY signal and outputting the CMY signal to the printer 19, by way of example. The following function will be performed by the image processor 10 by reading an image processing program from the external memory 13 and executing the program by means of the CPU 11.

Figure 28:
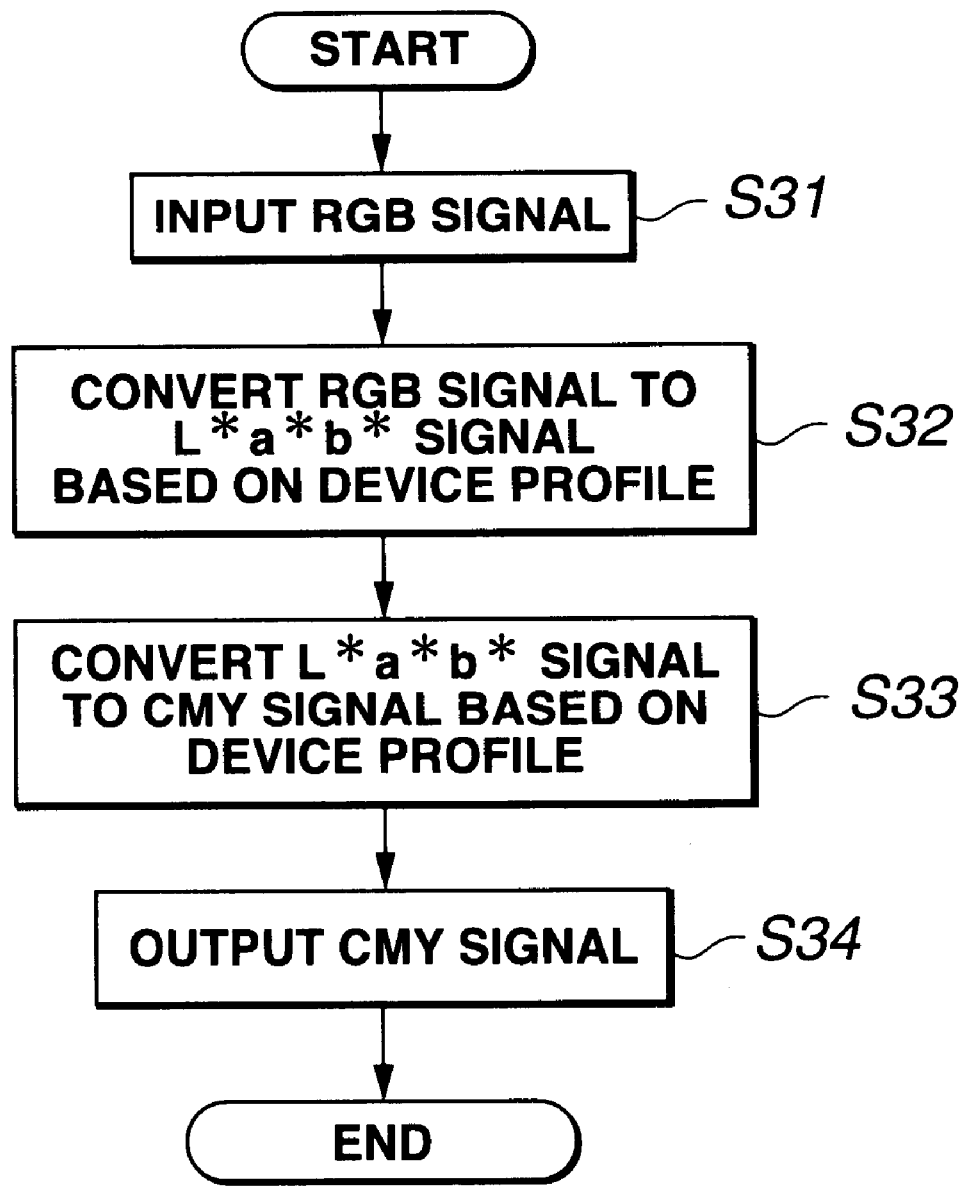
FIG. 28 is a flow chart of operations made to convert an RGB signal to a CMY signal by the image processor in FIG. 27 and output the CMY signal.

As shown in FIG. 28, first at step S31, a video signal (RGB signal) acquired by taking a photo of an object by means of the digital still camera 15 is supplied to the image processor 10. The CPU 11 will receive the RGB signal from the digital still camera 15 via the second interface 16.

Next at step S32, the CPU 11 will read from the external memory 13 via the first interface 14 a device profile in which a color gamut conversion table having stated therein a correspondence between the RGB signal and L*a*b* signal for color gamut conversion from the RGB signal to L*a*b* signal. Based on the device profile, the CPU 11 will convert the RGB signal to an L*a*b* signal in a device-independent CIE/L*a*b* color space.

Next at step S33, Next at step S32, the CPU 11 will read from the external memory 13 via the first interface 14 a device profile in which a color gamut conversion table having stated therein a correspondence between the L*a*b* signal and CMY signal for color gamut conversion from the L*a*b* signal to CMY signal. Based on the device profile, the CPU 11 will convert the L*a*b* signal to a CMY signal corresponding to the printer 19.

Finally at step S34, the CMY signal thus acquired is supplied from the image processor 10 to the printer 19. At this time, the CPU 11 will supply the CMY signal having been acquired as in the above to the printer 19 via the fourth interface 20.

By effecting a color gamut conversion based on a device profile as in the above, the image processor 10 convert an image from a predetermined input device (digital still camera 15 in the above example) to an image corresponding to a color gamut of a predetermined output device (printer 19 in the above example).

In the above image processor 10, the digital still camera 15 is used as an input device, and monitor 17 and printer 19 are used as output devices. Note however that devices usable in the present invention are not limited such devices but they may of course be any one which could input and output an image data.

Also, in the above image processor 10, a device profile in which a color gamut conversion table is defined is prepared beforehand and a color signal is converted based on the device profile. It should be noted, however, that each time a color signal is converted, it is possible to effect calculations for color gamut reduction based on the color difference formula given by the previously mentioned equation (4-8) or (4-9).

Also, in the above image processor 10, a device signal is converted once to a color signal in a device-independent color space. However, it should be noted that when a device to be used is determined beforehand, a color signal in a device-dependent color space may be converted directly to a color signal in any other device-dependent color space without the conversion to a color signal in the device-independent color space.

In the foregoing description, the color gamut reduction has been described, for example, which uses a define profile in which a color gamut conversion table is defined. However, the present invention is not limited to use of such a device profile is used, but can be applied to mapping of a color not reproducible even with a physical model or the like. That is, the present invention has a wide applicability and is applicable widely to mapping in a color gamut of an output device of a color outside the output device color gamut and thus not reproducible.

By the way, there are two important factors for effecting a color gamut reduction. One of the two factors is a direction in which a given color is reduced, and the second factor is a method by which the given color is reduced in the direction. In the foregoing, how to set a reducing direction has mainly been described in detail. Hence, how to reduce a color gamut will further be described herebelow.

Figure 29A:
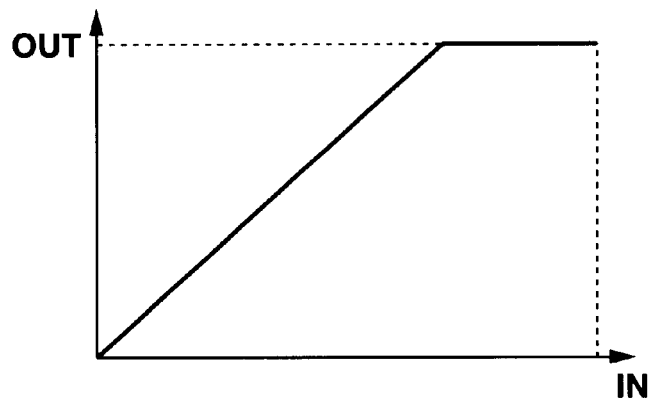
FIG. 29 explains how to reduce the color gamut, FIG. 29A showing a relation between an input and output when clipping is made for color gamut reduction, FIG. 29B showing a relation between an input and output when a linear reduction is done for color gamut reduction, and FIGS. 29C and 29D showing a relation between an input and output when a nonlinear reduction is made for color gamut reduction.
Figure 29B:
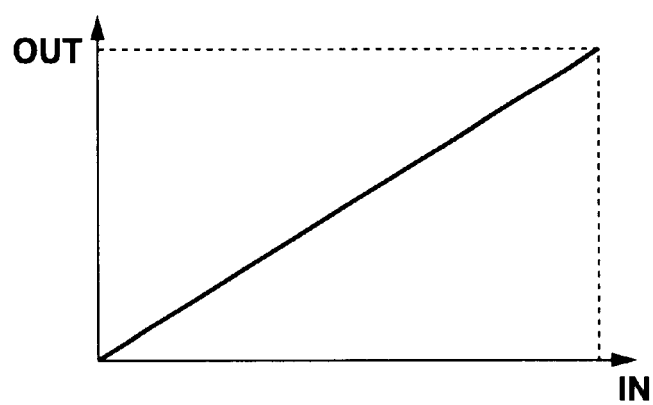
Figure 29C:
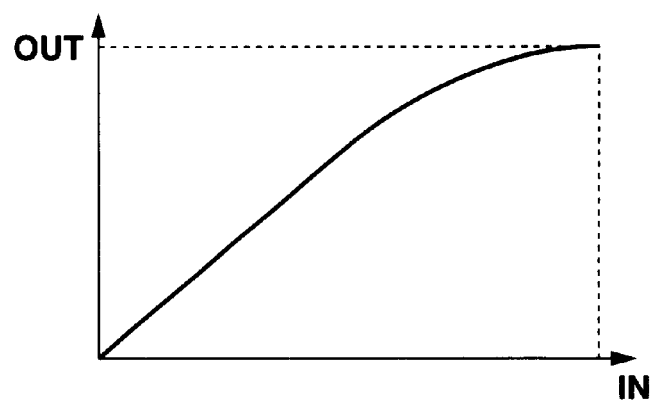
Figure 29D:
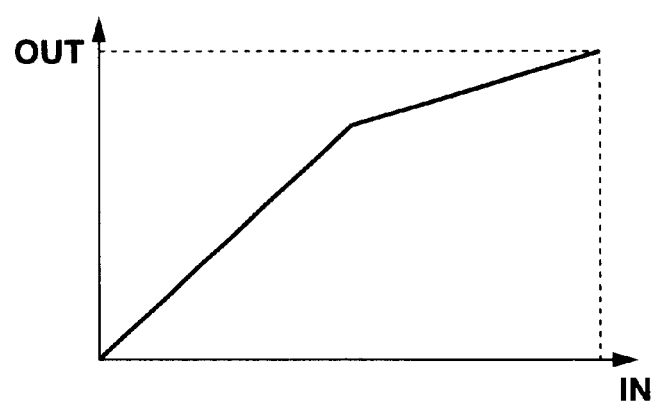

As shown in FIGS. 29A to 29D, the methods of color gamut reduction can be classified into "clipping", "linear reduction" and "nonlinear reduction". FIG. 29A shows a relation between an input and output when clipping is made for color gamut reduction, FIG. 29B shows a relation between an input and output when a linear reduction is done for color gamut reduction, and FIGS. 29C and 29D show a relation between an input and output when a nonlinear reduction is made for color gamut reduction.

The clipping is such that a color inside the color gamut of an input device but outside the color gamut of an output device is mapped along the profile of the output device color gamut so that the color inside the output device color gamut will not change. By this method, the chroma of an image can be maintained to the maximum extent but all colors reduced in the same direction are mapped in the same color. Thus, if such a gradation exists in the image, it will be lost.

The linear reduction is such that a whole color gamut of an input device is linearly reduced to a color gamut of an output device. By this method, a gradation of an image can be maintained but the chroma of the image will be lowered.

The nonlinear reduction is such that a nonlinear function is used to reduce an entire color gamut of an input device to a color gamut of an output device. This method is an intermediate one between the above two methods and permits to maintain the gradation and chroma to some extent.

Heretofore, the clipping, linear reduction and nonlinear reduction have been proposed for the one- and two-dimensional color gamut reductions, respectively. By the one- and two-dimensional color gamut reductions, however, if an original image has a very high chroma and thus a third dimension such as an image produced by the computer graphics, among others, the features of the image will be rather lost. The present invention provides a three-dimensional reduction of color gamut.

Figure 30:
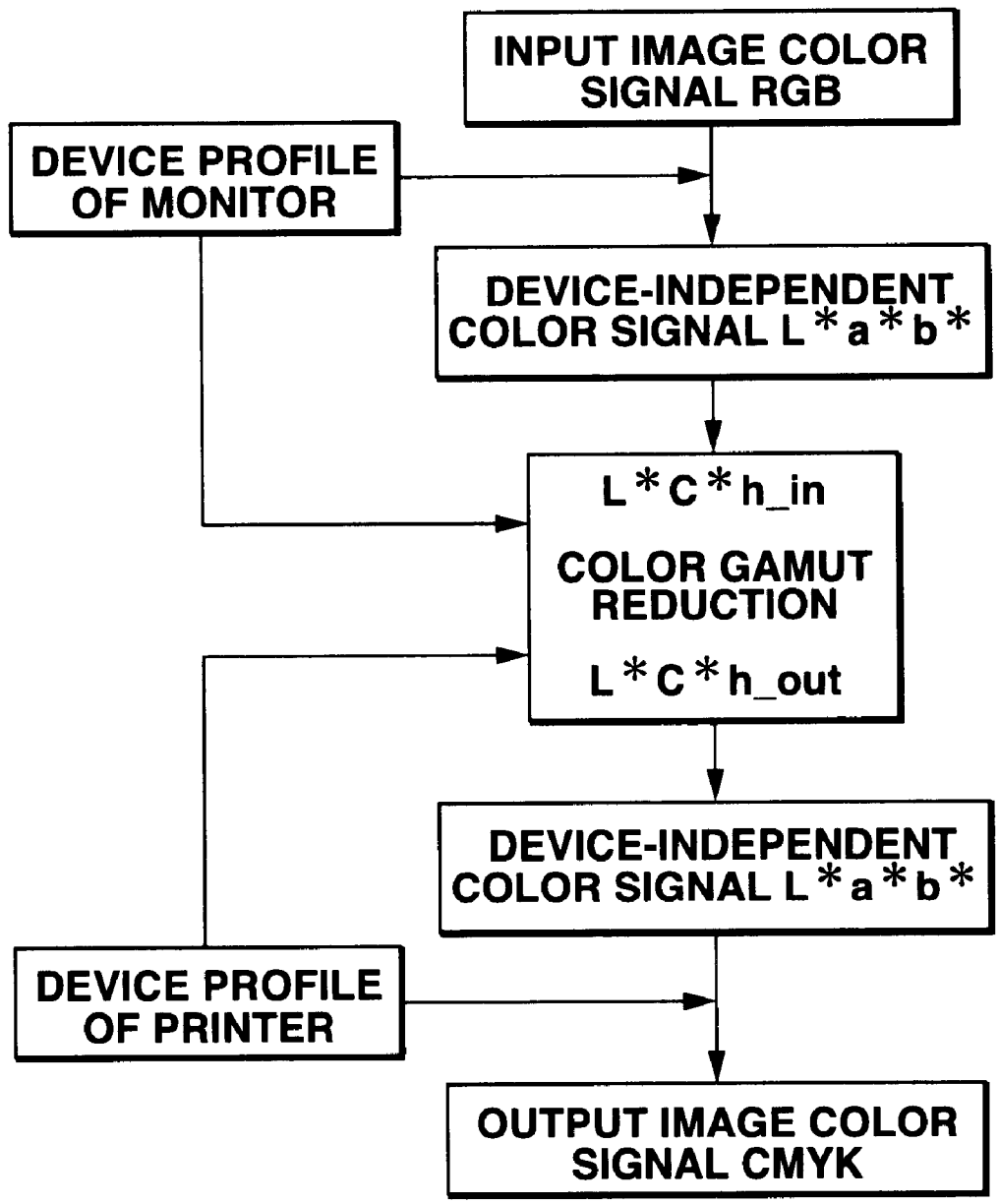
FIG. 30 shows a procedure of signal conversion for effecting a color gamut reduction after converting an input color signal to a device-independent color signal, the procedure being intended for a case that the input device is a monitor while the output device is a printer.

The example of color gamut reduction having been described in the foregoing is a one in which the clipping is adopted in the three-dimensional color gamut reduction. However, the clipping will result in loss of an image gradation as mentioned above, as the case may be. Therefore, the linear or nonlinear reduction should preferably employed in the three-dimensional color gamut reduction as well. The employment of the linear or nonlinear reduction in the three-dimensional color gamut reduction will further be described herebelow:

There will be described herebelow an example that a color gamut reduction in which a monitor is used as the input device and a printer is used as the output device, for example, as shown in FIG. 30 and a color gamut reduction is made for conversion of a color signal between the monitor and printer. However, the input and output devices may of course be other than the monitor and printer if only they are ones dealing with color signals.

An RGB signal R=red, G=green and B=blue) being an input image color signal will be converted by a device profile of the monitor to an L*a*b* signal being a device-independent color signal. The L*a*b* is subjected to polar coordinate transformation to an L*C*h signal by which three attributes (lightness, chroma and hue) of a color can be represented. A color gamut reduction is effected in the polar coordinate space, and then the L*C*h signal is converted to L*a*b* signal again. Further, the color signal is converted to cyan (C), magenta (M), yellow (Y) and black (K) being output image color signals to form an image by means of the printer being an output device.

Note that the input and output image color signals may be ones in any of RGB color space, CMY color space, CMYK color space, YCC color space, etc. Also, for conversion to a device-independent color space, the color space may be any one of XYZ color space, L*a*b* color space, L*u*v* color space, etc. However, the color space should desirably be a one suitable for the visual characteristics of the human eyes.

The color gamut reduction effected in the L*C*h color space based on the three attributes (lightness, chroma and hue) obtained through the polar coordinate transform of a device-independent color space, will be described hereinbelow. Examples of the color gamuts of the monitor and printer in a certain hue are shown in FIGS. 31 and 32.

Figure 31:
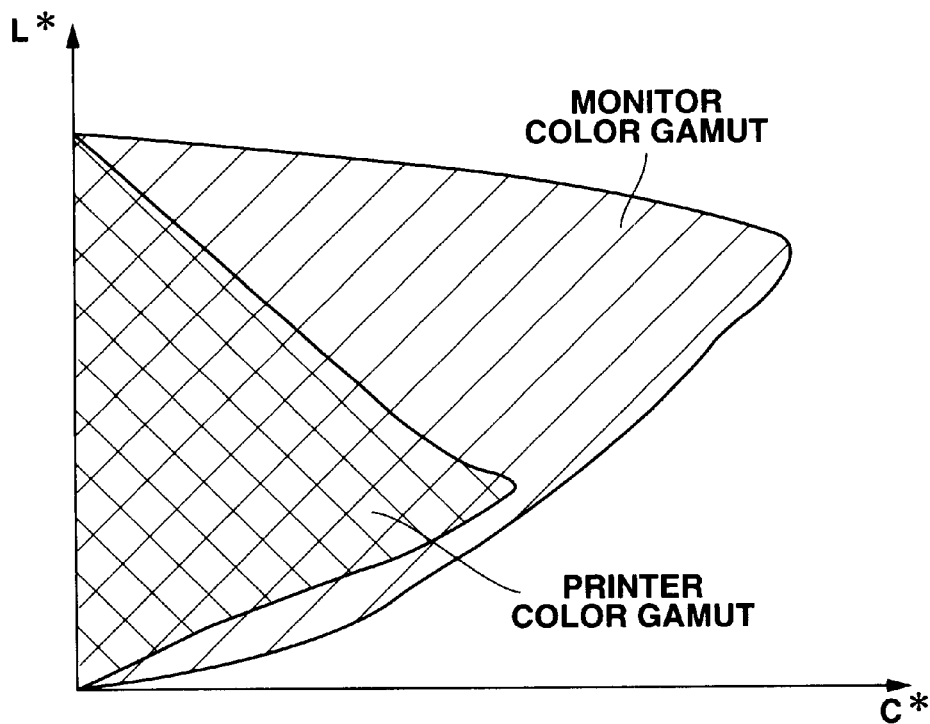
FIG. 31 shows an example of monitor and printer color gamuts.
Figure 32:
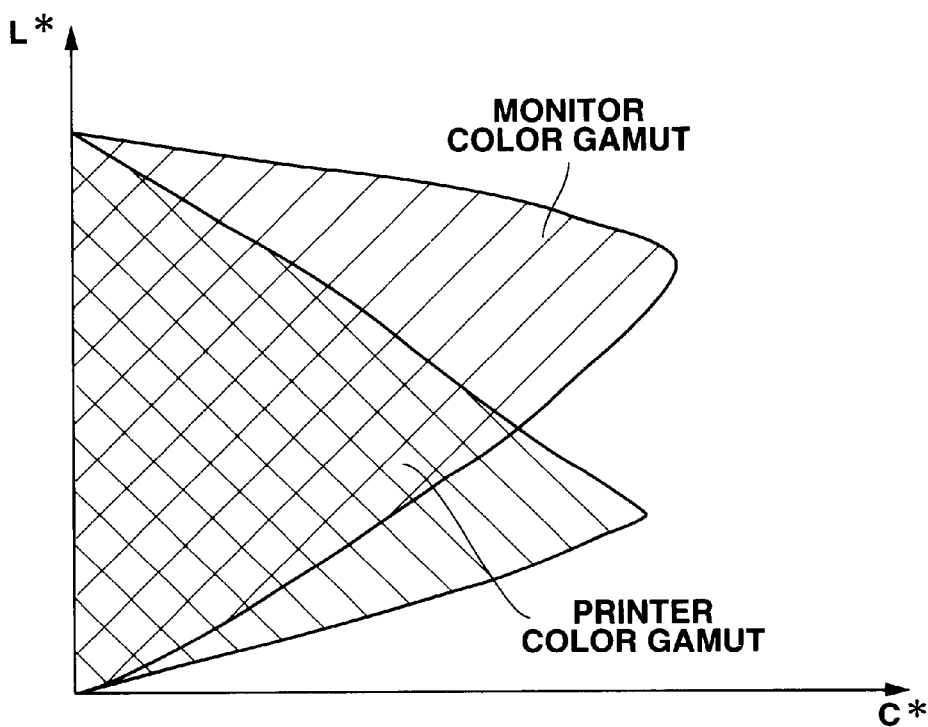
FIG. 32 shows another example of monitor and printer color gamuts.

The patterns of color gamut shape include a one in which the color gamut of the printer is completely included in that of the printer as shown in FIG. 31 (this color gamut shape will be called "shape 1") and a one in which the monitor color gamut has a part thereof larger than the printer color gamut while the printer color gamut has a part thereof larger than the monitor color gamut as shown in FIG. 32 (this color gamut shape will be called "shape 2").

As in the above, the color gamut varies in shape from one device to another, so that all colors cannot physically be reproduced. The color gamut reduction is to map a monitor color gamut not reproducible by a printer in a color gamut of the printer. The color gamut reduction has to be done in such a manner that an input image will be reproduced to have a more natural appearance. To this end, the three-dimensional color gamut reduction is effected in the linear or nonlinear manner.

Figure 33:
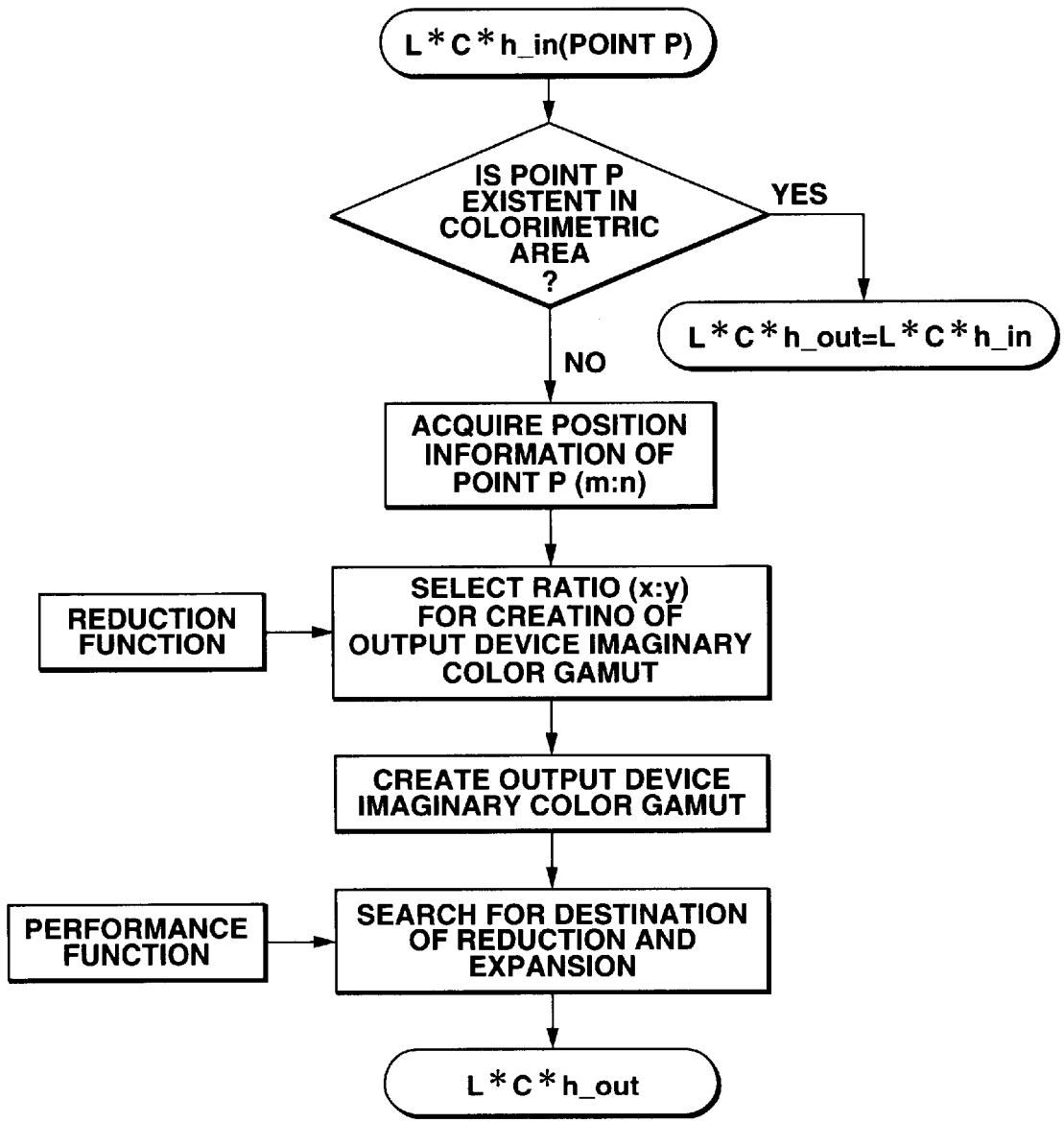
FIG. 33 is a flow chart of operations made for a three-dimensional color gamut reduction by linear or nonlinear reduction.

A flow of operations made for the three-dimensional color gamut reduction is roughly shown in FIG. 33. As shown, an input image color signal is given as an L*C*h_in (point P) in a device-independent color space, and converted to L*C*h_out by the color gamut reduction. For this color gamut reduction, first it is judged whether the point P exists in the colorimetric area. The colorimetric area is an area not subjected to any color gamut reduction. It will further be described later.

If the point P exists, it is judged, in the colorimetric area, the L*C*h_in will be taken as a data as it is after the color gamut reduction. That is, L*C*h_in is outputted as L*C*h_out as it is.

On the other hand, if it is judged that the point P does not exist in the colorimetric area, first position information on the point P is acquired. The position is determined based on a ratio (m:n) between a distance of the point P from the outer wall of the colorimetric area and a distance from the outer wall of the monitor color gamut. Note that the "distance" referred to herein is a distance along a straight line, not always any shortest distance from each outer wall, as will be described later.

Next, an imaginary color gamut (will be referred to as "output device imaginary color gamut" hereinafter) is set in the printer color gamut. The profile of this imaginary color gamut is defined for a constant ratio (x:y) to be attained between the distance from the outer wall of the colorimetric area and distance from the outer wall of the printer color gamut. Note that this "distance" is a distance along a straight line, not always any shortest distance from each outer wall, as will be described later. The ratio (x:y) is calculated using a predetermined reduction function which may be a linear function or a nonlinear function such as a power function, S-cure function or the like.

A predetermined evaluation function is used to make a search for a reduction or expansion destination of the point P between the output device imaginary color gamut and point P. The predetermined evaluation function is for example a color difference formula given by the equation (4-8) or (4-9). That is, the point P is mapped along the profile of the output device imaginary color gamut by reduction or expansion so that the color difference $\Delta E$ given by the equation (4-8) or (4-9) is minimum. The chromatic value at the mapping destination is outputted as L*C*h_out.

Next, the above-mentioned color gamut reduction technique will further be described below:

Prior to the description of the color gamut reduction technique, first the colorimetric area will be explained. The colorimetric area is an area not subjected to any color gamut reduction, and it is set inside the printer color gamut in such a manner that a parameter K, for example, set inside the printer color gamut is positioned on the outer wall of the colorimetric area.

Figure 34:
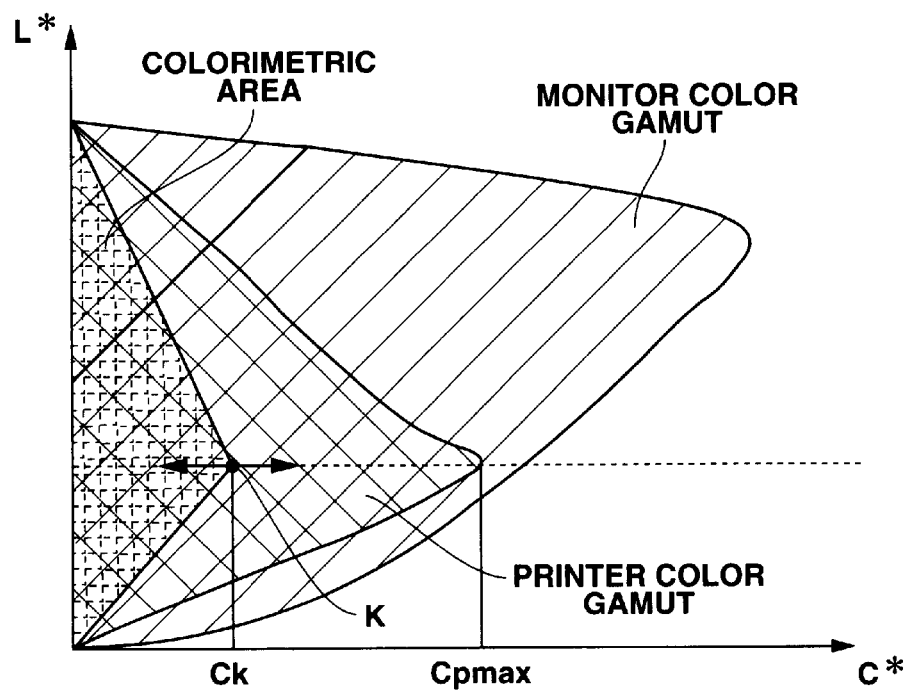
FIG. 34 explains how to set a colorimetric area, using an example that a colorimetric area is absolutely set as an triangle passing through a parameter K.
Figure 35:
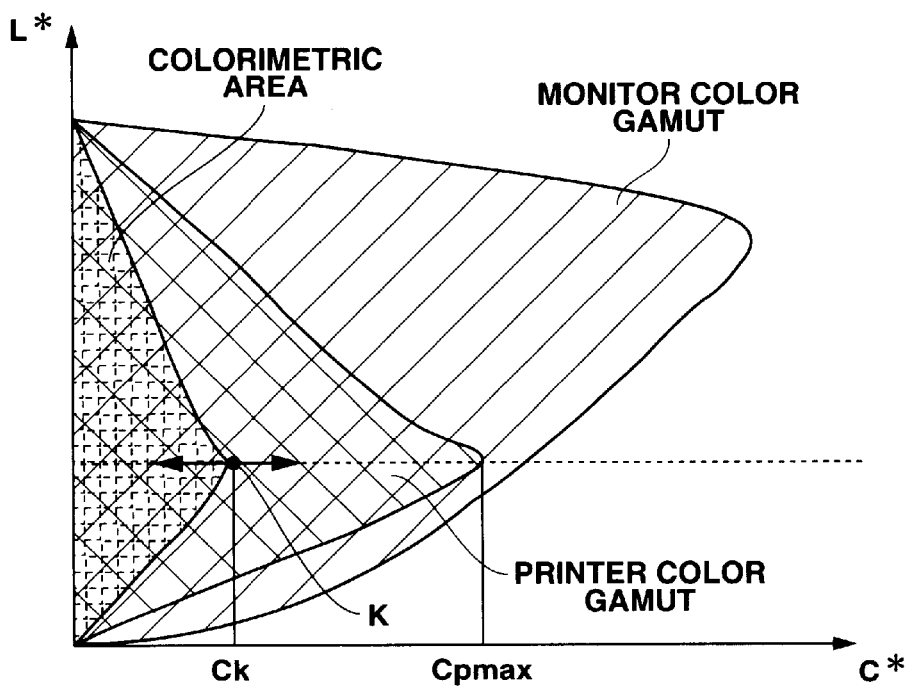
FIG. 35 also explains how to set a colorimetric area, using, in this case, an example that a colorimetric area is relatively set by relatively reducing the printer color gamut in a certain direction.

The colorimetric area may absolutely be set using the parameter K or may be set in relation to the printer and monitor color gamuts taken as a reference. Note that the absolute setting of the colorimetric area is to set the colorimetric area irrespectively of the color gamut shapes of the printer and monitor. As shown in FIG. 34, for example, the calorimeter area is set as a triangle passing through the parameter K. On the other hand, the relative setting of the colorimetric area is to set the colorimetric area in relation to the color gamuts of the printer and monitor. As shown in FIG. 35, for example, the colorimetric area is set by relatively reducing the printer color gamut in a direction.

Figure 36:
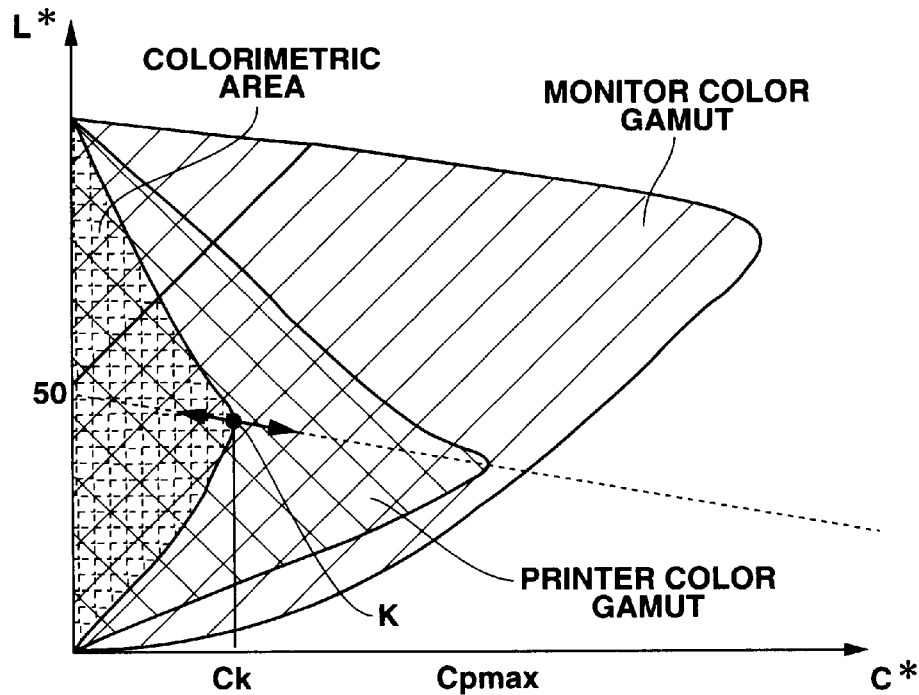
FIG. 36 also explains how to set a colorimetric area, using, this case, an example that the parameter K is set on a straight line extending from a point having a maximum chroma in the printer color gamut towards a point of a predetermined chroma.

The parameter K may be of any value if only it is within the color gamut of the printer. As shown in FIGS. 34 and 35, for example, the parameter K may be set on a lightness determined to have a maximum chroma in the printer color gamut. Otherwise, as shown in FIG. 36, the parameter K may be set on a straight line extending from a point having a maximum chroma in the printer color gamut to a point having a predetermined chromatic value (point of (*L, a*, b*)=(50, 0, 0) in the example shown in FIG. 26).

In these examples, when the parameter K has a chroma Ck=0, no colorimetric area will exist. When the chroma Ck of the parameter K is equal to the maximum chroma Cpmax in the printer color gamut, the colorimetric area will be the entire printer colorimetric area.

Figure 37:
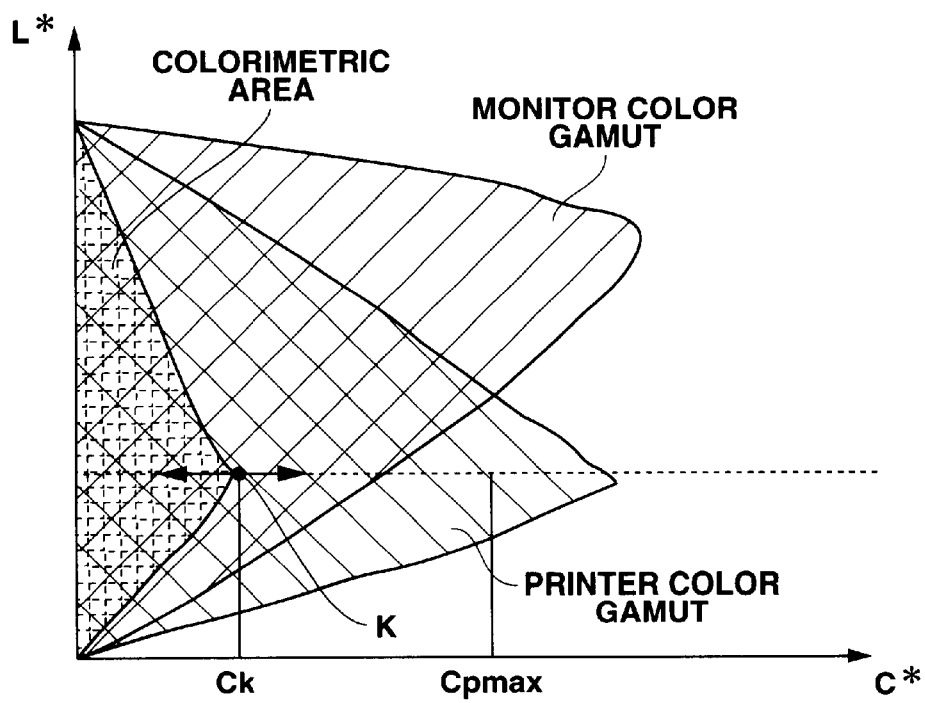
FIG. 37 also explains how to set a colorimetric area, using, in this case, an example that a colorimetric area is set relative to the printer color gamut when the monitor color gamut is partly larger while the printer color gamut is partly larger.
Figure 38:
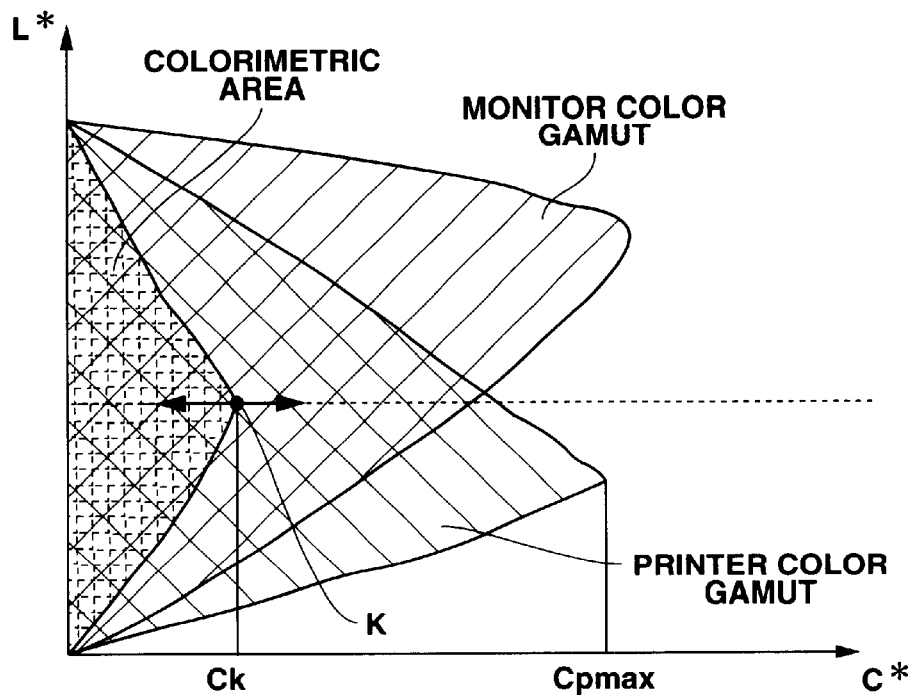
FIG. 38 also explains how to set a colorimetric area, using, in this case, an example that a colorimetric area is set relative to a common color gamut to both the monitor and printer when the monitor color gamut is partly larger while the printer color gamut is partly larger.

When the monitor and printer color gamuts have the aforementioned shape 2, the colorimetric area may be set in relation to the printer color gamut as shown in FIG. 37. Otherwise, the colorimetric area may be set in relation to a color gamut common to the monitor and printer as shown in FIGS. 38.

The parameter K may be of any value if only it is within the printer color gamut. For example, the parameter K may be set on a lightness determined to have a maximum chroma inside the printer color gamut, as shown in FIG. 37. Otherwise, the parameter K may be set on a lightness determined to have a maximum chroma in the color gamut common to the printer and monitor, as shown in FIG. 38.

Moreover, the parameter K may be set on the straight line extending from the point having a maximum chroma in the printer color gamut to a point having a predetermined chromatic value, or it may be set on a straight line extending from a point having the maximum chroma in the color gamut common to the printer and monitor to a point having the predetermined chromatic value.

Note that the parameter K should desirably be optimized taking in consideration the difference in color gamut between devices and color distribution of an input image signal. For example, the larger the difference between the color gamut shape of the output device and that of the input device, the smaller the parameter should desirably be. Also, the more the input image signal outside the output device color gamut, the smaller the parameter K should desirably be. In any case, however, the chroma Ck of the parameter K should be Ck>(Cpmax/2).

As in the above, the colorimetric area is set as a not-to-reduced area inside the printer color gamut. On the assumption that an area obtained by subtraction of the colorimetric area from the monitor color gamut is "area A", an area obtained by subtraction of the colorimetric area from the printer color gamut is "area B" and a common area to the areas A and B is "area C", the color gamut reduction is effected by reducing or expanding the area A to the area B and/or C. Note that when the monitor and printer color gamuts have the shape 1 as in the above, the areas B and C will coincide with each other.

Next, there will be described how the color gamut of the point P existing in the area A is reduced when the monitor and printer color gamuts have the shape 1 as in the above. Note that the colorimetric area is set in relation to the printer color gamut with the parameter K set on the straight line of lightness of the color gamut having the maximum chroma in the hue plane of the point P.

Figure 40:
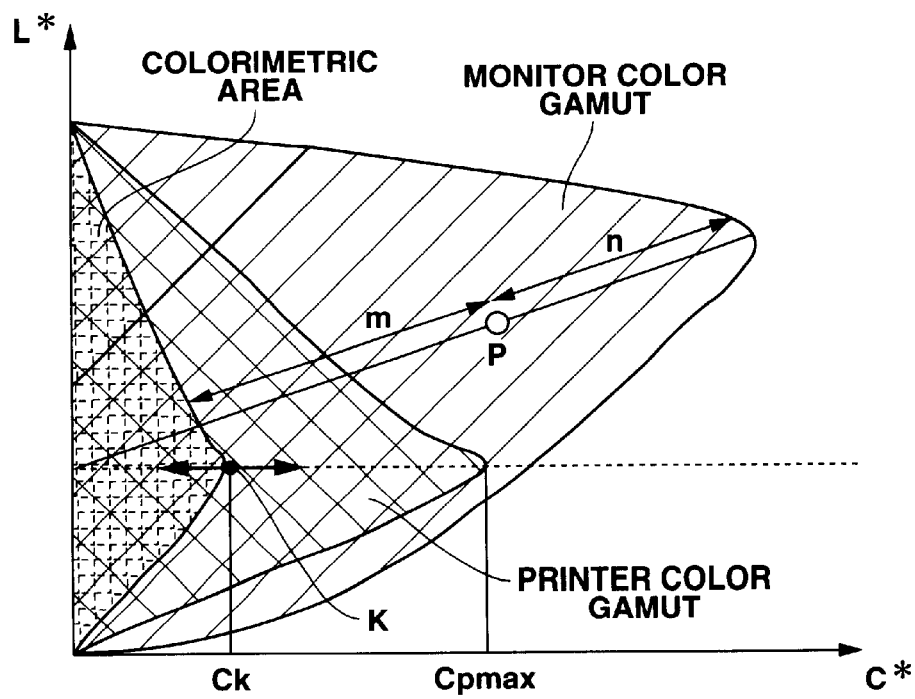
FIG. 40 also explains how to acquire inflation on the position of a point P, using, in this case, an example that the ratio acquired as the information on the position of the point P is acquired from an interior division ratio on a straight line passing through the point P and a certain point on the achromatic axis.
Figure 41:
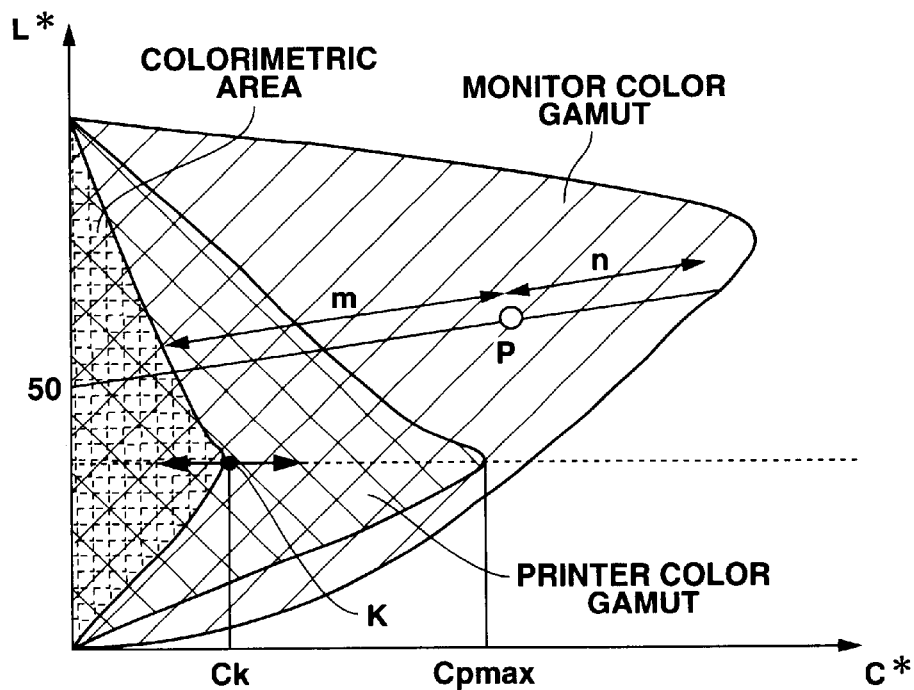
FIG. 41 also explains how to acquire information on the position of a point P, using another example that the ratio acquired as the information on the position of the point P is acquired from an interior division ratio on a straight line passing through the point P and a certain point on the achromatic axis.

For the color gamut reduction, position information of the point P is first acquired. The position of the point P is determined based on a ratio between the distance from the outer wall of the colorimetric area and that from the outer wall of the monitor color gamut. Note that this "distance" is a distance along a straight line, not always any shortest distance from each outer wall. That is, the value of the ratio acquired as the position information of the point P may be obtained from an interior division ratio on the equal lightness straight line passing through the point P as shown in FIG. 39, for example, or from an interior division ratio on a straight line passing through the point P and a point on the achromatic axis as shown in FIGS. 40 and 41, for example.

Figure 39:
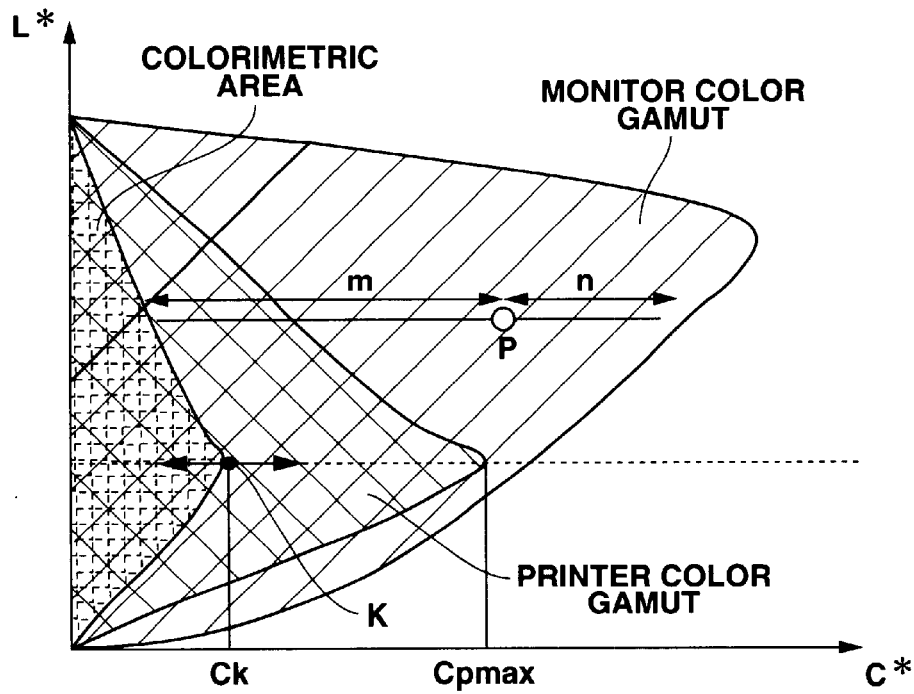
FIG. 39 explains how to acquire information on the position of a point P, using an example that a ratio acquired as the information on the position of the point P is acquired from an interior division ratio on the constant lightness straight line passing through the point P.

The position information of the point P will be described on the assumption that it is acquired from the interior division ratio on the equal lightness straight line passing through the point P as shown in FIG. 39. For this description, it is assumed that the ratio between the distance from the outer wall of the colorimetric area and that of the monitor color gamut is m:n.

Figure 42:
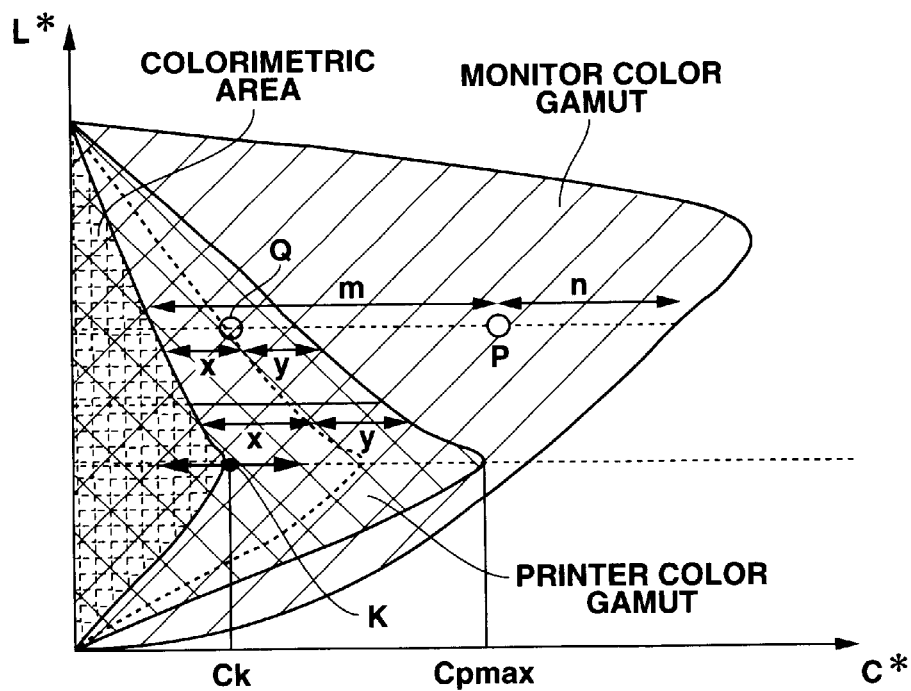
FIG. 42 explains how to set an output device imaginary color gamut, using an example that the output device imaginary color gamut is set taking as a reference the constant lightness straight line passing through the point P.

When the position information of the point P is acquired as in the above, an output device imaginary color gamut is set as shown in FIG. 42. The output device imaginary color gamut is a color gamut imaginarily set inside the printer color gamut, and its outer wall is set so that the ratio between the distance from the outer wall of the colorimetric area and that from the outer wall of the printer color gamut is constant (x:y). Note again that this "distance" is a distance along a straight line, not always any shortest distance from each outer wall. Also, the ratio (x:y) is calculated using a predetermined reduction function. The relation of this ratio (x:y) with the ratio (m:n) acquired as the position information of the point P will further be described later.

A point on the straight light used for acquisition of the position information of the point P (namely, the equal lightness straight line passing through the point P) and where the ratio between the distance from the outer wall of the colorimetric area and that from the outer wall of the printer color gamut is x:y, is taken as a point Q. Straight lines are assumed which is parallel to the straight line PQ for all the lightness and hue. At this time, the outer wall of the output device imaginary color gamut is an assembly of points where the ratio between the outer wall of the colorimetric area and that from the outer wall of the printer color gamut is x:y on such straight lines.

Figure 43:
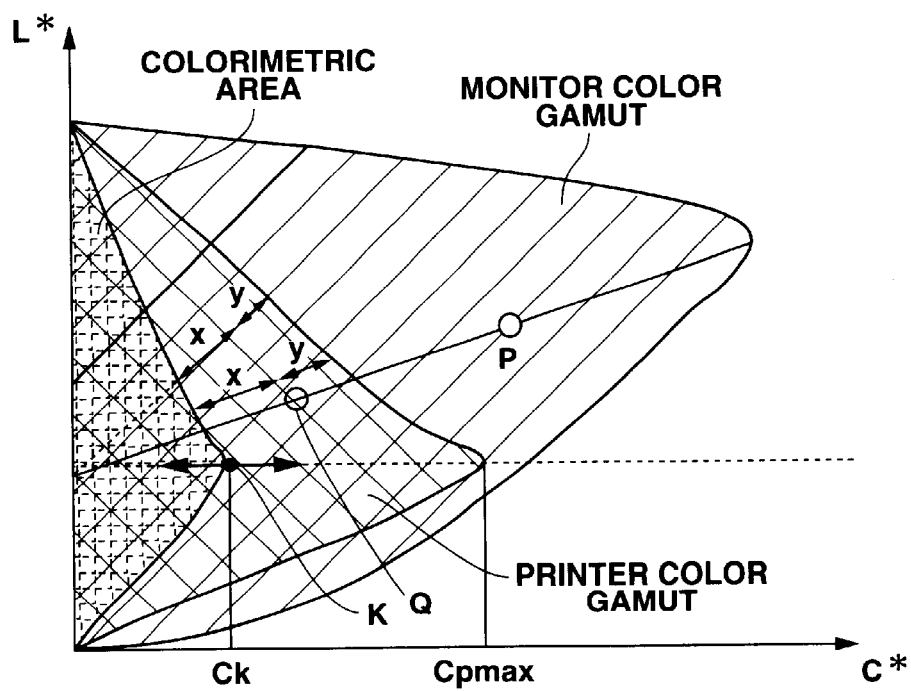
FIG. 43 also explains how to set an output device imaginary color gamut, using, in this case, an example that the output device imaginary color gamut is set taking as a reference the constant lightness straight line passing through a certain point on the achromatic axis.
Figure 44:
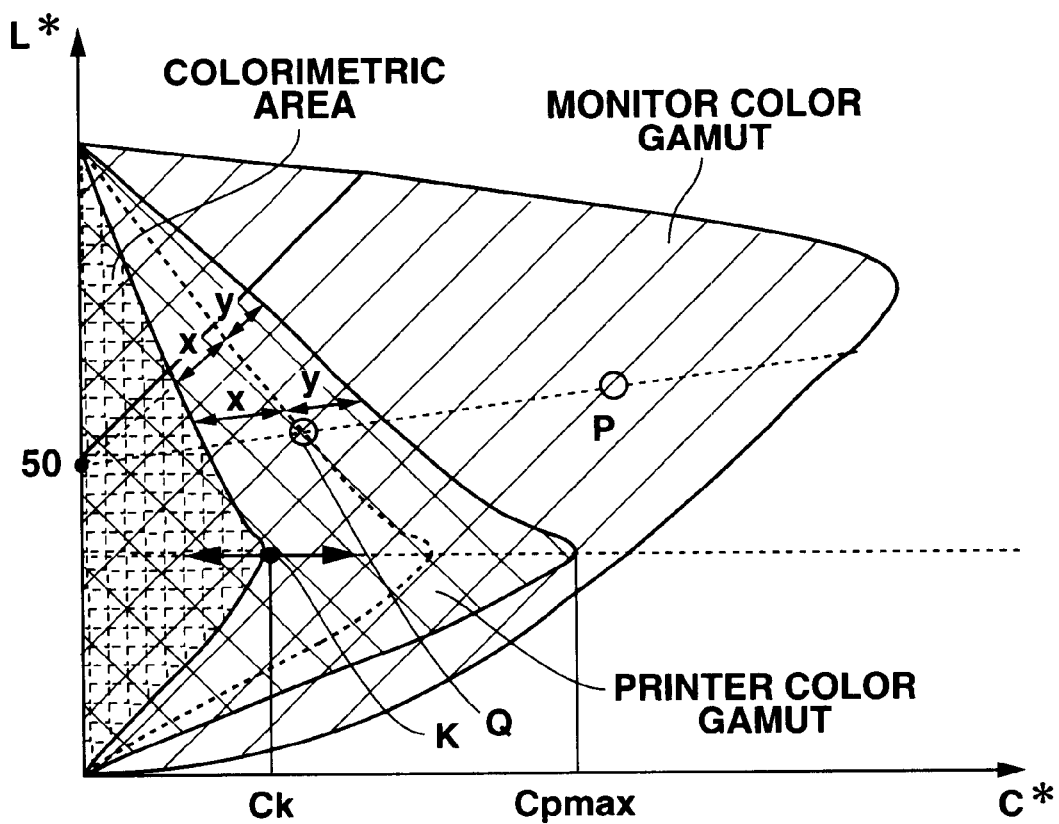
FIG. 44 also explains how to set an output device imaginary color gamut, using another example that the output device imaginary color gamut is set taking as the reference the constant lightness straight line passing through the certain point on the achromatic axis.

The output device imaginary color gamut may be set irrespectively of the straight line used for the acquisition of the position information of the point P. As shown in FIGS. 43 and 44 for example, a straight line passing through a point on the achromatic axis may be assumed and a point on this straight line where the ratio between the distance from the outer wall of the colorimetric area and that from the outer wall of the printer color gamut is x:y, be taken as the point Q. In other words, the outer wall of the output device imaginary color gamut may be an assembly of points on straight lines extending radially in all directions from a point on the achromatic axis, for example, and where the ratio between the distance from the outer wall of the colorimetric area and that from the outer wall of the printer color gamut is x:y.

As in the above, the outer wall of the output device imaginary color gamut is defined as an assembly of the points Q. At the points Q, the ratio between the distance from the outer wall of the colorimetric area and that from the outer wall of the printer color gamut is x:y. The ratio (x:y) is calculated using a predetermined reduction function based on the ratio (m:n) acquired as the position information of the point P. How to calculate the ratio (x:y) will be described below:

It is assumed here that the ratio (m:n) acquired as the position information of the point P is acquired as an interior division ratio on an equal lightness straight line passing through the point P. When y/x=n/m, the point Q can be determined by linear conversion of the point P in the direction of chroma as shown in FIG. 45.

Figure 45:
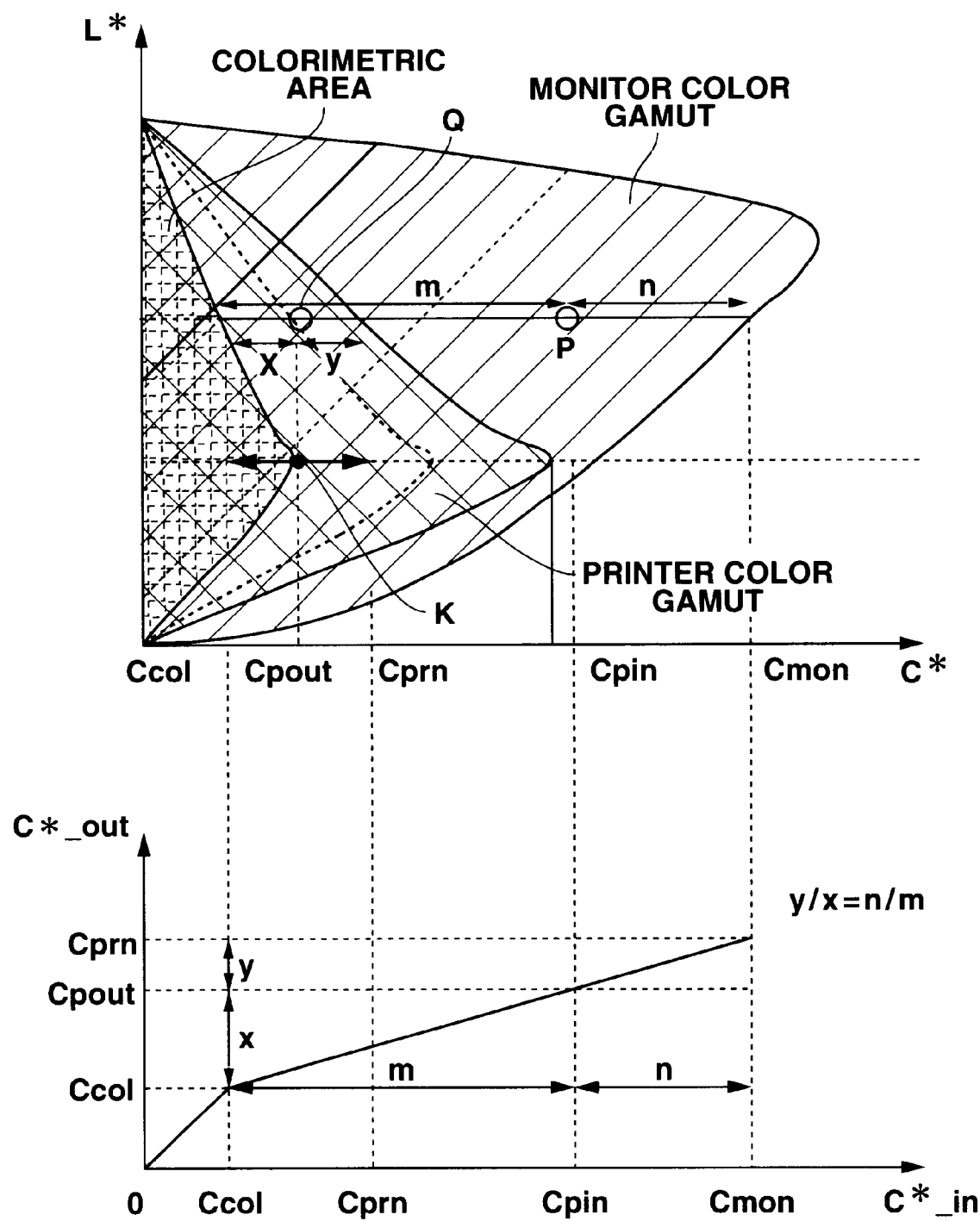
FIG. 45 explains how to reduce the color gamut, using an example that a chroma Cpout at a point Q is determined by linear conversion of the point P in the direction of the chroma.

In FIG. 45, Cmon indicates a chroma at an intersection of the straight line passing through the points P and Q with the outer wall of the monitor color gamut, Cprn indicates a chroma at an intersection of the straight line passing through the points P and Q with the outer wall of the printer color gamut, Ccol indicates a chroma at an intersection of the straight line passing through the points P and Q with the outer wall of the colorimetric area, Cpin indicates a chroma at the point P, and Cpout indicates a chroma at the point Q.

For determining the point Q by linear conversion of the point P in the direction of chroma as shown in FIG. 45, a linear function is sued to determine the chroma Cpout at the point Q corresponding to the chroma Cpin at the point P. An interior division ratio between Ccol and Cprn at the chroma Cpout is determined and taken as the ratio (x:y).

Figure 46:
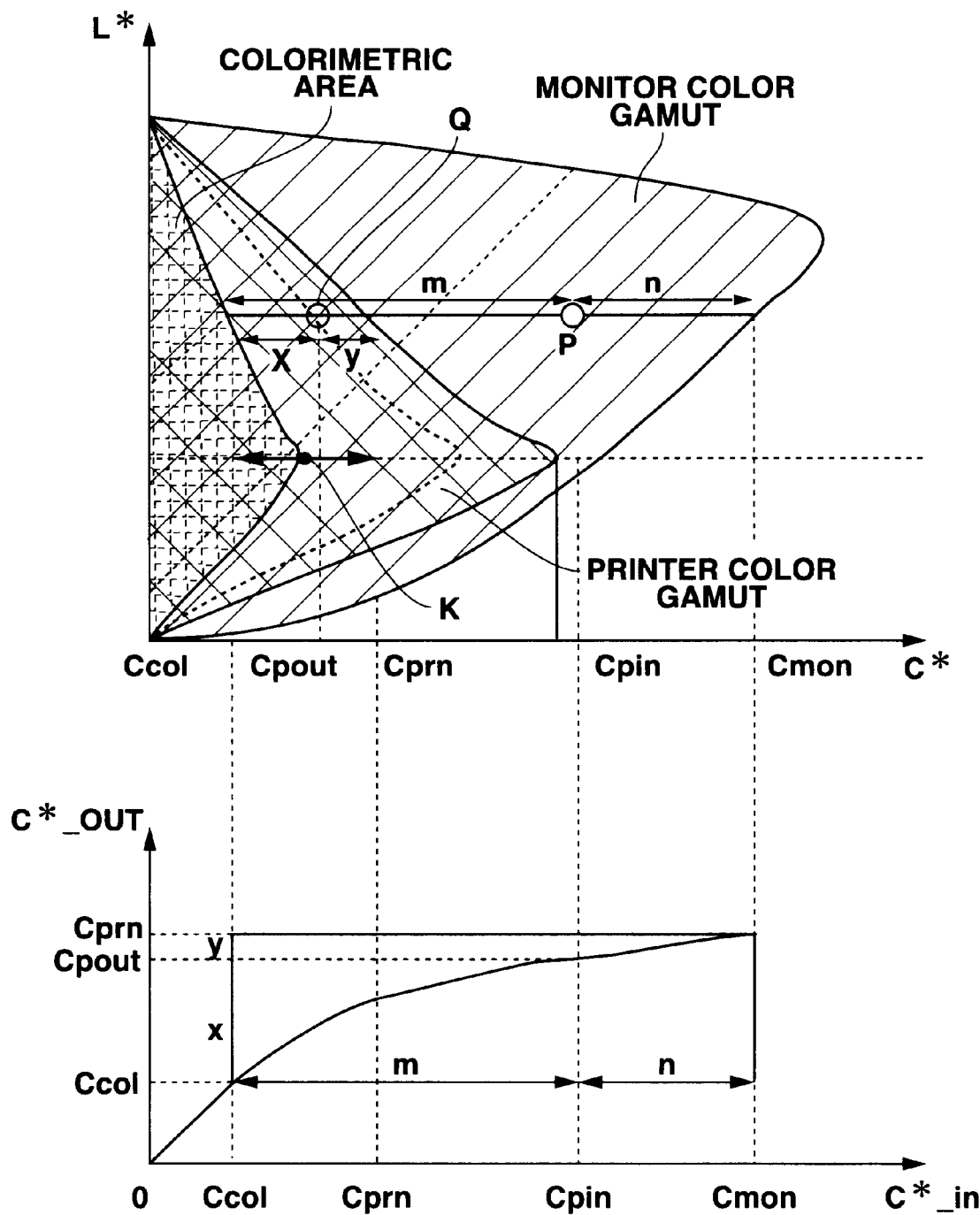
FIG. 46 also explains how to reduce the color gamut, using an example that a chroma Cpout at a point Q corresponding to a chroma Cpin at the point P is determined using a nonlinear function.
Figure 47:
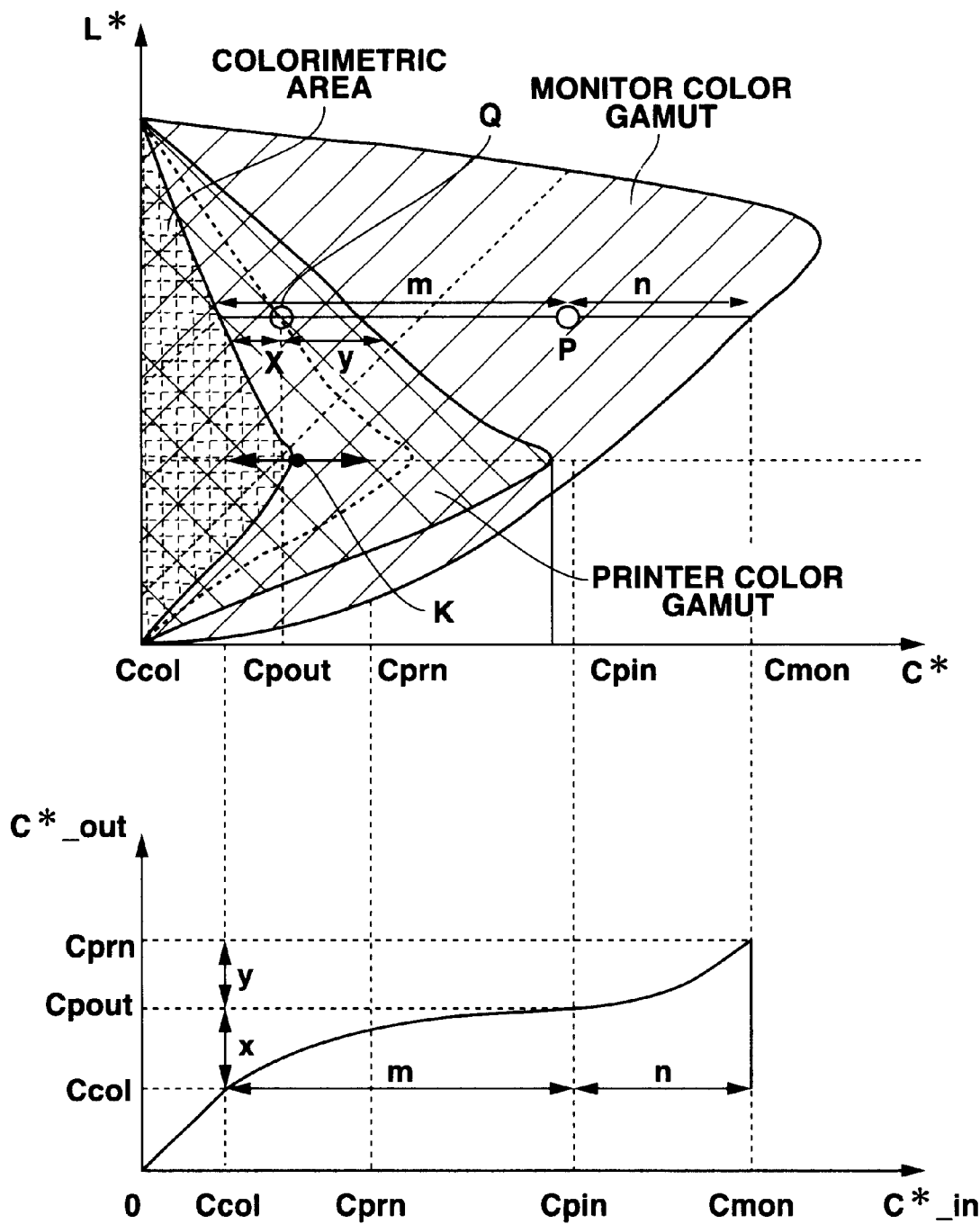
FIG. 47 also explains how to reduce the color gamut, using another example that the chroma Cpout at the point Q corresponding to the chroma Cpin at the point P is determined using the nonlinear function.

Also, the ratio (x:y) may be calculated using a nonlinear function. In this case, the nonlinear function is used to determine the chroma Cpout at the point Q corresponding to the chroma Cpin at the point P as shown in FIGS. 46 and 47. An interior division ratio between Ccol and Cprn at the Cpout is determined and taken as the ratio (x:y).

When the ratio (m:n) acquired as the position information of the point P is determined as the interior division ratio on the straight lines passing trough the point P and a point on the achromatic axis as shown in FIGS. 40 and 41, the lightness and chroma are linearly or non-linearly converted. Also in this case, the point Q and ratio (x:y) can be determined as in FIGS. 45 to 47 except that both the lightness and chroma are taken in consideration.

When the output device imaginary color gamut is set as in the above, a color signal corresponding to the point P is mapped along the profile of the output device imaginary color gamut. At this time, a destination of the mapping is determined based on an evaluation value acquired using a predetermined evaluation function, for example. That is, the predetermined evaluation function is used to make a search for a destination of reduction or expansion of the point P, for example, and the mapping is effected for the reduced color signal to be optimum.

The color difference formula given by the equation (4-8) or (4-9) for example is used herein as the predetermined evaluation function. That is, the point P is mapped along the profile of the output device imaginary color gamut by reducing or expanding the point P so that the color difference $\Delta E$ given by the equation (4-8) or (4-9) is minimum. The chromatic value of the mapping destination is outputted as L*C*h_out.

The concrete examples of the color difference formula given by the equation (4-8) or (4-9) include the so-called $\Delta E_{94}$ color difference formula given by the following equation (6-1), so-called BFD color difference formula given by the following equation (6-2), etc.

$$\Delta E_{94} = \sqrt{\left(\frac{\Delta L^*}{k_L \cdot S_L}\right)^2 + \left(\frac{\Delta C^*}{k_C \cdot S_C}\right)^2 + \left(\frac{\Delta H^*}{k_H \cdot S_H}\right)^2} \quad (6\text{-}1)$$

$$\Delta E_{BFD(lx)} = \sqrt{\left(\frac{\Delta L_{BFD}}{l}\right)^2 + \left(\frac{\Delta C^*}{c \cdot D_C}\right)^2 + \left(\frac{\Delta H^*}{D_H}\right)^2 + R_T\left(\frac{\Delta C^*}{c \cdot D_C} \Delta \frac{H^*}{D_H}\right)} \quad (6\text{-}2)$$

That is to say, for determining the mapping destination by reducing or expanding the point P, the $\Delta E_{94}$ color difference formula given by the equation (6-1) is used as the evaluation function and the point P is mapped along the profile of the output device imaginary color gamut for the color difference to be minimum. Otherwise, the BFD color difference formula given by the equation (6-2) is used as the evaluation function and the point P is mapped along the profile of the output device imaginary color gamut for the color difference to be minimum.

Note that the evaluation function used for determination of a mapping destination is not limited to the above. Therefore, if a color space, color difference formula, etc. suitable for the human visual sensation are defined hereafter, they may be used as the evaluation function.

The evaluation function and its parameters may be the same for all color signals to be subjected to color gamut reduction, but they may be changed for each hue and each color area. Therefore, for those of color signals having to be reduced in color gamut which are outside the printer color gamut, the lightness, chroma and hue may be three-dimensionally reduced while for those which are inside the printer color gamut, the lightness and chroma may be two-dimensionally reduced.

More specifically, for color signals inside the printer color gamut, a color difference formula given by the following equation (6-3) is used as the evaluation function with $\Delta H^*=0$, mapping is made along the profile of the output device imaginary color gamut for the color difference to be minimum. On the other hand, for color signals outside the printer color gamut, a color difference formula given by the following equation (6-4) is used as the evaluation function and mapping is made along the profile of the output device imaginary color gamut for the color difference to be minimum.

$$\Delta E = \sqrt{Kll(\Delta L^*)^2 + Kcc(\Delta C^*)^2} \quad (6\text{-}3)$$

$$\Delta E = \sqrt{Kll(\Delta L^*)^2 + Kcc(\Delta C^*)^2 + Khh(\Delta H^*)^2} \quad (6\text{-}4)$$

Namely, when an input image color signal is inside the color gamut of the printer, only the lightness and chroma of the color signal may be changed using the color difference formula given by the equation (6-3) as the evaluation function while the hue is maintained. When the input image color signal is outside the printer color gamut, the lightness, chroma and hue of the color signal may be changed using the color difference formula given by the equation (6-4) as the evaluation function.

By using difference evaluation functions when the input image color signal is inside the output device color gamut and when it is outside the output device color gamut, respectively, an excellent color gamut reduction suitable for the human visual sensation can efficiently be done. In other words, by mapping in different directions when the input image color signal is inside the output device color gamut and when it is outside the output device color gamut, respectively, it is made possible to reproduce a more natural image.

Note that in the above equation (6-4), the term $K_{hh}$ should preferably be defined as a function of the distance from the outer wall of the printer color gamut. Thereby, it is possible to determine a mapping direction by changing the evaluation function continuously correspondingly to the distance from the outer wall of the printer color gamut.

As in the foregoing, a color signal whose ratio between the distance from the outer wall of the colorimetric area and that from the outer wall of the monitor color gamut is m:n is mapped along the profile of the output device imaginary color gamut whose ratio between the distance from the outer wall of the colorimetric area and that from the outer wall of the printer color gamut is x:y. The above processing is effected all the to-be-reduced input image color signals. Thus, the linear or nonlinear reduction can be adopted to effect a color gamut reduction using the three-dimensions, namely, lightness, chroma and hue.

Figure 48:
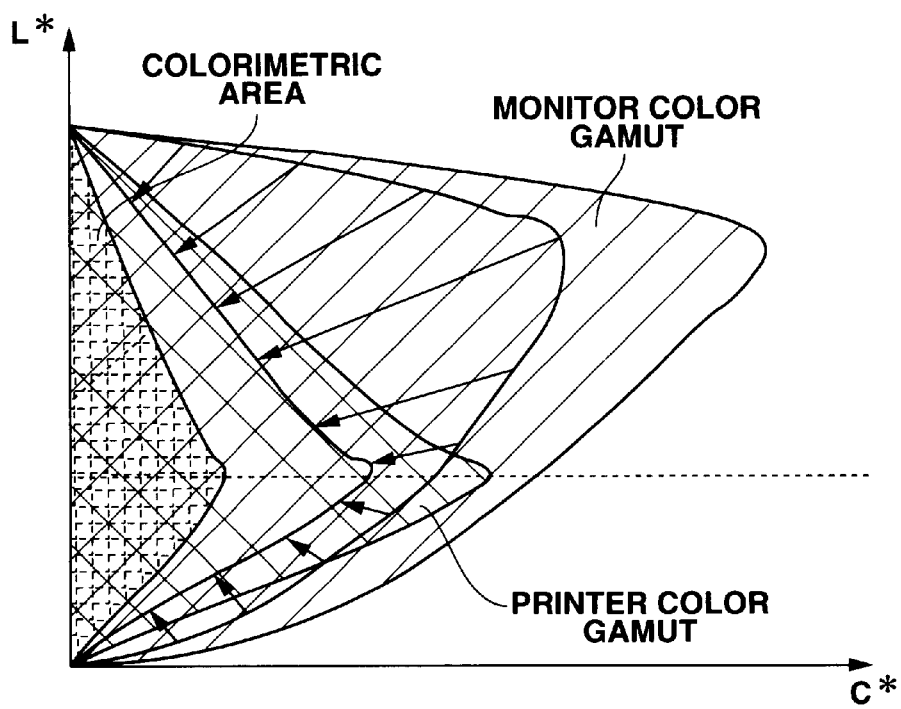
FIG. 48 shows an example that a color signal in a certain plane inside a monitor color gamut is mapped along the outermost contour of an output device imaginary color gamut corresponding to the plane by linear or nonlinear reduction.
Figure 49:
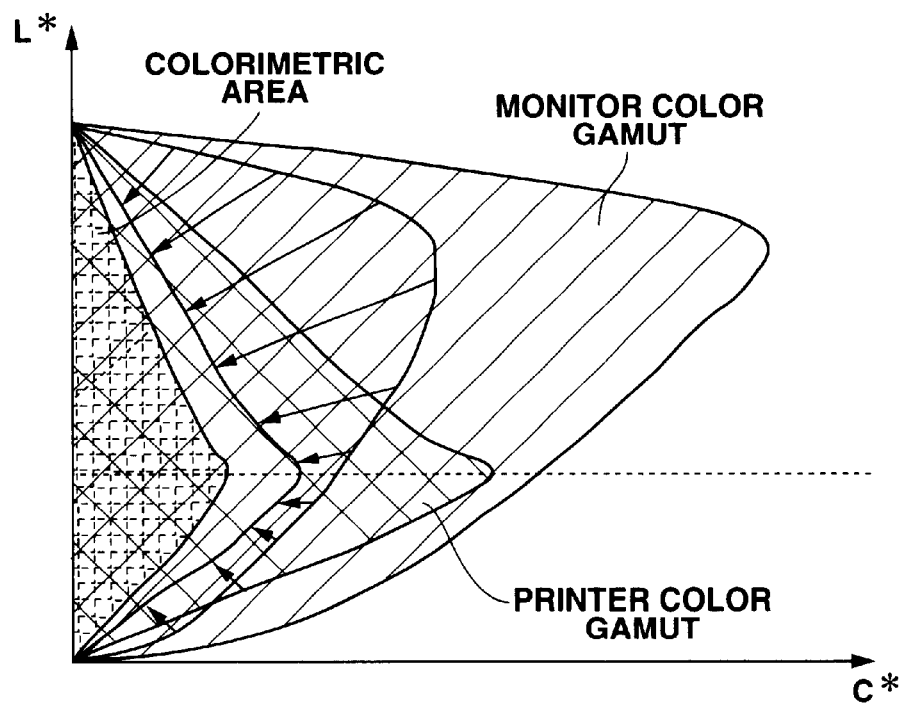
FIG. 49 shows another example that the color signal in the certain plane inside the monitor color gamut is mapped along the outermost contour of the output device imaginary color gamut corresponding to the plane by linear or nonlinear reduction.

FIGS. 48 and 49 show the concept of the above color gamut reduction. As shown in FIG. 48, a color signal in a certain plane inside the monitor color gamut is mapped along the profile of the output device imaginary color gamut corresponding to the plane, and as shown in FIG. 49, the color signal in the certain plane inside the monitor color gamut is mapped along the outermost contour of the output device imaginary color gamut corresponding to the plane. That is, an input image color signal is mapped along any profile of the output device imaginary color gamut set inside the printer color gamut, whereby the input image color signal is converted to a color signal corresponding to the printer color gamut.

Note that also when the monitor and printer color gamuts have the aforementioned shape 2 (namely, the monitor color gamut is partially larger than the printer color gamut and the printer color gamut is partially larger than the monitor color gamut), the nearly same color gamut reduction as in the above can be effected. More particularly, when the monitor and printer color gamuts have the shape 2, the color gamut reduction should be done as in the above if the area A (an area obtained by subtraction of the colorimetric area from the monitor color gamut) is reduced or expanded to the area B (an area obtained by subtraction of the colorimetric area from the printer color gamut). On the other hand, if the area A is reduced or expanded to the area C (a common area to the areas A and B), the printer color gamut referred to in the above description should be changed to the common color gamut to the monitor and printer.

As having been described in the foregoing, by adopting the linear or nonlinear reduction in the three-dimensional color gamut reduction, the human visual sensation can be taken in consideration in the color gamut reduction which will be excellent being suitable for the human visual sensation. In other words, the color gamut reduction according to the present invention permits to reproduce an image in colors very near those of an original image, without much spoiling the image contrast, sharpness and gradation of the image.

In the prior art, when the clipping is adopted as the method of color gamut reduction, the gradation of an image is lost. However, by adopting the linear or nonlinear reduction, such problem in the prior art can be solved. Further, when a colorimetric area is set as in the foregoing, the colorimetric area setting can be changed according to an input image to provide an optimum color gamut reduction for the image.

As having been described in the foregoing, when converting, for outputting, an image from an input device to an image corresponding to a color gamut of an output device, a color signal outside the output device color gamut has to be reduced in color gamut. According to the present invention, however, it is possible to lessen the difference between the color of an input signal and that of an output image by the color gamut conversion in the process of color gamut reduction. That is, the present invention permits to convert a color signal outside the output device color gamut more approximate to the input device color gamut before reducing the color gamut of the color signal outside the output device color gamut and converting the input image to an image corresponding to the output device color gamut.

What is claimed is:

1. An image processor adapted to convert, for outputting, an image from a predetermined input device to an image corresponding to the color gamut of a corresponding output device, the image processor comprising:

means for reducing, when the output device color gamut is different from the color gamut of the input device, the color gamut of a color signal outside the output device color gamut in the direction of a minimum value of the color difference formula given by the following equation (1) or (2):

$$\Delta E = \left\{ \begin{bmatrix} \Delta L^* & \Delta C^* & \Delta H^* \end{bmatrix} \begin{bmatrix} Kll & Klc & Klh \\ Kcl & Kcc & Kch \\ Khl & Khc & Khh \end{bmatrix} \begin{bmatrix} \Delta L^* \\ \Delta C^* \\ \Delta H^* \end{bmatrix} \right\}^{1/2} \quad (1)$$

$$\Delta E = \sqrt{\begin{array}{c} \left(\frac{\Delta L^*}{Kl}\right)^2 + \left(\frac{\Delta C^*}{Kc}\right)^2 + \left(\frac{\Delta H^*}{Kh}\right)^2 + \left(\frac{\Delta L^* \cdot \Delta C^*}{Klc}\right) + \\ \left(\frac{\Delta C^* \cdot \Delta H^*}{Kch}\right) + \left(\frac{\Delta H^* \cdot \Delta L^*}{Khl}\right) \end{array}} \quad (2)$$

where $\Delta L^*$ is a difference in lightness; $\Delta C^*$ is a difference in chroma; $\Delta H^*$ is a difference in hue; and $K_l$, $K_c$, $K_h$, $K_{ll}$, $K_{lc}$, $K_{lh}$, $K_{cl}$, $K_{cc}$, $K_{ch}$, $K_{hl}$, $K_{hc}$ and $K_{hh}$ are predetermined constants, respectively, or functions of a lightness $L^*$, chroma $C^*$ and hue $h^*$, respectively.

2. The apparatus as set forth in claim 1, wherein to reduce a color gamut, the color gamut reducing means sets more than one output device imaginary color gamut as imaginary color gamuts in the output color gamut, reduces the color gamut of a color signal of an image from an input device in the direction of a minimum color difference $\Delta E$ given by the equation (1) or (2), and maps the color signal of the input image along the outermost contour of any of the output device imaginary color gamuts, thereby converting, for outputting, the image from a predetermined input device to an image corresponding to the color gamut of a predetermined output device.

3. The apparatus as set forth in claim 2, wherein to reduce a color gamut, the color gamut reducing means sets, inside the output device color gamut, an area where the color gamut is not to be reduced (not-to-be-reduced area) while setting the output device imaginary color gamut outside the not-to-be reduced area; and to convert, for outputting, the image from the predetermined input device to an image corresponding to the color gamut of the predetermined output, the color gamut reducing means outputs a color signal inside the not-to-reduced area as it is without reducing its color gamut.

4. The apparatus as set forth in claim 3, wherein the color gamut reducing means sets the not-to-reduced area in relation to the input device color gamut and/or output device color gamut on the basis of the input device color gamut and/or output device color gamut.

5. The apparatus as set forth in claim 2, wherein to reduce a color gamut, if the color signal of the image from the input device is inside the color gamut of the output device, the color gamut reducing means changes only the lightness and chroma of the color signal while maintaining the hue of the color signal; and if the color signal of the image from the input device is outside the color gamut of the output device, the color gamut reducing means changes the lightness, chroma and hue of the color signal.

6. An image processor adapted to convert, for outputting, an image from a predetermined input device to an image corresponding to the color gamut of a corresponding output device, the image processor comprising:

a color gamut reducing means for setting, when the output device color gamut is different from the color gamut of the input device, more than one output device imaginary color gamut as imaginary color gamuts in the output device color gamut, and mapping the color signal of the image from the input device along the outermost contour of any of the output device imaginary color gamuts, thereby reducing the color gamut for the image from the input device to be an image corresponding to the color gamut of the output device.

7. An image processing method of reducing, if the color gamut of an output device is different from that of an input device when converting, for outputting, an image from a predetermined input device to an image corresponding to the color gamut of a corresponding output device, the color gamut of a color signal outside the output device color gamut in the direction of a minimum value of the color difference $\Delta E$ given by the following equation (1) or (2):

$$\Delta E = \left\{ \begin{bmatrix} \Delta L^* & \Delta C^* & \Delta H^* \end{bmatrix} \begin{bmatrix} Kll & Klc & Klh \\ Kcl & Kcc & Kch \\ Khl & Khc & Khh \end{bmatrix} \begin{bmatrix} \Delta L^* \\ \Delta C^* \\ \Delta H^* \end{bmatrix} \right\}^{1/2} \quad (1)$$

-continued $$\Delta E = \sqrt{\left(\frac{\Delta L^*}{Kl}\right)^2 + \left(\frac{\Delta C^*}{Kc}\right)^2 + \left(\frac{\Delta H^*}{Kh}\right)^2 + \left(\frac{\Delta L^* \cdot \Delta C^*}{Klc}\right) + \left(\frac{\Delta C^* \cdot \Delta H^*}{Kch}\right) + \left(\frac{\Delta H^* \cdot \Delta L^*}{Khl}\right)} \quad (2)$$

where $\Delta L^*$ is a difference in lightness; $\Delta C^*$ is a difference in chroma; $\Delta H^*$ is a difference in hue; and $K_l$, $K_c$, $K_h$, $K_{ll}$, $K_{lc}$, $K_{lh}$, $K_{cl}$, $K_{cc}$, $K_{ch}$, $K_{hl}$, $K_{hc}$ and $K_{hh}$ are predetermined constants, respectively, or functions of a lightness $L^*$, chroma $C^*$ and hue $h^*$, respectively.

8. The method as set forth in claim 7, wherein to reduce a color gamut, more than one output device imaginary color gamut are set as imaginary color gamuts in the output color gamut;

the color gamut of a color signal of an image from an input device is reduced in the direction of a minimum color difference $\Delta E$ given by the equation (1) or (2), and the color signal of the image from the input device is mapped along the outermost contour of any of the output device imaginary color gamuts, thereby converting, for outputting, the image from a predetermined input device to an image corresponding to the color gamut of a predetermined output.

9. The method as set forth in claim 8, wherein to reduce a color gamut, an area where the color gamut is not to be reduced (not-to-be-reduced area) is set inside the output device color gamut while the output device imaginary color gamut is set outside the not-to-be-reduced area; and to convert, for outputting, the image from the predetermined input device to an image corresponding to the color gamut of the predetermined output, a color signal inside the not-to-be-reduced area is outputted as it is without reducing its color gamut.

10. The method as set forth in claim 9, wherein the not-to-reduced area is set in relation to the input device color gamut and/or output device color gamut on the basis of the input device color gamut and/or output device color gamut.

11. The method as set forth in claim 7, wherein to reduce a color gamut, if the color signal of the image from the input device is inside the color gamut of the output device, only the lightness and chroma of the color signal are changed while the hue is maintained; and if the color signal of the image from the input device is outside the color gamut of the output device, the lightness, chroma and hue of the color signal are changed.

12. An image processing method of converting, for outputting, an image from a predetermined input device to an image corresponding to the color gamut of a corresponding output device, the method being adapted such that:

when the output device color gamut is different from the input device color gamut, more than one output device imaginary color gamut are set as imaginary color gamuts in the output color gamut, and the color signal of the image from the input device is mapped along the outermost contour of any of the output device imaginary color gamuts, thereby reducing the color gamut for the image from the input device to be an image corresponding to the color gamut of the output device.

13. A color gamut conversion table creating apparatus adapted to create a color gamut conversion table to which reference is made when converting, for outputting, an input color signal from a predetermined input device to a color signal corresponding to the color gamut of a predetermined output, the apparatus comprising:

a color gamut conversion table creating means for reducing the color gamut of any of colors inside the color gamut of an input device color gamut, not inside the color gamut of an output device, in the direction of a minimum color difference $\Delta E$ given by the equation (1) or (2) to have the color correspond to a color inside the output device color gamut and creating, on the basis of the result of the correspondence, a color gamut conversion table showing relations between input device color signals and output device color signals:

$$\Delta E = \left\{ \begin{bmatrix} \Delta L^* & \Delta C^* & \Delta H^* \end{bmatrix} \begin{bmatrix} Kll & Klc & Klh \\ Kcl & Kcc & Kch \\ Khl & Khc & Khh \end{bmatrix} \begin{bmatrix} \Delta L^* \\ \Delta C^* \\ \Delta H^* \end{bmatrix} \right\}^{1/2} \quad (1)$$

$$\Delta E = \sqrt{\left(\frac{\Delta L^*}{Kl}\right)^2 + \left(\frac{\Delta C^*}{Kc}\right)^2 + \left(\frac{\Delta H^*}{Kh}\right)^2 + \left(\frac{\Delta L^* \cdot \Delta C^*}{Klc}\right) + \left(\frac{\Delta C^* \cdot \Delta H^*}{Kch}\right) + \left(\frac{\Delta H^* \cdot \Delta L^*}{Khl}\right)} \quad (2)$$

where $\Delta L^*$ is a difference in lightness; $\Delta C^*$ is a difference in chroma; $\Delta H^*$ is a difference in hue; and $K_l$, $K_c$, $K_h$, $K_{ll}$, $K_{lc}$, $K_{lh}$, $K_{cl}$, $K_{cc}$, $K_{ch}$, $K_{hl}$, $K_{hc}$ and $K_{hh}$ are predetermined constants, respectively, or functions of a lightness $L^*$, chroma $C^*$ and hue $h^*$, respectively.

14. A color gamut conversion table creating method adapted to create a color gamut conversion table to which reference is made when converting, for outputting, a color signal inputted from a predetermined input device to a color signal corresponding to the color gamut of a predetermined output device, the method comprising the step of:

reducing the color gamut of any of colors inside the color gamut of an input device color gamut, not inside the color gamut of an output device, in the direction of a minimum color difference $\Delta E$ given by the equation (1) or (2) to have the color correspond to a color inside the output device color gamut, and create, on the basis of the result of the correspondence, a color gamut conversion table showing relations between input device color signals and output device color signals:

$$\Delta E = \left\{ \begin{bmatrix} \Delta L^* & \Delta C^* & \Delta H^* \end{bmatrix} \begin{bmatrix} Kll & Klc & Klh \\ Kcl & Kcc & Kch \\ Khl & Khc & Khh \end{bmatrix} \begin{bmatrix} \Delta L^* \\ \Delta C^* \\ \Delta H^* \end{bmatrix} \right\}^{1/2} \quad (1)$$

$$\Delta E = \sqrt{\left(\frac{\Delta L^*}{Kl}\right)^2 + \left(\frac{\Delta C^*}{Kc}\right)^2 + \left(\frac{\Delta H^*}{Kh}\right)^2 + \left(\frac{\Delta L^* \cdot \Delta C^*}{Klc}\right) + \left(\frac{\Delta C^* \cdot \Delta H^*}{Kch}\right) + \left(\frac{\Delta H^* \cdot \Delta L^*}{Khl}\right)} \quad (2)$$

where $\Delta L^*$ is a difference in lightness; $\Delta C^*$ is a difference in chroma; $\Delta H^*$ is a difference in hue; and $K_l$, $K_c$, $K_h$, $K_{ll}$, $K_{lc}$, $K_{lh}$, $K_{cl}$, $K_{cc}$, $K_{ch}$, $K_{hl}$, $K_{hc}$ and $K_{hh}$ are predetermined constants, respectively, or functions of a lightness $L^*$, chroma $C^*$ and hue $h^*$, respectively.

15. A recording medium having recorded therein an image processing program in accordance with which an image from a predetermined input device is converted to an image corresponding to the color gamut of a predetermined output device, the program being such that when the color gamut of the output device is different from that of the input device, the color gamut of a color signal outside the output device color gamut is reduced in the direction of a minimum color difference $\Delta E$ given by the equation (1) or (2):

$$\Delta E = \left\{ \begin{bmatrix} \Delta L^* & \Delta C^* & \Delta H^* \end{bmatrix} \begin{bmatrix} Kll & Klc & Klh \\ Kcl & Kcc & Kch \\ Khl & Khc & Khh \end{bmatrix} \begin{bmatrix} \Delta L^* \\ \Delta C^* \\ \Delta H^* \end{bmatrix} \right\}^{1/2} \quad (1)$$

$$\Delta E = \sqrt{\left(\frac{\Delta L^*}{Kl}\right)^2 + \left(\frac{\Delta C^*}{Kc}\right)^2 + \left(\frac{\Delta H^*}{Kh}\right)^2 + \left(\frac{\Delta L^* \cdot \Delta C^*}{Klc}\right) + \left(\frac{\Delta C^* \cdot \Delta H^*}{Kch}\right) + \left(\frac{\Delta H^* \cdot \Delta L^*}{Khl}\right)} \quad (2)$$

where $\Delta L^*$ is a difference in lightness; $\Delta C^*$ is a difference in chroma; $\Delta H^*$ is a difference in hue; and $K_l$, $K_c$, $K_h$, $K_{ll}$, $K_{lc}$, $K_{lh}$, $K_{cl}$, $K_{cc}$, $K_{ch}$, $K_{hl}$, $K_{hc}$ and $K_{hh}$ are predetermined constants, respectively, or functions of a lightness $L^*$, chroma $C^*$ and hue $h^*$, respectively.

16. A recording medium having recorded therein a color gamut conversion table creating program in accordance with which there is created a color gamut conversion table to which reference is made when converting, for outputting, a color signal inputted from a predetermined input device to a color signal corresponding to the color gamut of a predetermined output device, the program being such that:

the color gamut of any of colors inside the color gamut of an input device color gamut, not inside the color gamut of an output device, is reduced in the direction of a minimum color difference $\Delta E$ given by the equation (1) or (2) to have the color correspond to a color inside the output device color gamut, and create, on the basis of the result of the correspondence, a color gamut conversion table showing relations between input device color signals and output device color signals:

$$\Delta E = \left\{ \begin{bmatrix} \Delta L^* & \Delta C^* & \Delta H^* \end{bmatrix} \begin{bmatrix} Kll & Klc & Klh \\ Kcl & Kcc & Kch \\ Khl & Khc & Khh \end{bmatrix} \begin{bmatrix} \Delta L^* \\ \Delta C^* \\ \Delta H^* \end{bmatrix} \right\}^{1/2} \quad (1)$$

$$\Delta E = \sqrt{\left(\frac{\Delta L^*}{Kl}\right)^2 + \left(\frac{\Delta C^*}{Kc}\right)^2 + \left(\frac{\Delta H^*}{Kh}\right)^2 + \left(\frac{\Delta L^* \cdot \Delta C^*}{Klc}\right) + \left(\frac{\Delta C^* \cdot \Delta H^*}{Kch}\right) + \left(\frac{\Delta H^* \cdot \Delta L^*}{Khl}\right)} \quad (2)$$

where $\Delta L^*$ is a difference in lightness; $\Delta C^*$ is a difference in chroma; $\Delta H^*$ is a difference in hue; and $K_l$, $K_c$, $K_h$, $K_{ll}$, $K_{lc}$, $K_{lh}$, $K_{cl}$, $K_{cc}$, $K_{ch}$, $K_{hl}$, $K_{hc}$ and $K_{hh}$ are predetermined constants, respectively, or functions of a lightness $L^*$, chroma $C^*$ and hue $h^*$, respectively.

* * * * *